(12) United States Patent
Ben-Haim et al.

(10) Patent No.: US 11,282,191 B2
(45) Date of Patent: Mar. 22, 2022

(54) FLATTENED VIEW FOR INTRA-LUMENAL NAVIGATION

(71) Applicant: Navix International Limited, Road Town (VG)

(72) Inventors: Shlomo Ben-Haim, Milan (IT); Leonid Gluhovsky, Gilon (IL); Yitzhack Schwartz, Haifa (IL); Eli Dichterman, Haifa (IL); Yaara Yarden, Jerusalem (IL)

(73) Assignee: Navix International Limited, Road Town (VG)

( * ) Notice: Subject to any disclaimer, the term of this patent is extended or adjusted under 35 U.S.C. 154(b) by 0 days.

(21) Appl. No.: 16/650,973

(22) PCT Filed: Jul. 18, 2018

(86) PCT No.: PCT/EP2018/069569
§ 371 (c)(1),
(2) Date: Mar. 26, 2020

(87) PCT Pub. No.: WO2019/063161
PCT Pub. Date: Apr. 4, 2019

(65) Prior Publication Data
US 2020/0286225 A1    Sep. 10, 2020

Related U.S. Application Data

(63) Continuation-in-part of application No. PCT/IB2018/050201, filed on Jan. 12, 2018.
(Continued)

(30) Foreign Application Priority Data

Jul. 4, 2018 (GB) .................................. 1810992

(51) Int. Cl.
G06K 9/00 (2006.01)
G06T 7/00 (2017.01)
(Continued)

(52) U.S. Cl.
CPC .......... G06T 7/0012 (2013.01); G06T 3/0037 (2013.01); G06T 19/00 (2013.01);
(Continued)

(58) Field of Classification Search
CPC .................................................. G06T 7/0012
See application file for complete search history.

(56) References Cited

U.S. PATENT DOCUMENTS 10,231,784 B2 * 3/2019 Hettrick ............... A61B 5/0215
2005/0058328 A1   3/2005 Moreau-Gobard
(Continued)

FOREIGN PATENT DOCUMENTS

EP   1726268   11/2006
EP   2075763   7/2009
(Continued)

OTHER PUBLICATIONS

Communication dated May 11, 2020 from the US Patent and Trademark Office Regarding Third Party Submission dated May 6, 2020 Filed for U.S. Appl. No. 16/476,893. (4 pages).
(Continued)

*Primary Examiner* — Oneal R Mistry

(57) ABSTRACT

Methods for creation and use (e.g., for navigation) of displays of flattened (e.g., curvature-straightened) 3-D reconstructions of tissue surfaces, optionally including reconstructions of the interior surfaces of hollow organs. In some embodiments, data comprising a 3-D representation of a tissue surface (for example an interior heart chamber surface) are subject to a geometrical transformation allowing the tissue surface to be presented substantially within a
(Continued)

single view of a flattened reconstruction. In some embodiments, a catheter probe in use near the tissue surface is shown in positions that correspond to positions in 3-D space sufficiently to permit navigation; e.g., the probe is shown in flattened reconstruction views nearby view regions corresponding to regions it actually approaches. In some embodiments, automatic and/or easily triggered manual view switching between flattened reconstruction and source reconstruction views is implemented.

30 Claims, 33 Drawing Sheets

Related U.S. Application Data

(60) Provisional application No. 62/670,939, filed on May 14, 2018, provisional application No. 62/564,479, filed on Sep. 28, 2017, provisional application No. 62/445,368, filed on Jan. 12, 2017.

(51) Int. Cl.
*G06T 3/00* (2006.01)
*G06T 19/00* (2011.01)

(52) U.S. Cl.
CPC .............. *G06T 2207/10081* (2013.01); *G06T 2207/10088* (2013.01); *G06T 2207/30021* (2013.01); *G06T 2207/30048* (2013.01); *G06T 2210/41* (2013.01); *G06T 2219/021* (2013.01)

(56) References Cited

U.S. PATENT DOCUMENTS

| | | | |
|---|---|---|---|
| 2005/0105786 A1 | 5/2005 | Moreau-Gobard et al. | |
| 2005/0222554 A1* | 10/2005 | Wallace | A61B 8/4461 606/1 |
| 2009/0225077 A1 | 9/2009 | Sudarsky et al. | |
| 2011/0142306 A1 | 6/2011 | Nair | |
| 2011/0274326 A1 | 11/2011 | Allain et al. | |
| 2014/0330111 A1 | 11/2014 | Lichtenstein et al. | |
| 2016/0055681 A1 | 2/2016 | Koyrakh et al. | |
| 2017/0319172 A1* | 11/2017 | Harlev | A61B 8/08 |
| 2018/0200018 A1* | 7/2018 | Silva | A61B 5/745 |
| 2019/0200886 A1* | 7/2019 | Welsh | A61B 5/107 |
| 2019/0340838 A1* | 11/2019 | Gluhovsky | G06T 19/20 |

FOREIGN PATENT DOCUMENTS

| | | |
|---|---|---|
| EP | 2712543 | 4/2014 |
| WO | WO 2014/172524 | 10/2014 |
| WO | WO 2018/130981 | 7/2018 |
| WO | WO 2019/063161 | 4/2019 |

OTHER PUBLICATIONS

Communication dated May 6, 2020 from the US Patent and Trademark Office Regarding Third Party Submission dated Apr. 30, 2020 Filed for U.S. Appl. No. 16/476,893. (4 pages).
Official Action dated Apr. 13, 2021 from the US Patent and Trademark Office Re. U.S. Appl. No. 16/476,893. (23 pages).
Chan et al. "Intraprocedural Fusion of Electroanatomical Maps (EAM) with Imaging Data Based on Rapidly-Sampled Volumetric Point Clouds from Continuous EAM Catheter Tracking"; Proceedings of Spie, Proceedings vol. 6509, Medical Imaging 2007: Visualization and Image-Guided Procedures; 65090R, Mar. 21, 2007.
Houshiar et al. "A Study of Projections for Key Point Based Registration of Panoramic Terrestrial 3D Laser Scans"; Geo-Spatial Information Science, 18(1):1-46, Published online: Mar. 16, 2015.
Limaye "Drishti: a Volume Exploration and Presentation Tool"; Proc. SPIE 8506, Developments in X-Ray Tomography VIII, 85060X, Oct. 17, 2012.
Termeer et al. "CoViCAD: Comprehensive Visualization of Coronary Artery Disease"; IEEE Transactions on Visualization and Computer Graphics, 13(6):1632-1639, Nov./Dec. 2007.
Official Action dated Aug. 18, 2020 from the US Patent and Trademark Office Re. U.S. Appl. No. 16/476,893. (19 pages).
Beliveau et al. "Patient Specific Coronary Territory Maps", SPIE Digital Library, Retrieved from the Internet, 11 pages, 2007.
International Preliminary Report on Patentability dated Jul. 25, 2019 From the International Bureau of WIPO Re. Application No. PCT/IB2018/050201. (15 Pages).
International Search Report and the Written Opinion dated Jun. 6, 2018 From the International Searching Authority Re. Application No. PCT/IB2018/050201. (24 Pages).
Invitation to Pay Additional Fees, Communication Relating to the Results of the Partial International Search and the Provisional Opinion dated Apr. 25, 2018 From the International Searching Authority Re. Application No. PCT/IB2018/050201. (14 Pages).
Ahn et al. "Height-Based Deformation and Ray Supersampling for Colon Unfolding", ICAT'06 Proceedings of the 16th International Conference on Advances in Artificial Reality and Tele-Existence, Lecture Notes in Computer Science, XP047402101, Hangzhou, China, Nov. 29-Dec. 1, 2006, p. 1098-1107, Nov. 29, 2006. Sections 3.1, 3.3, 5, Figs.2, 4, 5.
Bartroli et al. "Nonlinear Virtual Colon Unfolding", Proceedings of the IEEE Conference on Visualization '01, VIS '01, XP031385694, San Diego, CA, USA, Oct. 21-26, 2001, p. 411-420, Oct. 21, 2001. Sections 4, 4.1, 4.2, 5.1, 7, Figs.1, 7a, 7b, 10.
General Electric "CardEP: Streamlined Post-Processing for Enhanced Electrophysiology Procedures", General Electric Company, GE Healthcare, Product Description, 2 P., 2016.
Karim et al. "Surface Flattening of the Human Left Atrium and Proof-of-Concept Clinical Applications", Computerized Medical Imaging and Graphics, 38(4): 251-266, Jun. 2014.
Perazzi et al. "Panoramic Video From Unstructured Camera Arrays", Computer Graphics Forum, 34(2): 57-68, May 2015.
Wang et al. "Colon Unraveling Based on Electrical Field: Recent Progress and Further Work", Proceedings of the SPIE 3660 Medical Imaging '99: Physiology and Function From Multidimensional Images, San Diego, CA, USA, Feb. 1999, XP055479173, 3660: 125-133, May 20, 1999. Abstract, Sections 1, 2.2, 2.3, Figs.2, 3.
Zhong et al. "On the Accuracy of CartoMerge for Guiding Posterior Left Atrial Ablation in Man", Heart Rhythm, 4(5): 595-602, Published Online Feb. 9, 2007.
International Search Report and the Written Opinion dated Mar. 7, 2019 From the International Searching Authority Re. Application No. PCT/EP2018/069569. (25 Pages).
AridOcean "Iran, High Resolution 3D Relief Maps", Turbosquid, XP055528216, Retrieved From the Internet, Aug. 11, 2010.
Guldenring et al. "Estimation Accuracy of a Reduced Lead System During Simulated Ischemia", 2011 Computing in Cardiology, CINC 2011, XP032167248, Hangzhou, China, Sep. 18-21, 2011, p. 237-240, Sep. 18, 2011.
Ma et al. "Cardiac Unfold: A Novel Technique for Image-Guided Cardiac Catheterization Procedures", IPCAI'12, Proceedings of the Third International Conference on Information Processing in Computer-Assisted Interventions, XP047006734, p. 104-114, Jun. 27, 2012.

\* cited by examiner

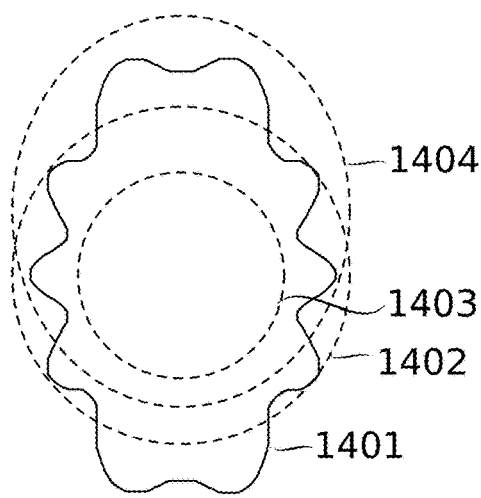
FIG. 14A
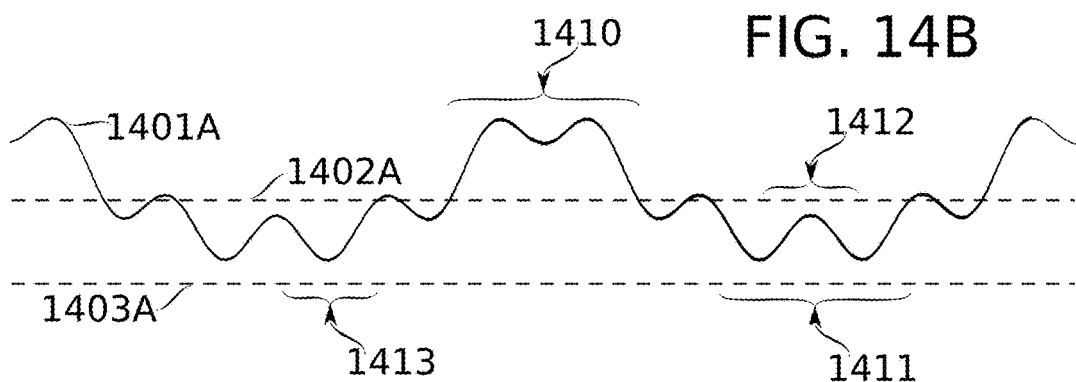
FIG. 14B
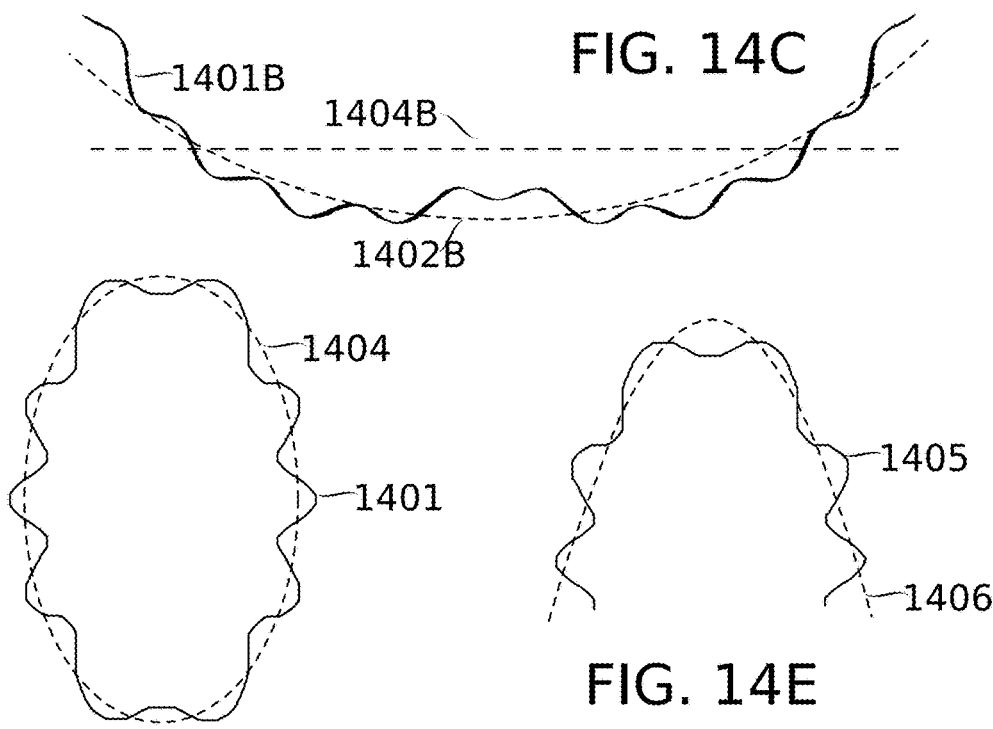
FIG. 14C
FIG. 14D
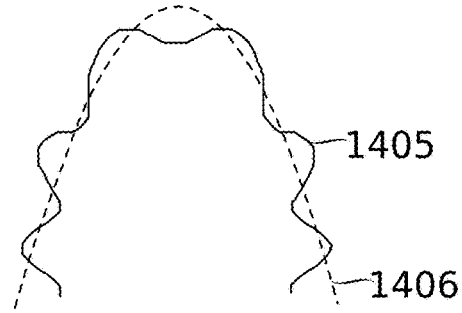
FIG. 14E

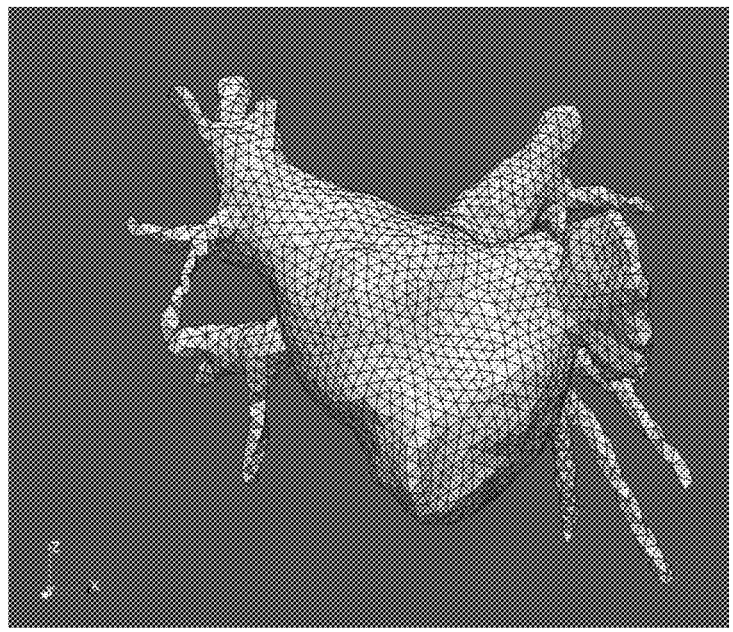
FIG. 16A
FIG. 16B
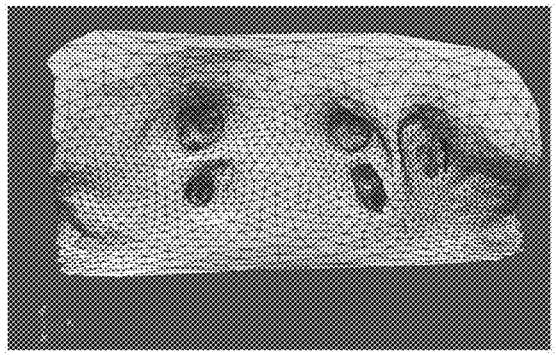
FIG. 16C
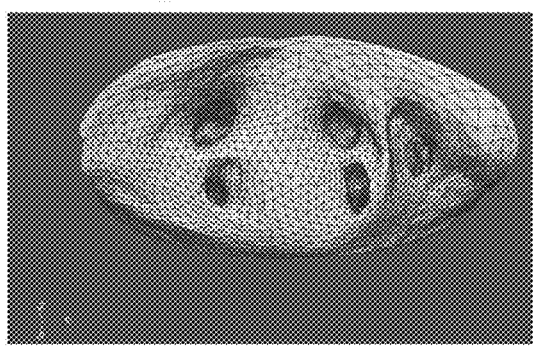
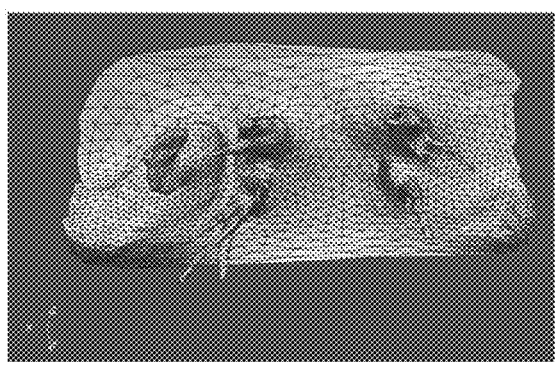
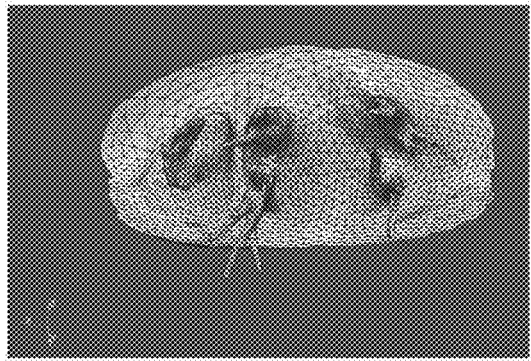
FIG. 16D
FIG. 16E Unfolding parameter = 2%

Unfolding parameter = 30%

Unfolding parameter = 40%

Unfolding parameter = 70%

Unfolding parameter = 100%

FLATTENED VIEW FOR INTRA-LUMENAL NAVIGATION

RELATED APPLICATIONS

This application is a National Phase of PCT Patent Application No. PCT/EP2018/069569 having International filing date of Jul. 18, 2018, which claims the benefit of priority under 35 USC § 119(e) of U.S. Provisional Patent Application Nos. 62/670,939 filed on May 14, 2018 and 62/564,479 filed on Sep. 28, 2017, and also claims priority of Great Britain Patent Application No. 1810992.6 filed on Jul. 4, 2018.

PCT Patent Application No. PCT/EP2018/069569 is also a Continuation-in-Part (CIP) of PCT Patent Application No. PCT/IB2018/050201 having International filing date of Jan. 12, 2018, which claims the benefit of priority under 35 USC § 119(e) of U.S. Provisional Patent Application Nos. 62/564,479 filed on Sep. 28, 2017 and 62/445,368 filed on Jan. 12, 2017.

The contents of the above applications are all incorporated by reference as if fully set forth herein in their entirety.

FIELD AND BACKGROUND OF THE INVENTION

Some embodiments of the present disclosure relate to the field of medical procedures using intrabody probes navigable within intrabody spaces, and more particularly, to presentation of data acquired during the course of a catheter procedure.

Several medical procedures in cardiology and other medical fields comprise the use of catheters to reach tissue targeted for diagnosis and/or treatment while minimizing procedure invasiveness. Early imaging-based techniques (such as fluoroscopy) for navigation of the catheter and monitoring of treatments continue to be refined, and are now joined by techniques such as electromagnetic field-guided position sensing systems. Refinements to techniques for registration of previously imaged (for example, by CT and/or MRI) anatomical features of a patient to electromagnetic field-sensed catheter position are a subject of ongoing research and development, for example as described in International Patent Application No. IB2016/052687 to Schwartz et al. filed May 11, 2016; and International Patent Application No. IB2016/052692 to Schwartz et al. filed May 11, 2016. Intrabody sensing from catheter probes to determine information about, for example, tissue contact and/or lesion assessment, has also been described (e.g., International Patent Application No. PCT IB2016/052690 to Schwartz et al. filed May 11, 2016; and International Patent Application No. IB2016/052686 to Schwartz et al. filed May 11, 2016).

The present disclosure extends beyond the field of medical procedures or even beyond the field of visualization of anatomical structures to the visualization of a surface of bodies and objects in general.

SUMMARY OF THE INVENTION

A method of visualising a three-dimensional (3-D) model of a three-dimensional (3-D) surface, for example an inner surface, of a body is disclosed, The method comprises: obtaining the model, wherein the model is defined by points on a model surface modelling the surface; defining a reference point within a volume surrounded by the model surface; applying an unfolding transformation to the points of the model to transform each of the points to a corresponding point of an unfolded model, wherein the transformation has the effect of transforming a notional closed surface, for example a sphere, centred on the reference point to a notional open surface such that for each point of the model, a normal distance between the notional closed surface and the point is substantially equal to a normal distance between the notional open surface and the corresponding point of the unfolded model; and causing display of a view of the unfolded model.

In some embodiments, the body may be at least a portion of an internal organ of an animal or human.

In some embodiments, the body may be a heart chamber.

In some embodiments, the method further comprises: receiving coordinates for the position of a catheter within the heart chamber; applying the unfolding transformation to the coordinates for the position of the catheter within the heart chamber to obtain transformed coordinates for the position of the catheter; and causing display of an indication of the catheter at the transformed coordinates together with the view of the unfolded model.

In some embodiments, the three-dimensional surface of the body may be non-developable.

In some embodiments, the view of the unfolded model may show at least 80% of the points of the unfolded model.

In some embodiments, the view of the unfolded model may show all of the points of the unfolded model.

In some embodiments, the unfolding transformation comprises reducing azimuth and inclination angles about the reference point of each point of the model and increasing the radial distance between each point of the model and the reference point, optionally such that a length between two points of the model is preserved following the unfolding transformation In some embodiments, the azimuth and inclination angles of each point of the models are defined with respect to a first line extending from the reference point and through a first surface reference point on the notional closed surface, and a second line extending from the reference point and through a second surface reference point on the notional closed surface, and the unfolding transformation reduces the azimuth and inclination angles of each point of the model about the reference point.

In some embodiments, the unfolding transformation reduces the azimuth and inclination angle by multiplying each angle by a factor, wherein the factor is positive and less than unity.

In some embodiments, the unfolding transformation comprises reducing the azimuth and/or the inclination angles of the point of the model. It will be understood that "reducing" the azimuth and inclination angles comprises reducing the absolute value of the angles. That is to say, if an angle is defined as negative, the "reducing" comprises determining the absolute value of the angle, reducing the absolute value, and taking the reduced angle to be the negative of the reduced absolute angle. The resulting effect is to move all points angularly towards a line extending from the reference point.

In some embodiments, the factor is set by a user to control a degree of unfolding, wherein a maximum degree of unfolding signifies a zero-curvature notional open surface.

In some embodiments, the reducing comprises multiplying the azimuth and/or inclination angle by an unfolding factor $0<\alpha<1$. The azimuth angle may be multiplied by a first unfolding factor $\alpha_1$, and the inclination angle may be multiplied by a second unfolding factor $\alpha_2$ different from the first unfolding factor. The first unfolding factor and second unfolding factor may be the same.

In some embodiments, the first and/or second surface reference points may be determined by a user.

In some embodiments, increasing the radial distance between each point of the model and the reference point comprises adding a multiplicative product of a value indicative of the size of the notional closed surface; and the difference between the inverse of the factor and unity.

In some embodiments, the notional closed surface may be at least partially within the model surface.

In some embodiments, the notional closed surface may be entirely within the model surface.

In some embodiments, the notional open surface may be a portion of a sphere centred on the reference point.

In some embodiments, the notional open surface may have a non-zero curvature.

In some embodiments, the notional open surface may have zero curvature.

In some embodiments, obtaining the model comprises obtaining a representation of the points of the model in polar coordinates, and applying a transformation comprises: transforming the azimuthal and inclination coordinates using a Mollweide cartographic projection transformation; multiplying the transformed azimuthal and inclination coordinates by the factor; and transforming the resulting multiplied transformed coordinates using the inverse of the Mollweide cartographic projection transformation. In some embodiments, obtaining the model comprises obtaining a representation of the points of the model in polar coordinates, and the transformation comprises a cartographic projection onto the notional open surface of the azimuthal and inclination coordinates of each point of the model to respective first and second cartesian coordinates of the corresponding point of the unfolded model.

Obtaining a representation of the points of the model in polar coordinates may comprise transforming the coordinates of the points of the model into polar coordinates using conventional transformations to polar coordinates.

In some embodiments, the transformation further comprises defining the third cartesian coordinate of the corresponding point of the unfolded as the sum of the radial coordinate of the point of the model and a third cartesian coordinate on the notional open surface corresponding to the first and second cartesian coordinates of the corresponding point of the unfolded model.

In some embodiments, the cartographic projection may be a Plate Carrée projection.

In some embodiments, the cartographic projection may be a Mollweide projection.

In some embodiments, the method further comprises causing the displaying of an icon indicative of the direction at which the portion of the internal organ is viewed with respect to the animal or human.

In some embodiments, the method further comprises receiving, via a user interface, an indication of a first orientation of the unfolded model and causing display of the view of the unfolded model at the first orientation indicated via the user interface.

In some embodiments, the method further comprises causing display of a second view of the unfolded model.

In some embodiments, the second view may have a viewing direction that is opposite of the viewing direction of the first view.

In some embodiments, the second view may have a viewing direction that is perpendicular to the viewing direction of the first view.

In some embodiments, the method further comprises receiving, via user interface, an indication of a second orientation of the unfolded model, and causing the display, for example so that both views are displayed for an overlapping time period or so that one view after the other with only one view displayed at the same time, of the second view of the unfolded model at the second orientation indicated via the user interface.

In some embodiments, the view of the unfolded model comprises information pertaining to the current state of a time varying information.

In some embodiments, the time varying information may be different at rear and front portions of the heart chamber.

In some embodiments, the time varying information may be an electrical activation map.

In some embodiments, the time varying information may be an edema map

In some embodiments, the method comprises causing simultaneous display of a plurality of views of the unfolded model at a plurality of different orientations.

In some embodiments, causing the display comprises causing a plurality of views of the unfolded model at a plurality of different orientations, wherein each view of the plurality of views is displayed sequentially. In other words, is view of the plurality of views is displayed one-after the other so as to provide the effect of continuous movement of the view of the unfolded model.

In some embodiments, the method further comprises causing simultaneous display of a plurality of views of the unfolded model, wherein each view is indicative of a different degree of unfolding.

In some embodiments, the points of the model may be obtained from measurements taken inside the body.

In some embodiments, the measurements may have been taken by a catheter inside the body.

In some embodiments, the method further comprises: obtaining additional points of the model; computing an updated unfolded model by applying the transformation to the additional points to transform each of the additional points of the model to a corresponding additional point of the unfolded model; and causing display of a view of the updated unfolded model, wherein the updated unfolded model comprises the additional points of the unfolded model.

In some embodiments, the view of the unfolded model is a predefined view, wherein the predefined view is displayed in accordance with at least one of a plurality of predefined viewing parameters, the plurality of predefined viewing parameters comprising: the factor; the value indicative of the size of notional closed surface; the first and/or second surface reference point on the notional closed surface; the orientation of the view of the unfolded surface.

In some embodiments, the method further comprises displaying the unfolded model as a combination of a central model modelling a portion of the surface of the heart chamber in a first rendering method, and a peripheral model modelling the rest of the heart chamber in a second rendering method, wherein the peripheral model is spread at the periphery of the central model.

In some embodiments, the method further comprises defining the first portion of the surface of the heart chamber as a portion of the surface lying at one side of a cutting surface and the rest of the surface of the heart chamber as that portion of the surface lying at the other side of the cutting surface, wherein the cutting surface is defined as a surface going through a desired vantage point and perpendicularly to a desired viewing direction.

There is further provided a method of presenting a three-dimensional model of an surface of heart chamber wall, the method comprising: determining a viewing point and a viewing direction; unfolding the model so that portions of the surface that are behind a cutting surface going through the vantage point perpendicularly to the viewing direction are presented peripherally to portions of the surface that are in front the cutting surface; and displaying the unfolded model together with an icon representing the viewing direction.

There is further provided an apparatus for displaying a model using a method in accordance with some methods, the apparatus comprising a user interface configured to allow a user to indicate a desired vantage point and a desired viewing direction.

In some embodiments, the apparatus further comprises a display showing the orientation of the viewing direction near the resulting unfolded three-dimensional model.

In some embodiments, the user interface allows the user to indicate different vantage points and/or viewing angle continuously, and the display shows the unfolded model changing simultaneously with the vantage point and/or viewing angle.

There is also disclosed an apparatus comprising: an input module configured to receive signals from a catheter, wherein the signals are indicative of measurements taken by the catheter inside a heart chamber; a converting module for converting the signals into coordinates of points defining a model surface modelling a three-dimensional model of a three-dimensional surface of the heart chamber, and coordinates for the position of the catheter within the heart chamber; a processor configured to apply a transformation to the points of the model to transform each of the points to a corresponding point of an unfolded model; and a display for displaying a view of the unfolded model.

In some embodiments, the processor may be configured to carry out methods in accordance with some embodiments of the present disclosure.

In some embodiments, the apparatus may further comprise a user interface configured to receive display instructions from a user, wherein the apparatus is configured to display a view of the unfolded model in accordance with the display instructions.

In some embodiments, the measurements taken inside the heart chamber may be electrical measurements.

In some embodiments, the measurements taken inside the heart chamber may be magnetic measurements.

In some embodiments, the apparatus may be configured to display an icon indicative the direction at which the unfolded model is viewed with respect to a human body.

In some embodiments, the display instructions comprise the orientation of the view of the unfolded model.

In some embodiments, the apparatus may be configured to display a second view of the unfolded model.

In some embodiments, the display instructions may comprise the orientation of the second view of the unfolded model.

In some embodiments, the apparatus may be configured to display information pertaining to time varying information.

In some embodiments, the apparatus may be configured to simultaneously display a plurality of views of the unfolded model at a plurality of different orientations.

In some embodiments, the apparatus is configured to display a plurality of views of the unfolded model at a plurality of different orientations, wherein each view of the plurality of views is displayed sequentially.

In some embodiments, the apparatus may be configured to simultaneously display a plurality of views of the unfolded model, wherein each view is indicative of a different degree of unfolding.

There is also disclosed a system comprising: a catheter configured to take measurements inside a heart chamber; an input module configured to receive signals from the catheter, wherein the signals are indicative of the measurements a converting module for converting the signals into coordinates of points defining a model surface modelling a three-dimensional model of a three-dimensional surface of the heart chamber and coordinates for the position of the catheter within the heart chamber; a processor configured to compute an unfolded model by applying a transformation to the points of the model to transform each of the points to a corresponding point of an unfolded model; and a display for displaying a view of the unfolded model.

Further disclosed is a method of visualising a catheter within a three-dimensional model of a three-dimensional surface of a heart atrium with a catheter in the atrium, the method comprising: obtaining the model, wherein the model is defined by points on a model surface modelling the surface, and wherein the model comprises catheter points defining a position of a distal end of the catheter inside the model surface; applying an unfolding transformation to points of the model, including the catheter points, to transform each of the points to a corresponding point of an unfolded model; and causing display of a view of the unfolded model, wherein the view of the unfolded model includes a marking at the transformed catheter points, the marking being indicative of the position of the distal end of the catheter.

In some embodiments, the method further comprises: obtaining new catheter points defining a new position of the distal end of the catheter inside the model surface; applying the unfolding transformation to the new catheter points; and causing display of a view of the unfolded model, wherein the marking is moved to be at the transformed new catheter points, the marking being indicative of the new position of the distal end of the catheter. In some embodiments, moving the marking may comprise making it disappear from the old place and appear in the new place.

Further disclosed is a method of assisting a doctor in guiding navigation of a catheter probe inside a heart chamber, the method comprising: obtaining an unfolded three dimensional (3-D) model of the heart chamber with the catheter probe therein, optionally, the unfolded 3-D model having a front surface, facing the model inside of the heart chamber, and a back surface, facing away from the model inside of the heart chamber; generating a first view of the model, the first view showing the model from a first direction; generating a second view of the model, the second view showing the model from a second direction different from the first direction; and providing the first and second views for simultaneous display.

In some embodiments, the method comprises providing the views comprises providing the two views simultaneously to a single display panel.

In some embodiments, the method comprises providing the views comprises providing the two views simultaneously for side by side display.

In some embodiments, the method comprises the first and second directions are perpendicular to each other.

In some embodiments, obtaining the unfolded model comprises: obtaining a folded 3-D model of the heart chamber, and unfolding the folded 3-D model of the heart chamber.

In some embodiments, obtaining of the unfolded 3-D model of the heart chamber comprises: receiving electrical measurements from the catheter probe; and generating the unfolded three-dimensional (3-D) model of the heart chamber based on the electrical measurements received from the catheter probe.

In some embodiments, the method further comprises: generating a third view, showing a partly unfolded 3-D model of the heart chamber, and providing the third view for display for time periods overlapping with time periods during which the first and second views are displayed.

There is further provided an apparatus for assisting a doctor in guiding navigation of a catheter probe inside a heart chamber, the apparatus comprising a processor configured to: obtain an unfolded three dimensional (3-D) model of the heart chamber with the catheter probe therein, facing away from the modeled inside of the heart chamber; generate a first view of the model, the first view showing the model from a first direction; generate a second view of the model, the second view showing the model from a first direction; provide the first and second views for simultaneous display.

In some embodiments, the processor is configured to provide the first and second views simultaneously to a single display panel.

In some embodiments, the processor is configured to provide the views simultaneously for side by side display.

In some embodiments, the processor is configured to obtain the unfolded model by: obtaining a folded 3-D model of the heart chamber, and unfolding the folded 3-D model of the heart chamber.

In some embodiments the processor is configured to obtain the unfolded 3-D model of the heart chamber by: receiving electrical measurements from the catheter probe; and generating the unfolded three-dimensional (3-D) model of the heart chamber based on the electrical measurements received from the catheter probe.

In some embodiments, the apparatus further comprises a display configured to receive the views from the at least one processor and display them simultaneously side by side.

In some embodiments, the apparatus further comprises a catheter probe.

In some embodiments, the catheter probe includes a plurality of electrodes configured to communicate with the at least one processor.

In some embodiment, the at least one processor is further configured to generate a third view, showing a partly unfolded 3-D model of the heart chamber, and providing the third view for display for time periods overlapping with time periods during which the first and second view are displayed.

There is further provided a display panel, displaying a partly unfolded view of a 3-D model of a heart chamber.

There is further provided an apparatus comprising a processor configured to obtain a folded 3-D model of a heart chamber, and partially unfold the obtained folded 3-D model.

In some embodiments, the processor is configured to obtain the folded 3-D model of the heart chamber by receiving electrical measurements from a catheter probe within the heart chamber, and generating the folded 3-D model based on the electrical measurements.

In some embodiments, the apparatus further comprises a user interface allowing a user to indicate a degree of unfolding, and the processor is configured to partially unfold the obtained folded 3-D model to the degree indicated via the user interface.

In some embodiments, the user interface includes an adjustable input element, and when a user adjusts a position of the input element, the folded model is unfolded to a degree depending on the position of the input element. In some such embodiments, the input element may be an on-screen input element.

Also disclosed is a method of displaying relief details distributed across a curved surface, the method comprising: re-distributing the relief details on the curved surface so that the surface is divided to an occupied portion occupied with relief details and a free portion free from relief details; increasing the curvature of the curved surface; and displaying the occupied portion of the increased-curvature curved surface.

In some embodiments, notional lines, each connecting a position of a relief detail before the re-distribution to a position of the relief detail after the re-distribution, don't intersect.

In some embodiment, the curved surface is non-developable.

In some embodiments, the surface area of the occupied portion after the curvature increase is between half and twice the surface area of the entire surface before the curvature increase.

In some embodiments, the curved surface is a model of a surface of a body portion.

There is also provided a method of assisting a physician in carrying out a catheterization process, the method comprising: receiving data from a catheter; generating, based on the data received from the catheter, a 3-D model of a curved surface of a body part, the model comprising relief details distributed across the curved surface; re-distributing the relief details on the curved surface so that the surface is divided to an occupied portion occupied with relief details and a free portion free from relief details; increasing the curvature of the curved surface; and displaying to the physician, during the catheterization process, the occupied portion of the increased-curvature curved surface.

As will be appreciated by one skilled in the art, embodiments disclosed herein may be used to visualize a three-dimensional model of an inner three-dimensional surface of any type of body. For example, the body may be any type of internal organ of an animal or human or of any type of body lumen (e.g. a heart chamber, a blood vessel, a lymph vessel, a bone, membrane, cyst, gastrointestinal tract portion, kidney/urinary tract portion, respiratory tract portion, reproductive tract portion, eye, ear, CNS ventricle, peritoneum, and/or another natural and/or artificial space such as implant surroundings). In embodiments disclosed herein, a heart chamber is used as an example of a particular body to which such a visualization method is optionally applied. However, it should be understood that the technique optionally applies, changed as necessary, to the inner three-dimensional surface of any body or portion thereof. In some embodiments, a representation of an organ exterior surface (e.g., of a heart, liver, kidney, brain, and/or portion(s) thereof such as a right atrium) is flattened.

Unless otherwise defined, all technical and/or scientific terms used herein have the same meaning as commonly understood by one of ordinary skill in the art to which the present disclosure pertains. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system" (e.g., a method may be implemented using "computer circuitry"). Furthermore, some embodiments of the present disclosure may take the form of a computer program product embodied in one or more computer readable medium(s) having computer readable program code embodied thereon. Implementation of the method and/or system of some embodiments of the disclosure can involve performing and/or completing selected tasks manually, automatically, or a combination thereof. Moreover, according to actual instrumentation and equipment of some embodiments of the method and/or system, several selected tasks could be implemented by hardware, by software or by firmware and/or by a combination thereof, e.g., using an operating system.

For example, hardware for performing selected tasks according to some embodiments could be implemented as a chip or a circuit. As software, selected tasks according to some embodiments could be implemented as a plurality of software instructions being executed by a computer using any suitable operating system. In an exemplary embodiment, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well. Any of these implementations are referred to herein more generally as instances of computer circuitry.

Any combination of one or more computer readable medium(s) may be utilized for some embodiments. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments may be described below with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE SEVERAL VIEWS OF THE DRAWINGS

Some embodiments are herein described, by way of example only, with reference to the accompanying drawings.

With specific reference now to the drawings in detail, it is stressed that the particulars shown are by way of example, and for purposes of illustrative discussion of embodiments. For example, although visualization of inner surfaces is described below, the disclosure is equally applicable to other surfaces, for example outer surfaces of a body. In this regard, the description taken with the drawings makes apparent to those skilled in the art how embodiments may be practiced.

In the drawings:

Figure 1A:
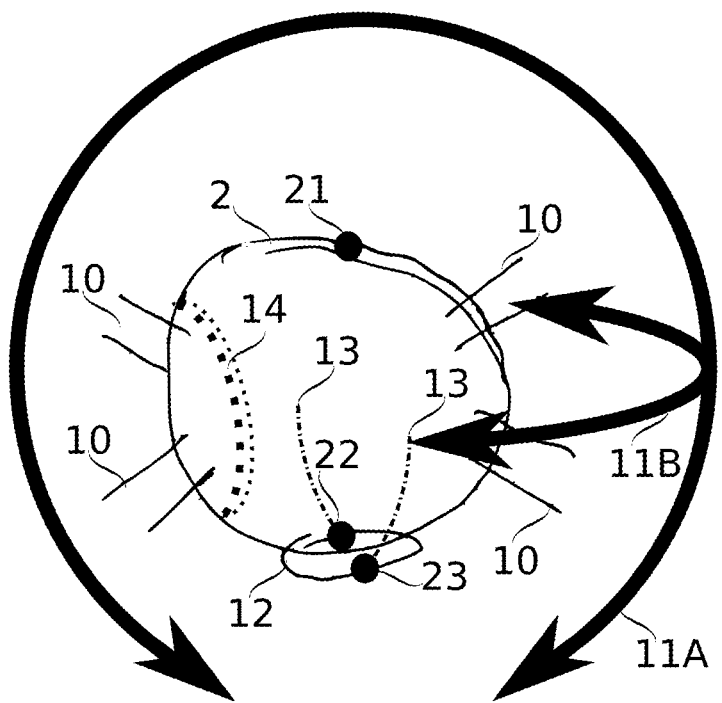

FIG. 1A schematically represents anatomical features of a left atrium represented in its usual 3-D shape, according to some embodiments of the present disclosure.

Figure 1B:
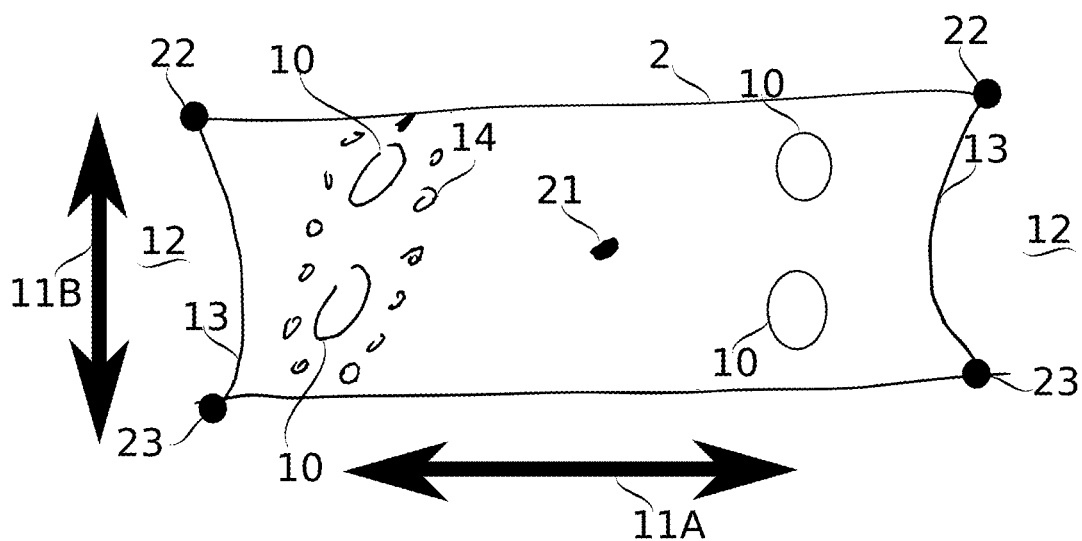
Figure 1C:
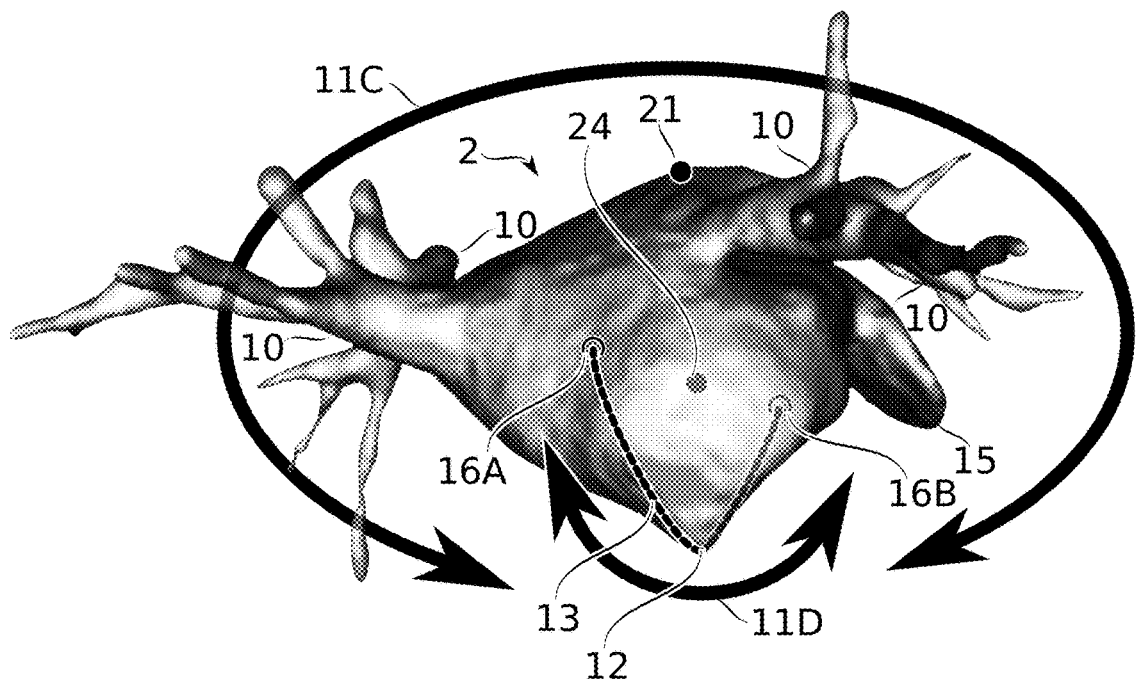
Figure 1D:
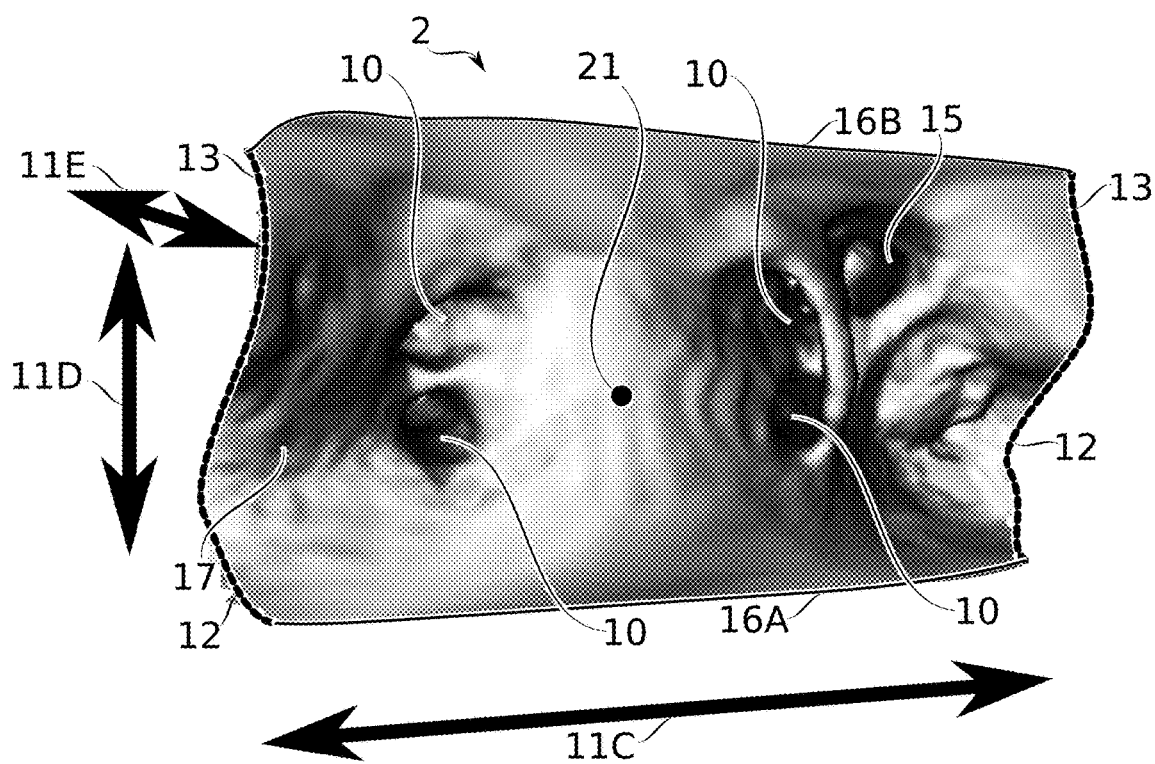
Figure 1E:
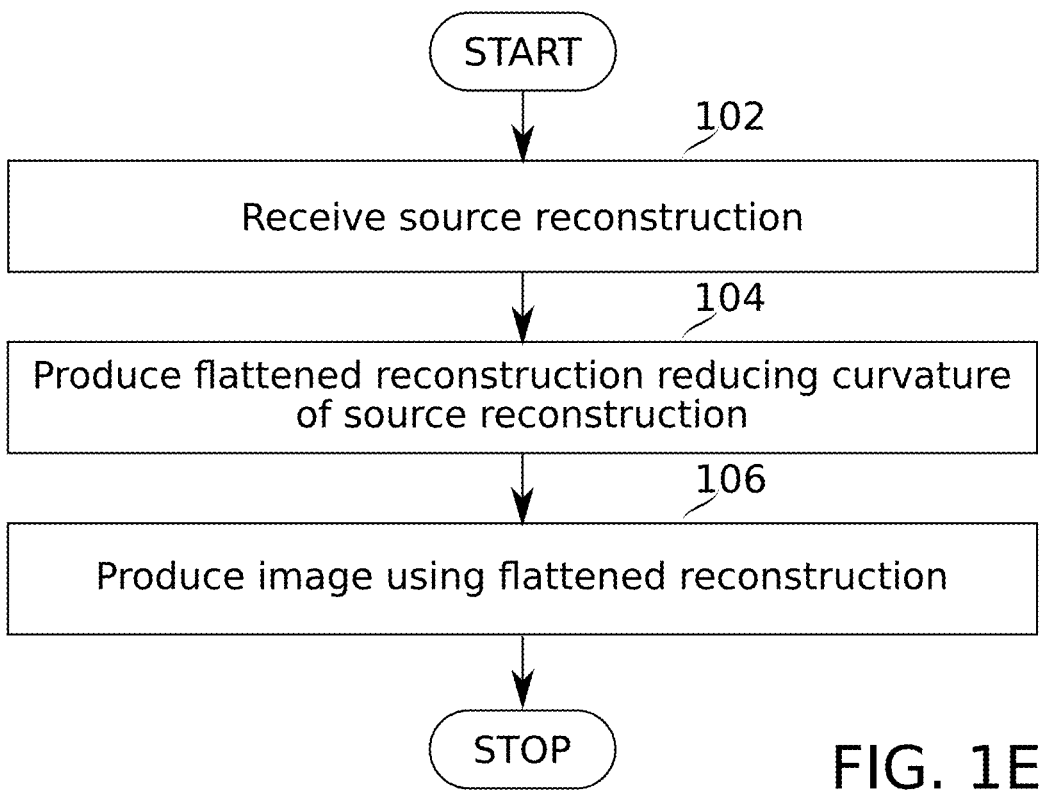
Figure 1F:
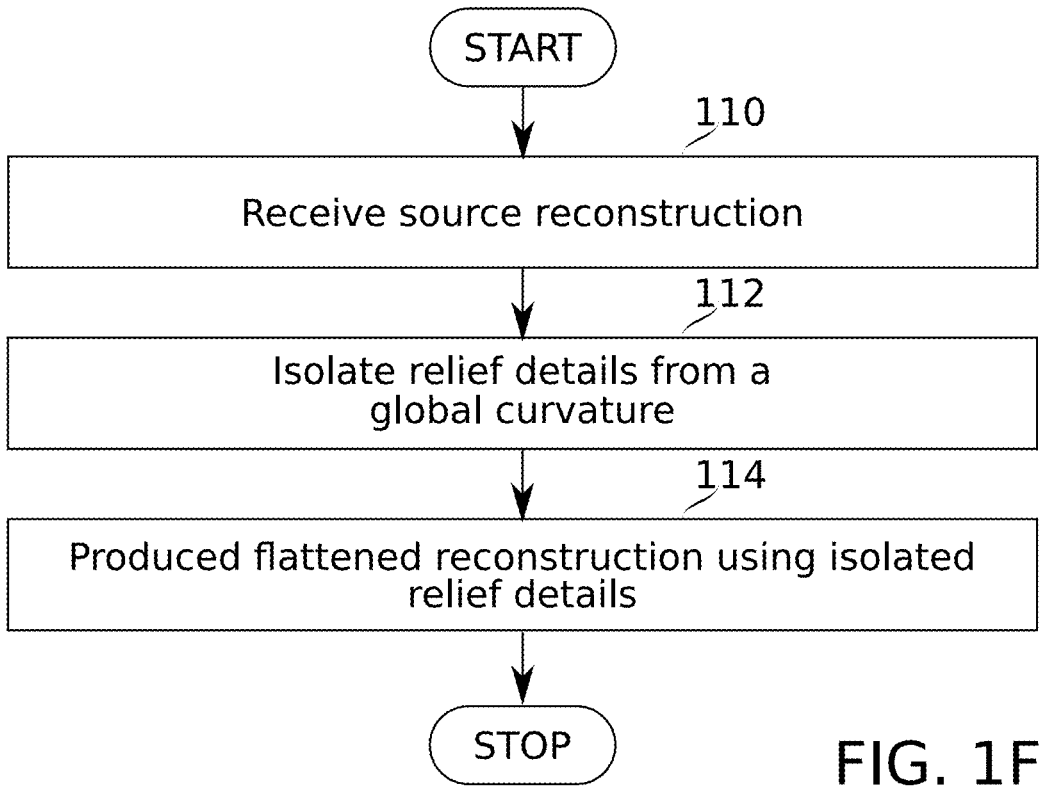
Figure 1G:
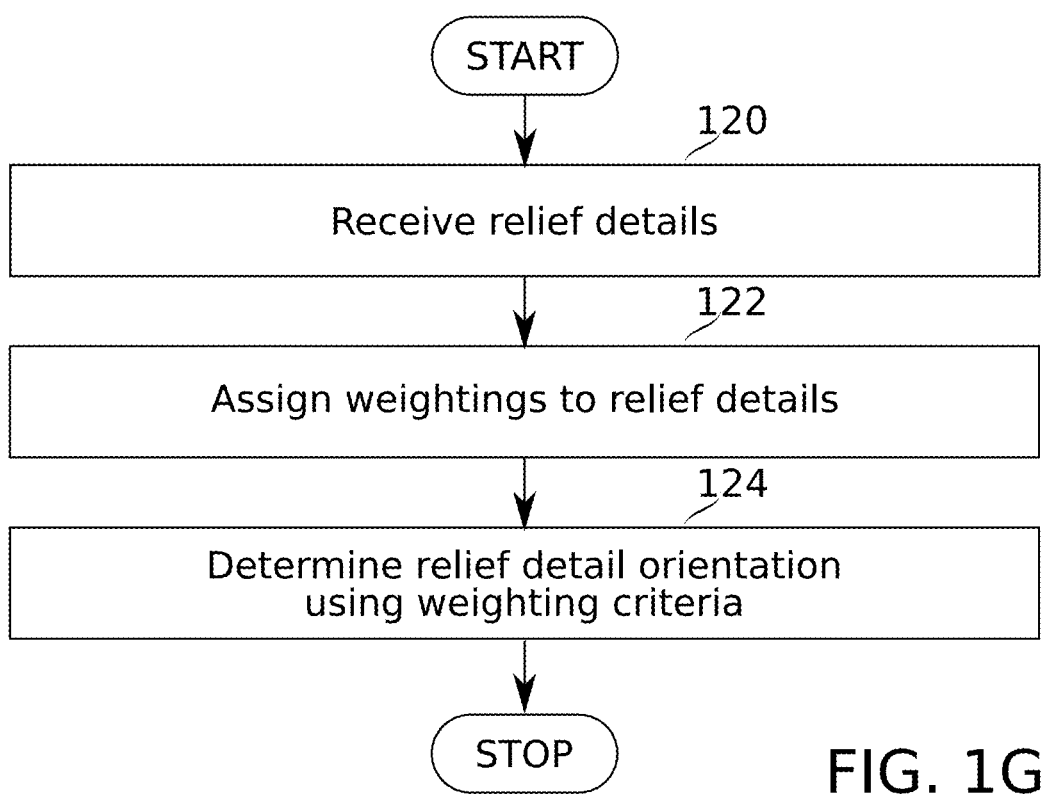
Figure 2A:
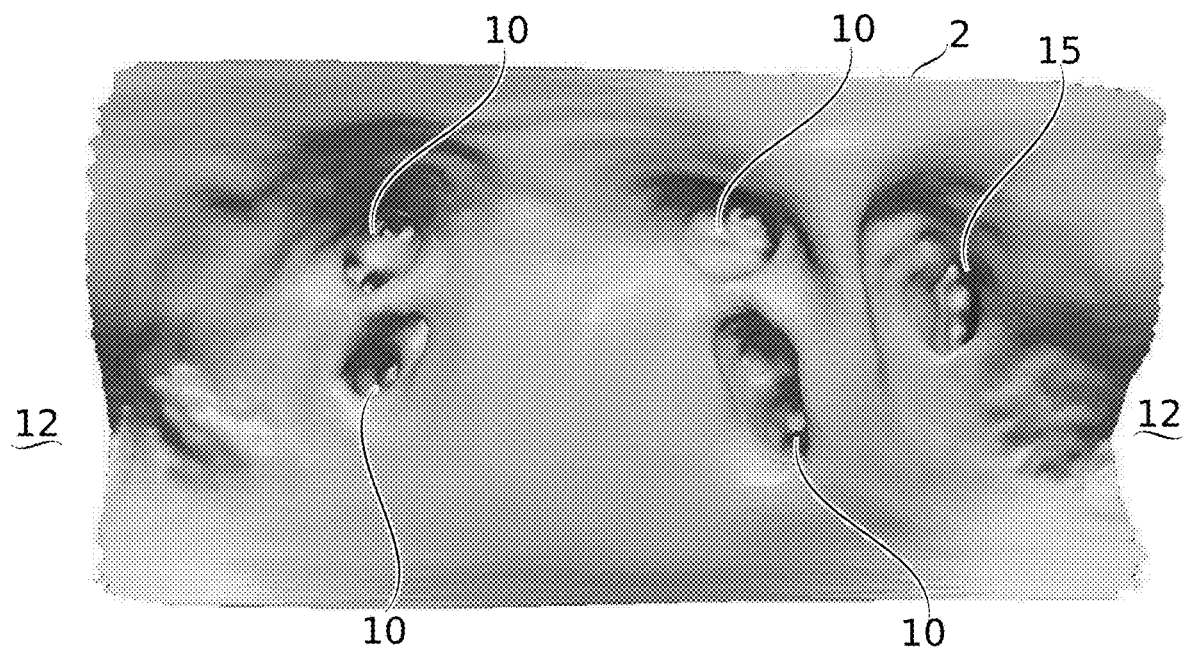
Figure 2B:
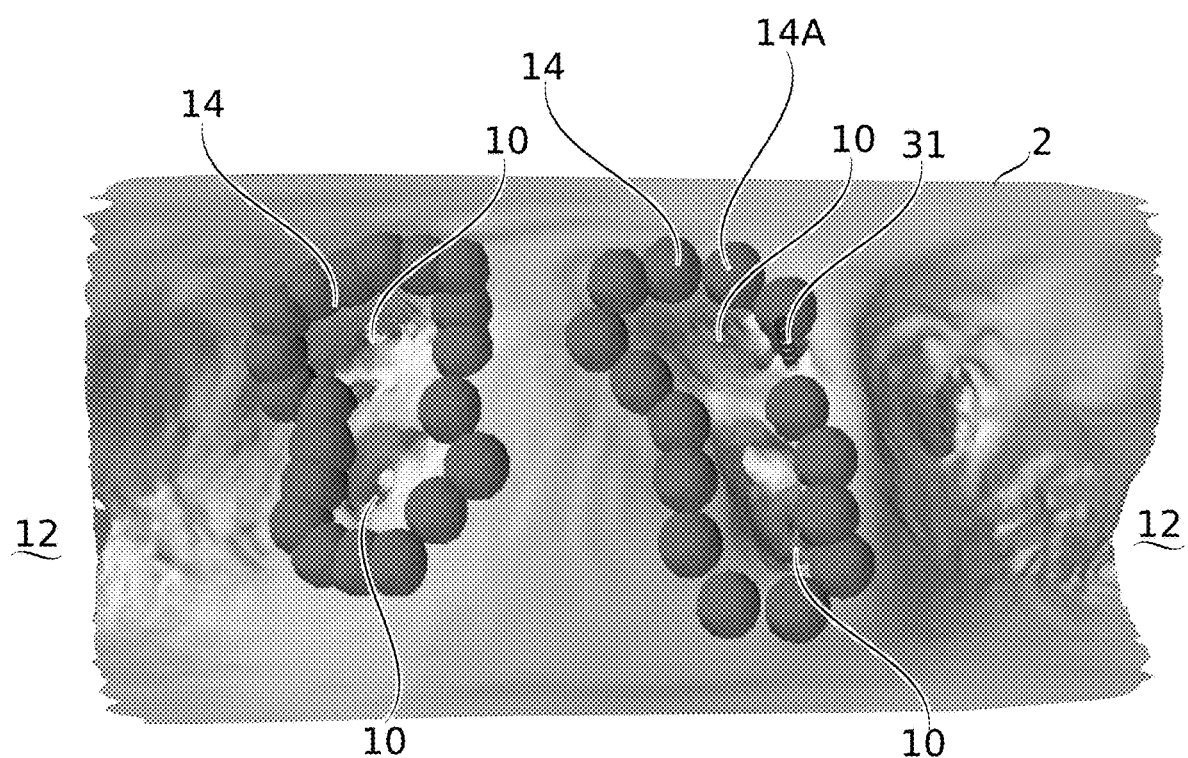
Figure 3:
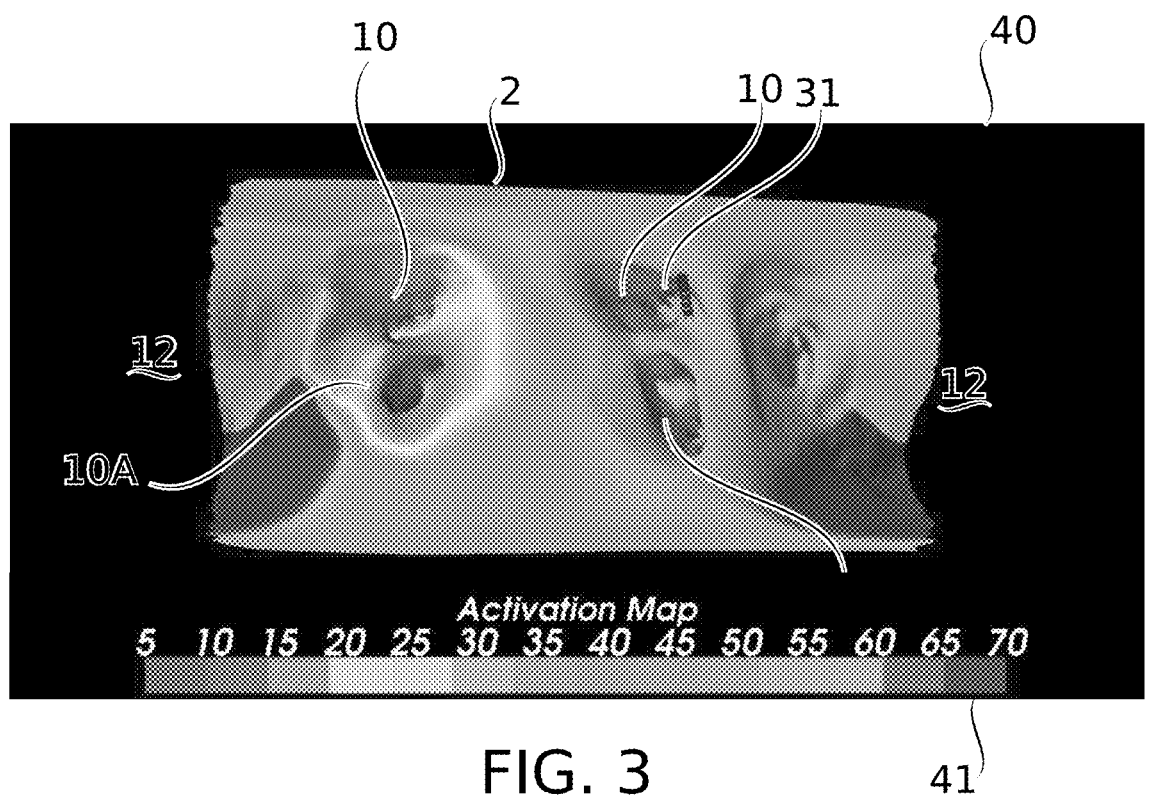
Figure 4:
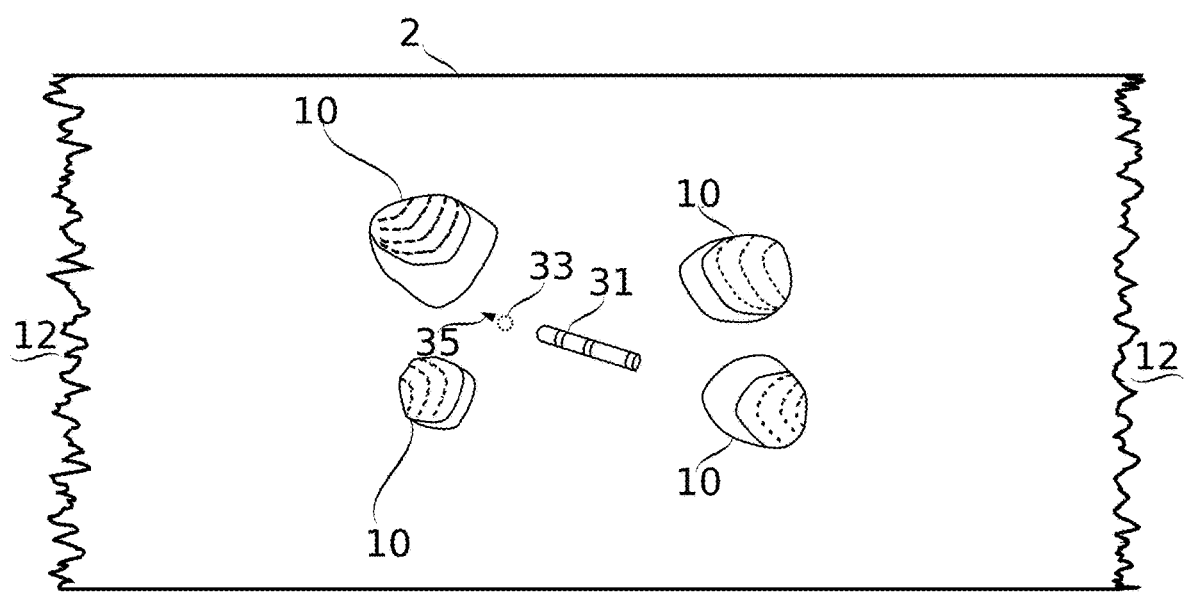
Figure 5A:
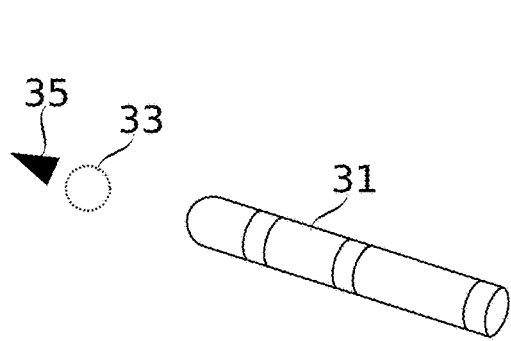
Figure 5B:
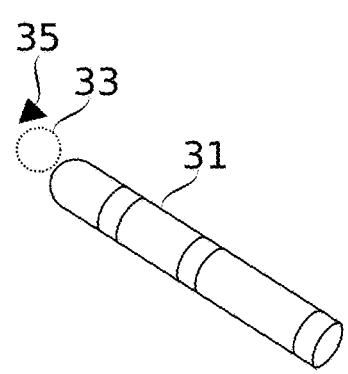
Figure 6A:
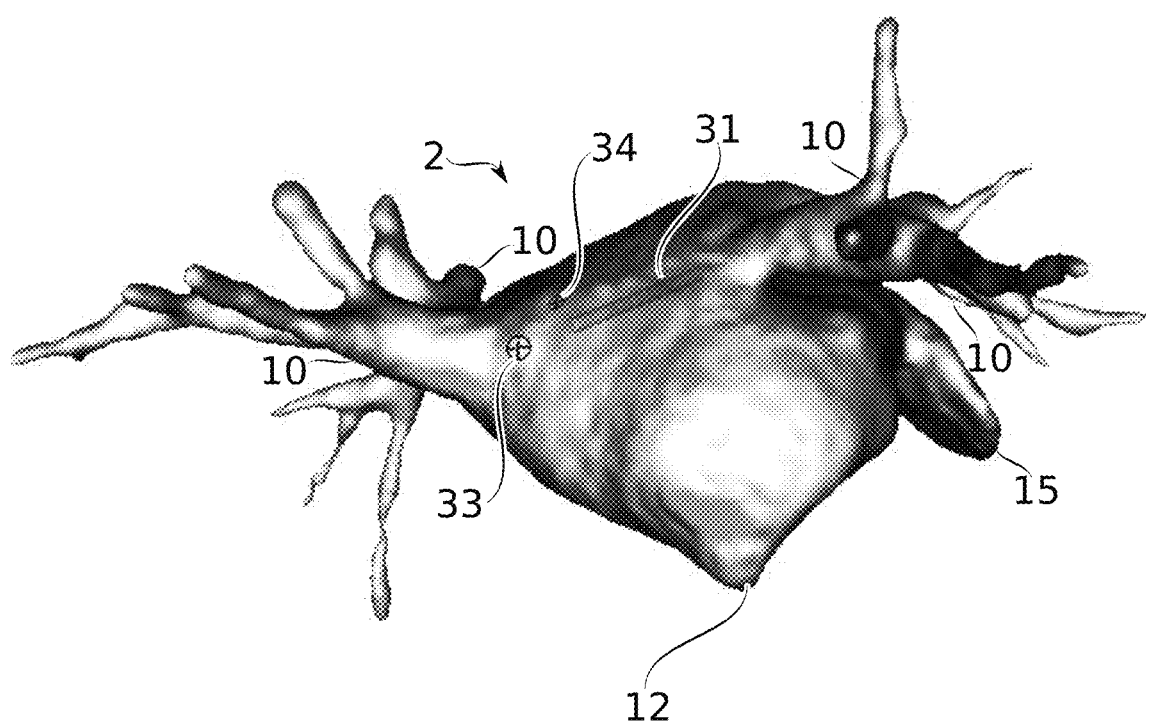
Figure 6B:
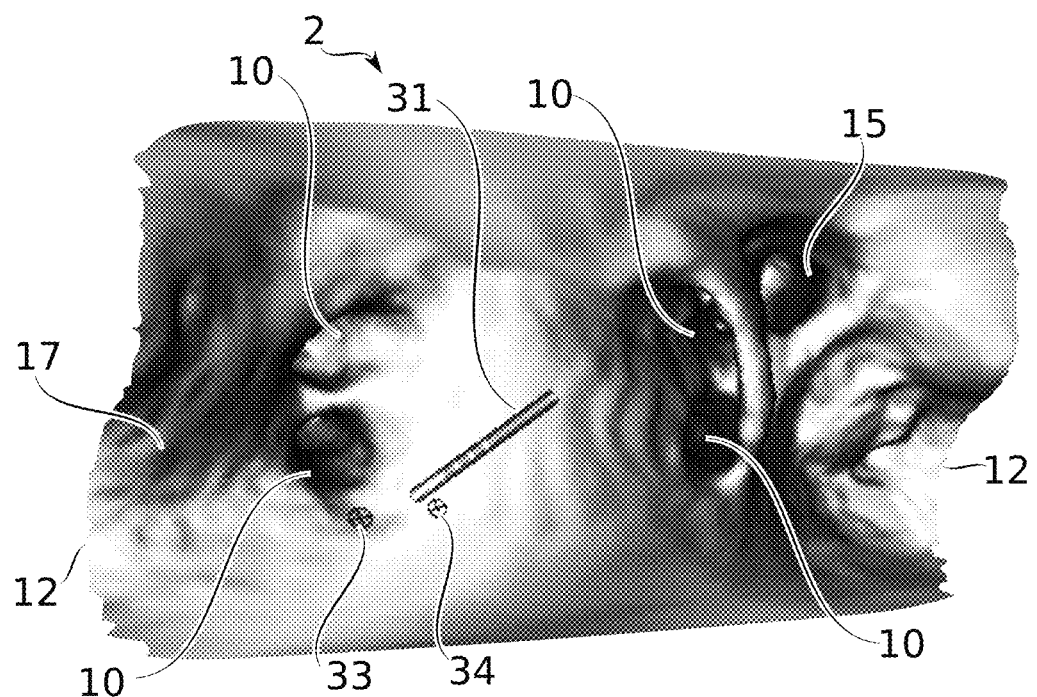

FIG. 1B schematically represents anatomical features of a left atrium spread out into a flattened shape, according to some embodiments of the present disclosure;

FIG. 1C shows a reconstruction of a left atrium inner lumenal surface represented in its usual (un-flattened) 3-D representation, according to some embodiments of the present disclosure;

FIG. 1D is a view of a flattened representation of the source reconstruction of FIG. 1C, according to some embodiments of the present disclosure;

FIG. 1E is a flowchart outlining a method of producing an image of a flattened representation, according to some embodiments of the present disclosure;

FIG. 1F is a flowchart outlining a method of producing a flattened representation, according to some embodiments of the present disclosure;

FIG. 1G is a flowchart outlining a method of determining an orientation of a representation of a curved body organ surface, according to some embodiments of the present disclosure;

FIG. 2A shows a flattened representation view of left atrium anatomy, according to some embodiments of the present disclosure;

FIG. 2B shows the view of FIG. 2A, with additional markers indicating ablation points and catheter probe, according to some embodiments of the present disclosure;

FIG. 3 schematically represents a flattened representation of left atrium anatomy including a superimposed activation map, according to some embodiments of the present disclosure;

FIG. 4 schematically represents a navigational situation of a catheter probe represented as moving with respect to a flattened representation view of a left atrium, according to some embodiments of the present disclosure;

FIGS. 5A-5B schematically represent indications of navigational target, distance from a surface and/or direction of a catheter probe moving with respect to a flattened reconstruction view, according to some embodiments of the present disclosure;

FIGS. 6A-6B show the views of FIGS. 1C-1D, respectively, together within indications of the position of a catheter probe.

Figure 7A:
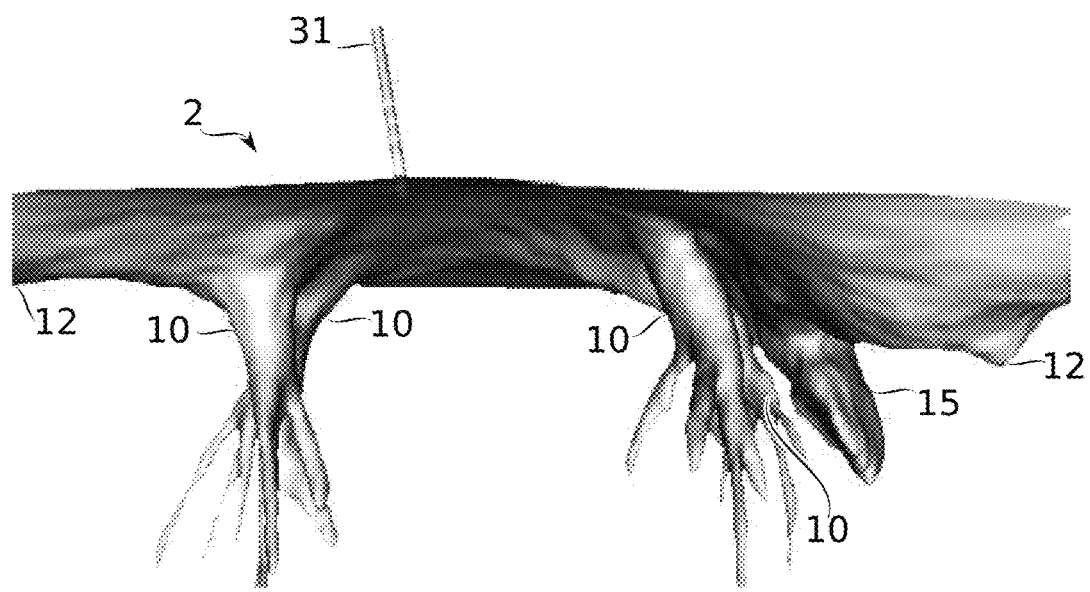
Figure 7B:
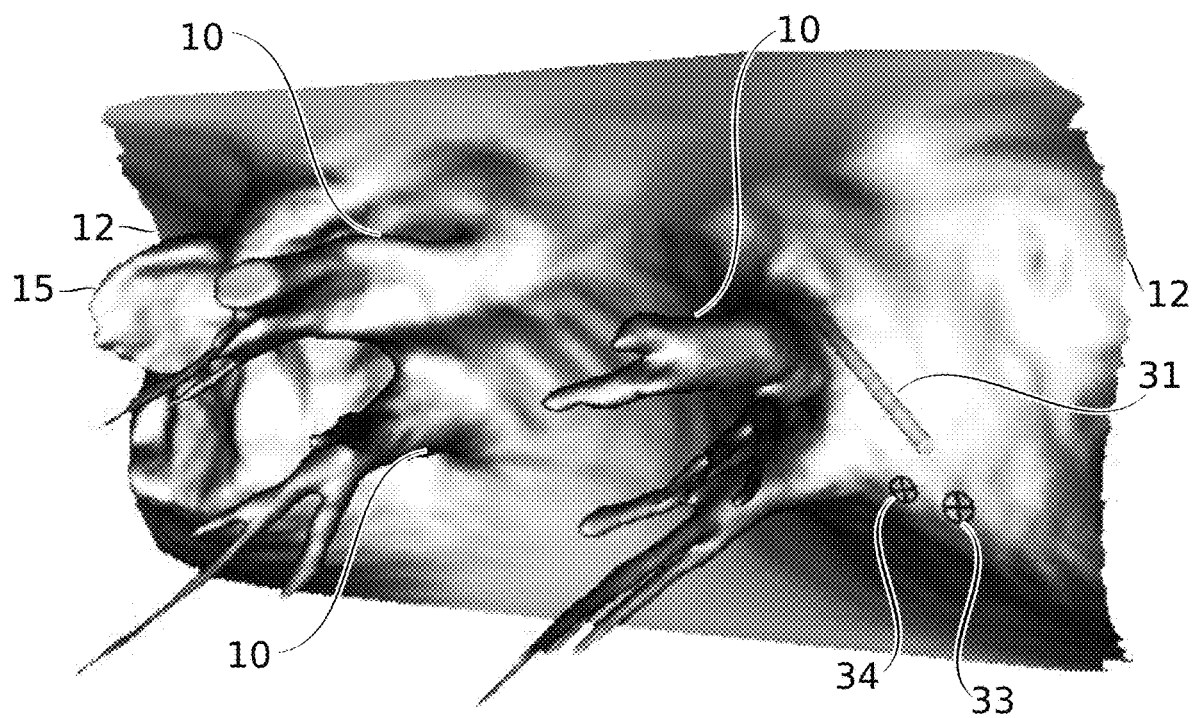
Figure 8A:
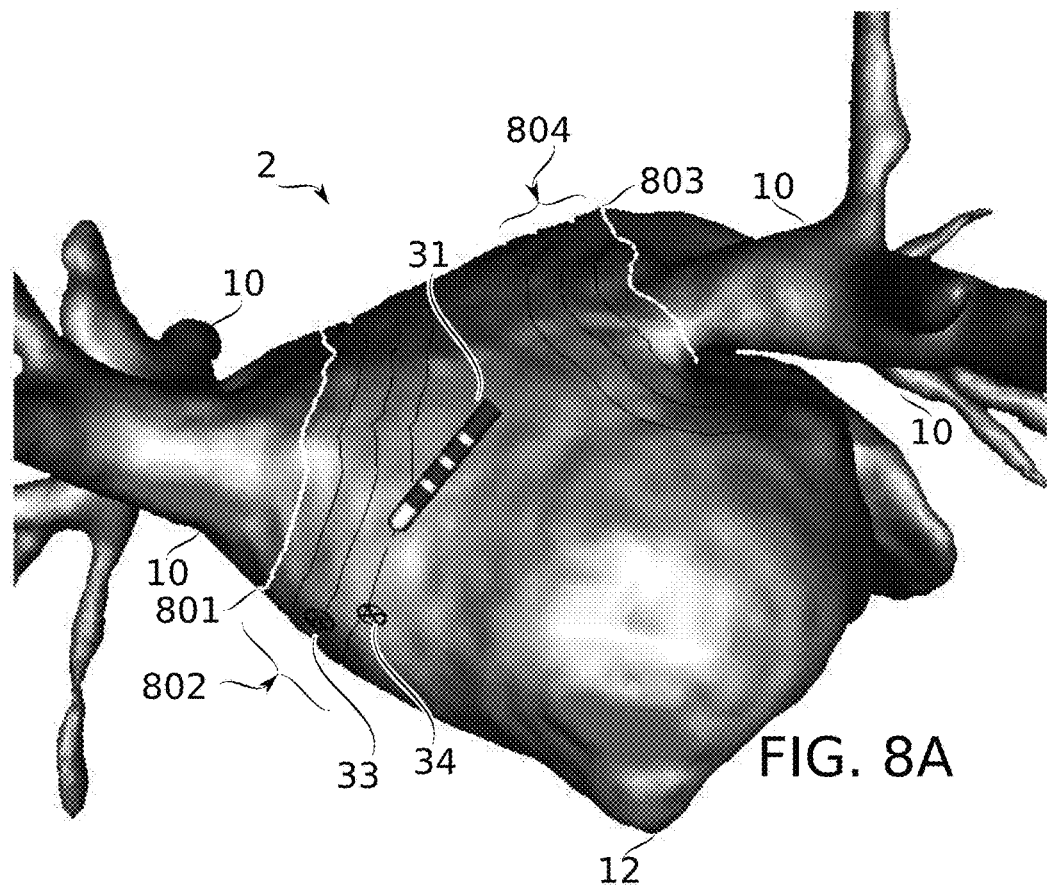
Figure 8B:
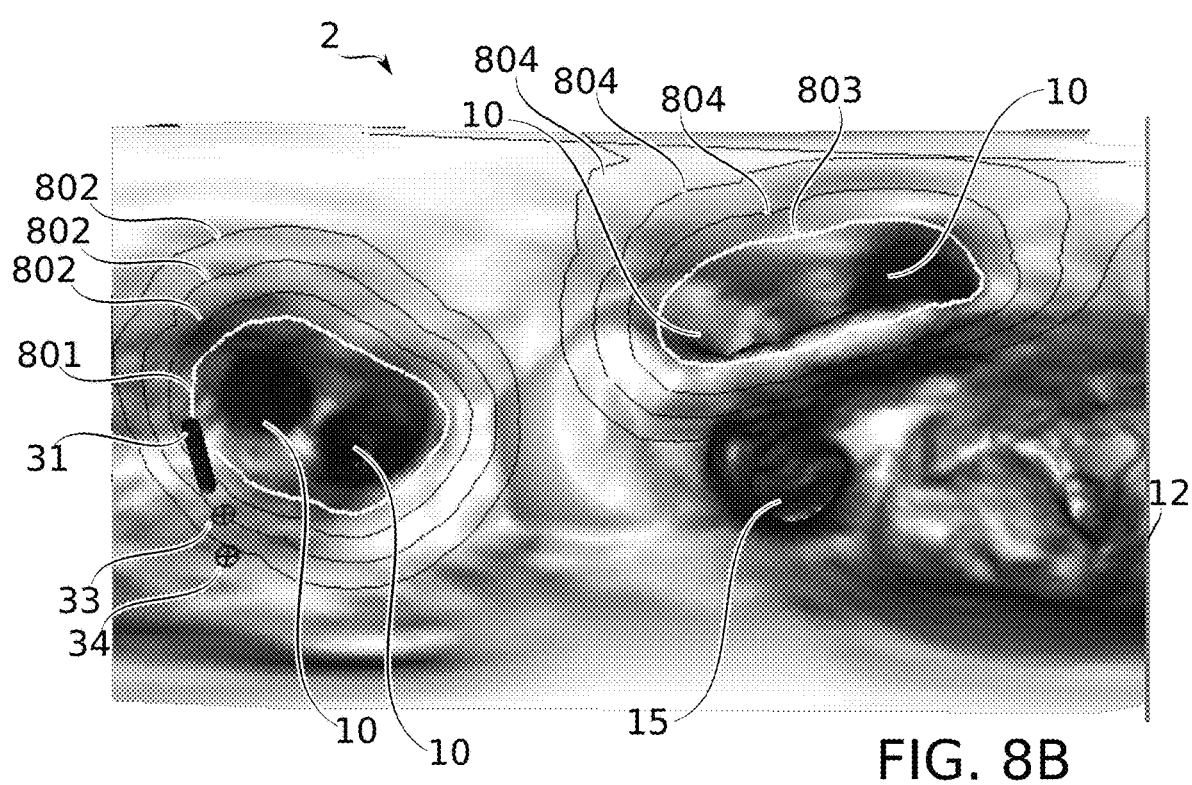
Figure 9A:
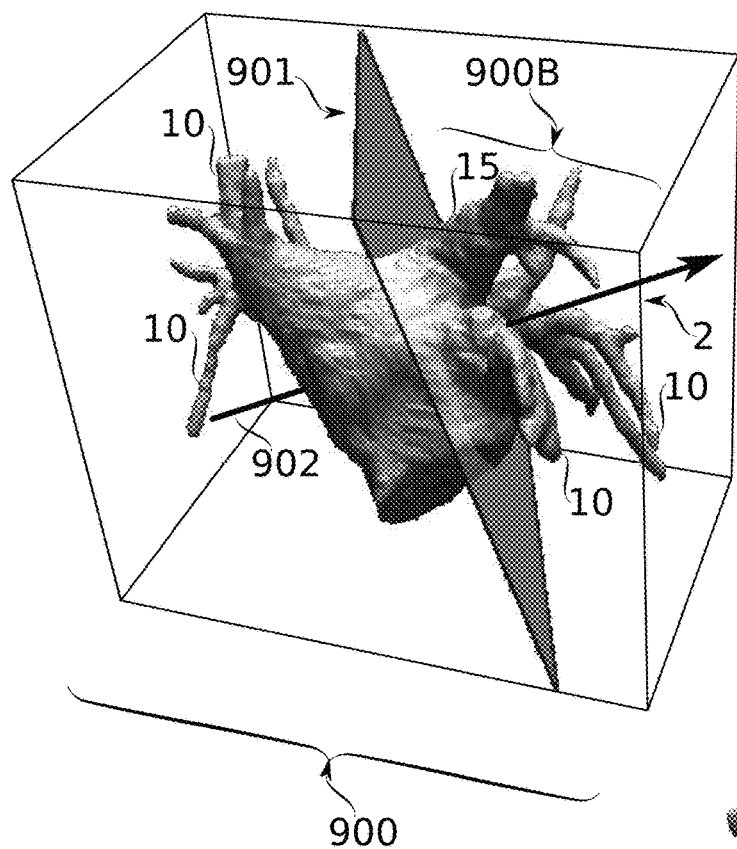
Figure 9B:
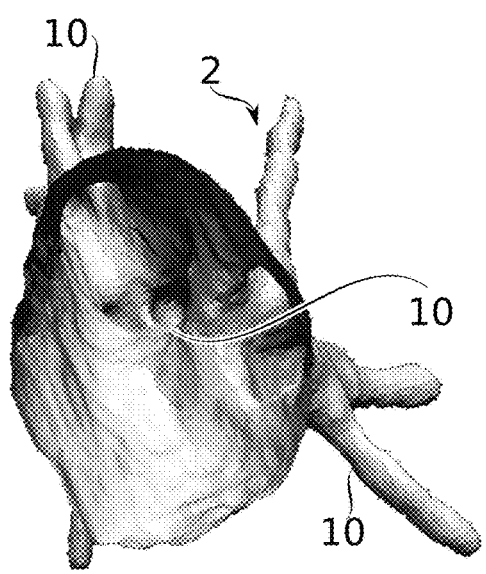
Figure 9C:
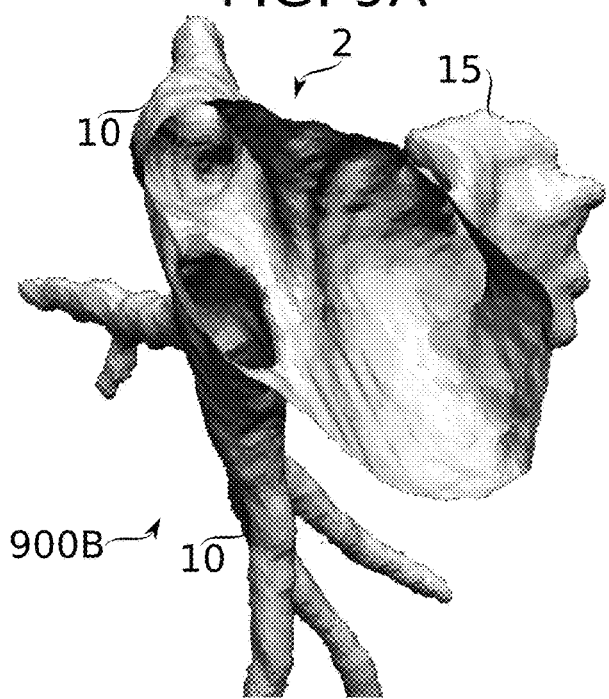
Figure 12:
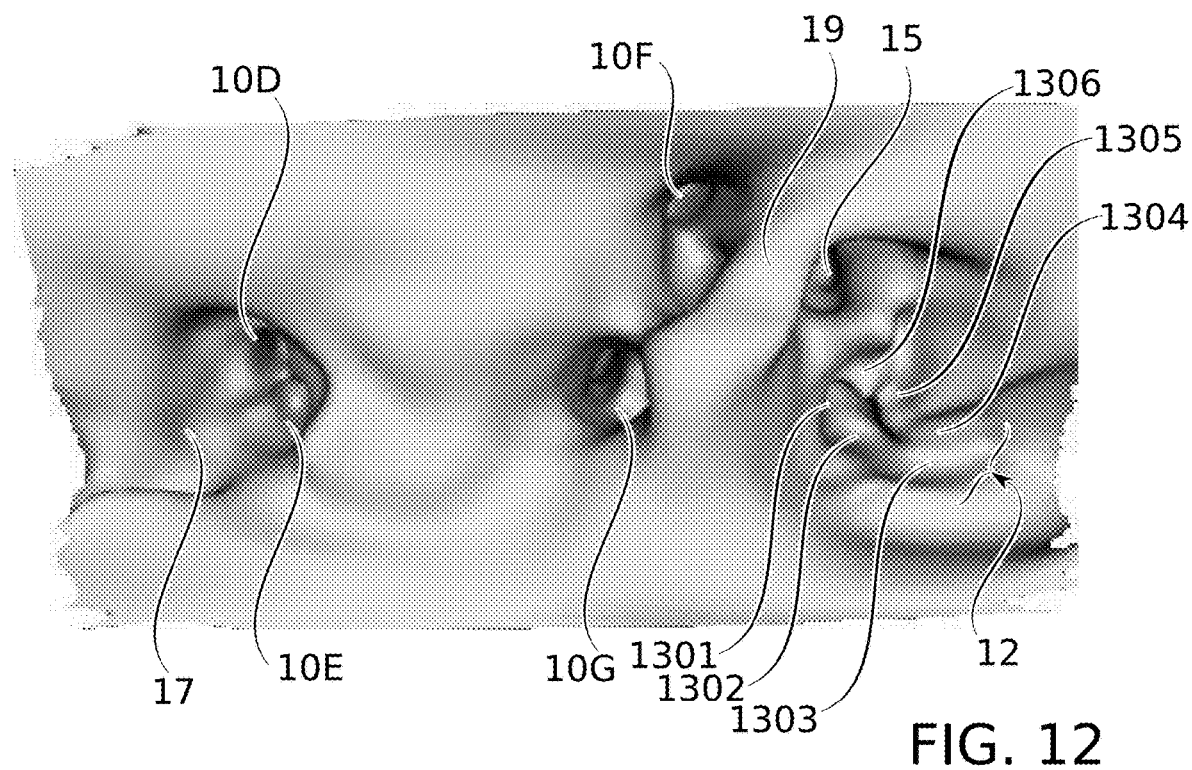
Figure 13:
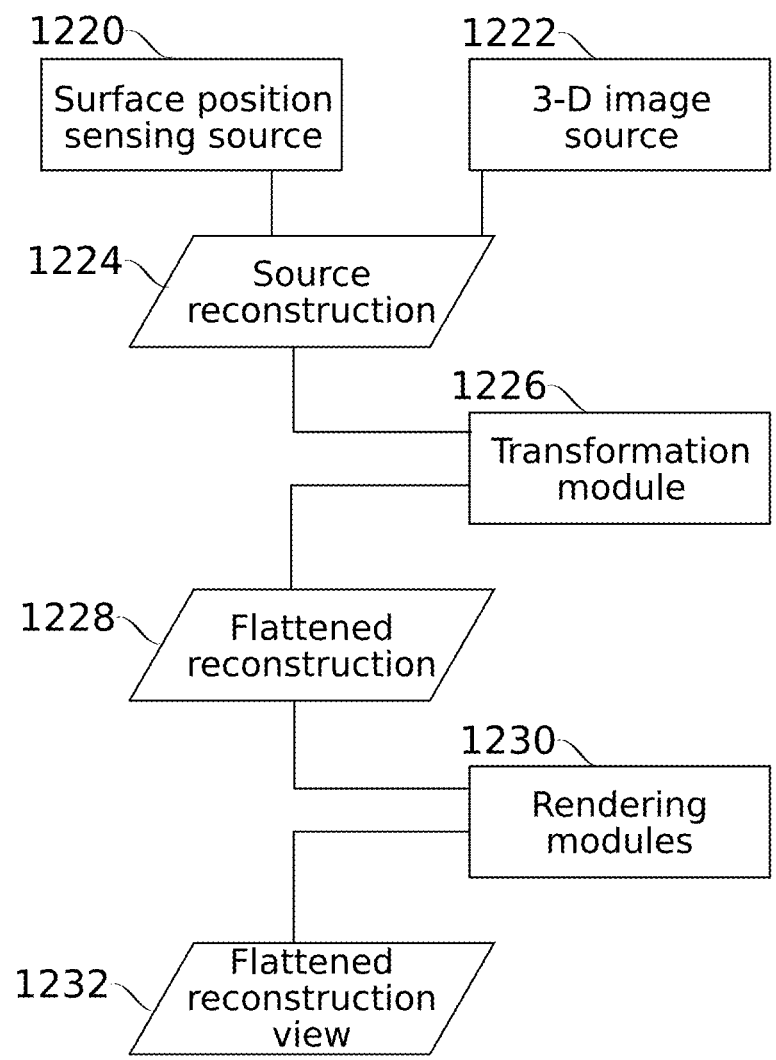

FIGS. 7A-7B show the same flattened representation shown in FIGS. 1D and 6B, viewed at different tilt angles, according to some embodiments of the present disclosure;

FIGS. 8A-8B illustrate a non-flattened and flattened representations of a left atrium having a contour overlay, according to some embodiments of the present disclosure;

FIG. 9A shows a planar sectioning of a 3-D representation of a body part reconstruction, according to some embodiments of the present disclosure;

FIGS. 9B-9C show views looking into the two sectioned parts of body part reconstruction, according to some embodiments of the present disclosure;

FIGS. 10A-10D show a range of standard camera-type views of the interior of a reconstructed left atrium, according to some embodiments of the present disclosure;

FIGS. 11A-11D show different flattened representations of right atria, according to some embodiments of the present disclosure;

FIG. 12 presents a detailed flattened representation of a left atrium based on data acquired using field gradient-based remote imaging, according to some embodiments of the present disclosure;

FIG. 13 schematically represents a system for production of a flattened representation, according to some embodiments of the present disclosure;

FIGS. 14A-14E schematically illustrate different 3-D examples of pre-flattening and post-flattening global curvatures and relief details, according to some embodiments of the present disclosure.

FIGS. 15A-15D schematically illustrate features visible on a flattened representation view of a right atrium (FIGS. 15A-15B) and left atrium (FIGS. 15C-15D), according to some embodiments of the present disclosure;

FIG. 16A illustrates a triangular meshing of the shape of a left atrium, according to some embodiments of the present disclosure;

FIGS. 16B-16E illustrate different flattenings of the triangular meshing of FIG. 16A, according to some embodiments of the present disclosure; and FIGS. 17A-17B each show a sequence of flattened 3-D images produced from earlier-measurement phase maps, and later-measurement phase, more refined maps of body lumen wall structure, based on a cumulative set of intralumenal voltage measurements, according to some embodiments of the present disclosure.

Figure 18:
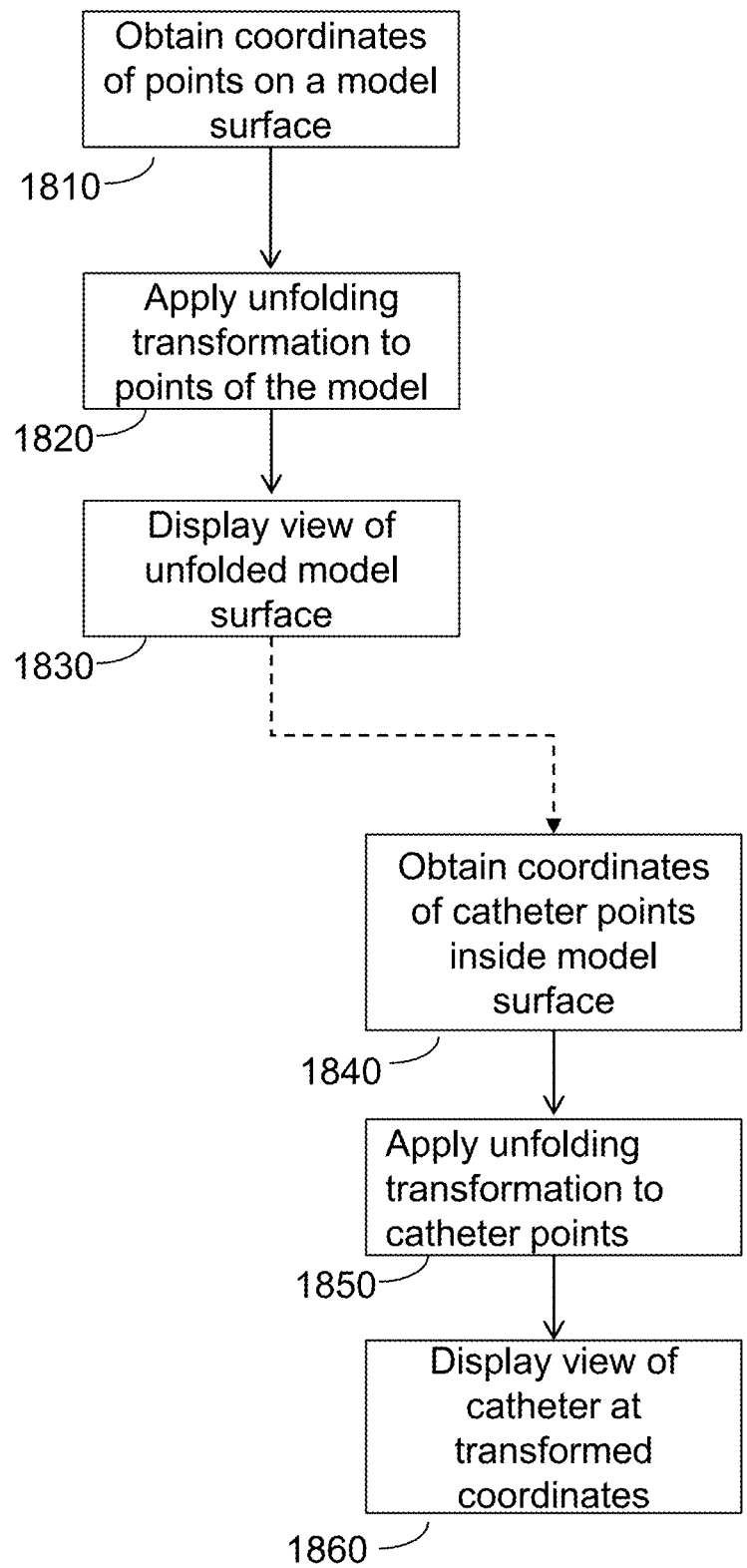

FIG. 18 illustrates a method of visualizing a 3-D model of an inner 3-D surface of a body.

Figure 19:
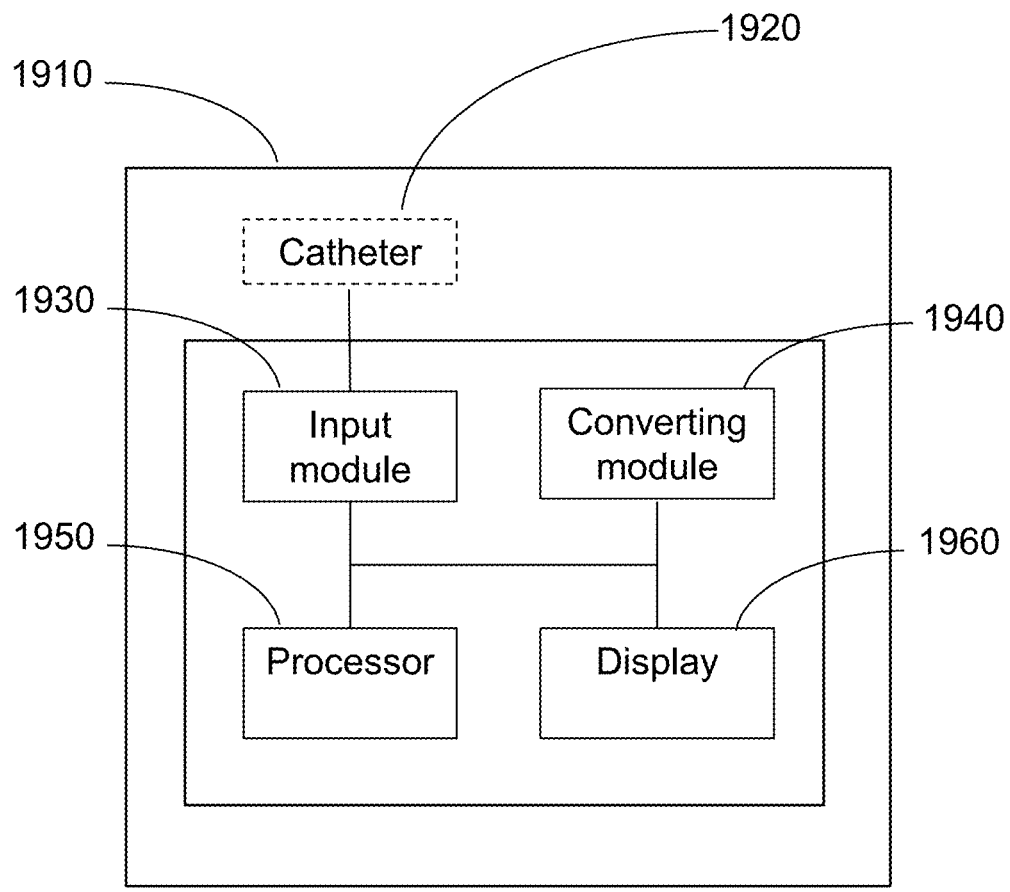

FIG. 19 illustrates an implementation of an apparatus configured to perform any one of the methodologies discussed herein.

Figure 20:
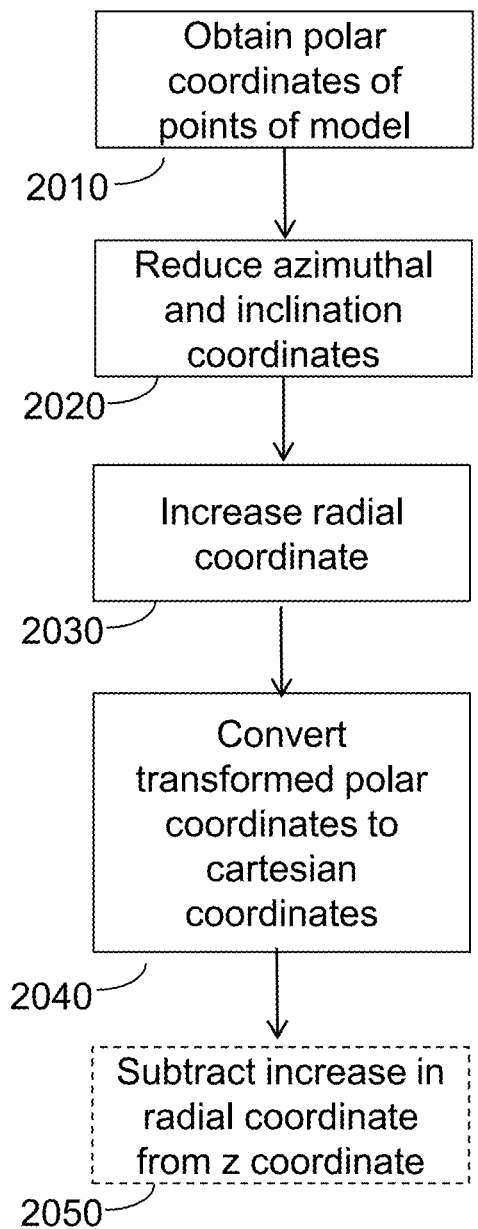

FIG. 20 illustrates an unfolding transformation method for use in visualizing a 3-D model of an inner 3-D surface.

Figure 21:
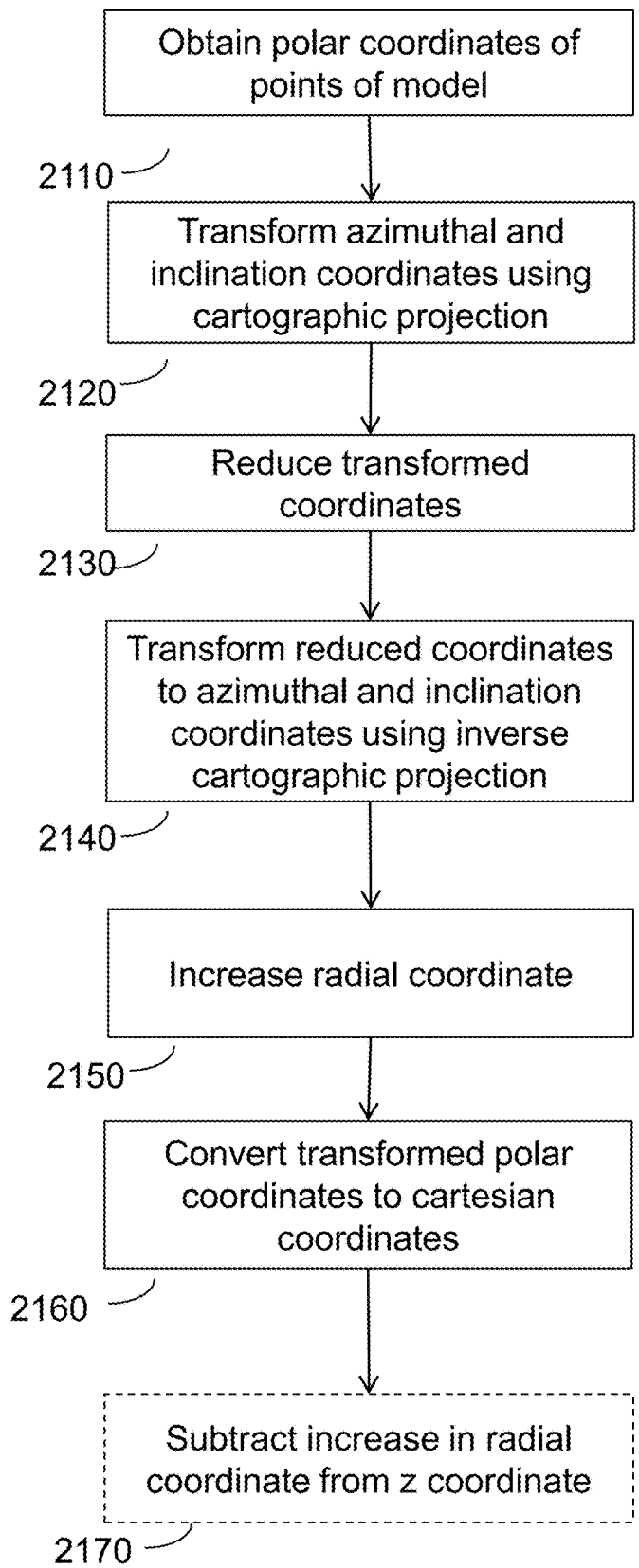

FIG. 21 illustrates a block diagram of an unfolding transformation method for use in visualizing a 3-D model of an inner 3-D surface.

Figure 22A:
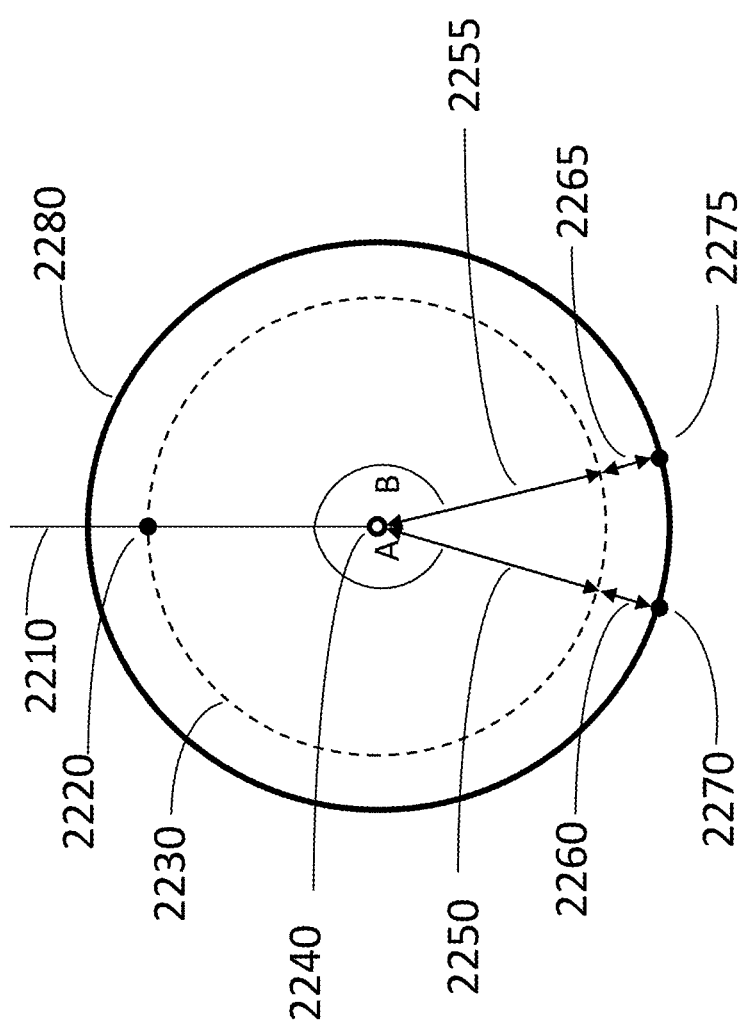
Figure 22B:
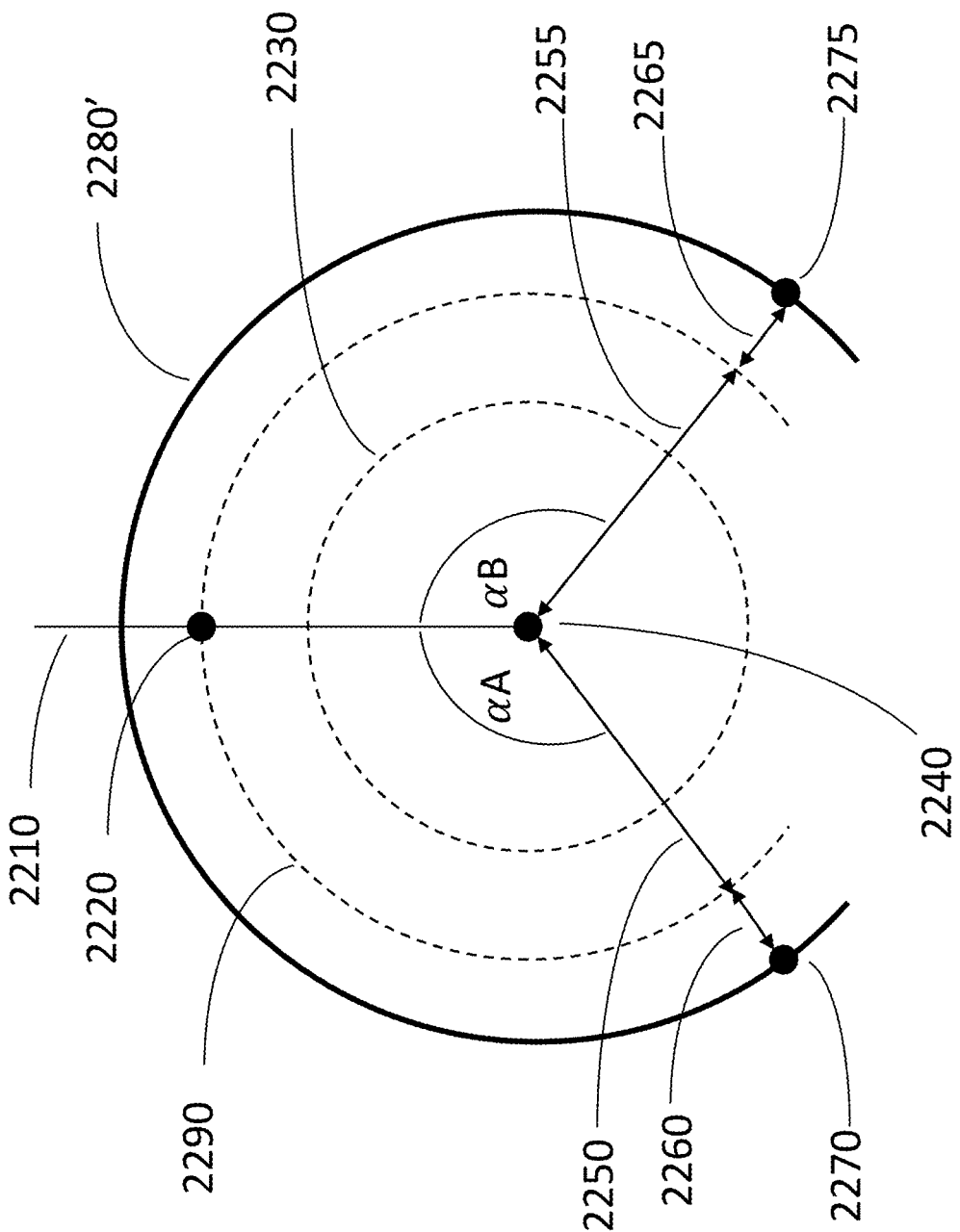
Figure 22C:
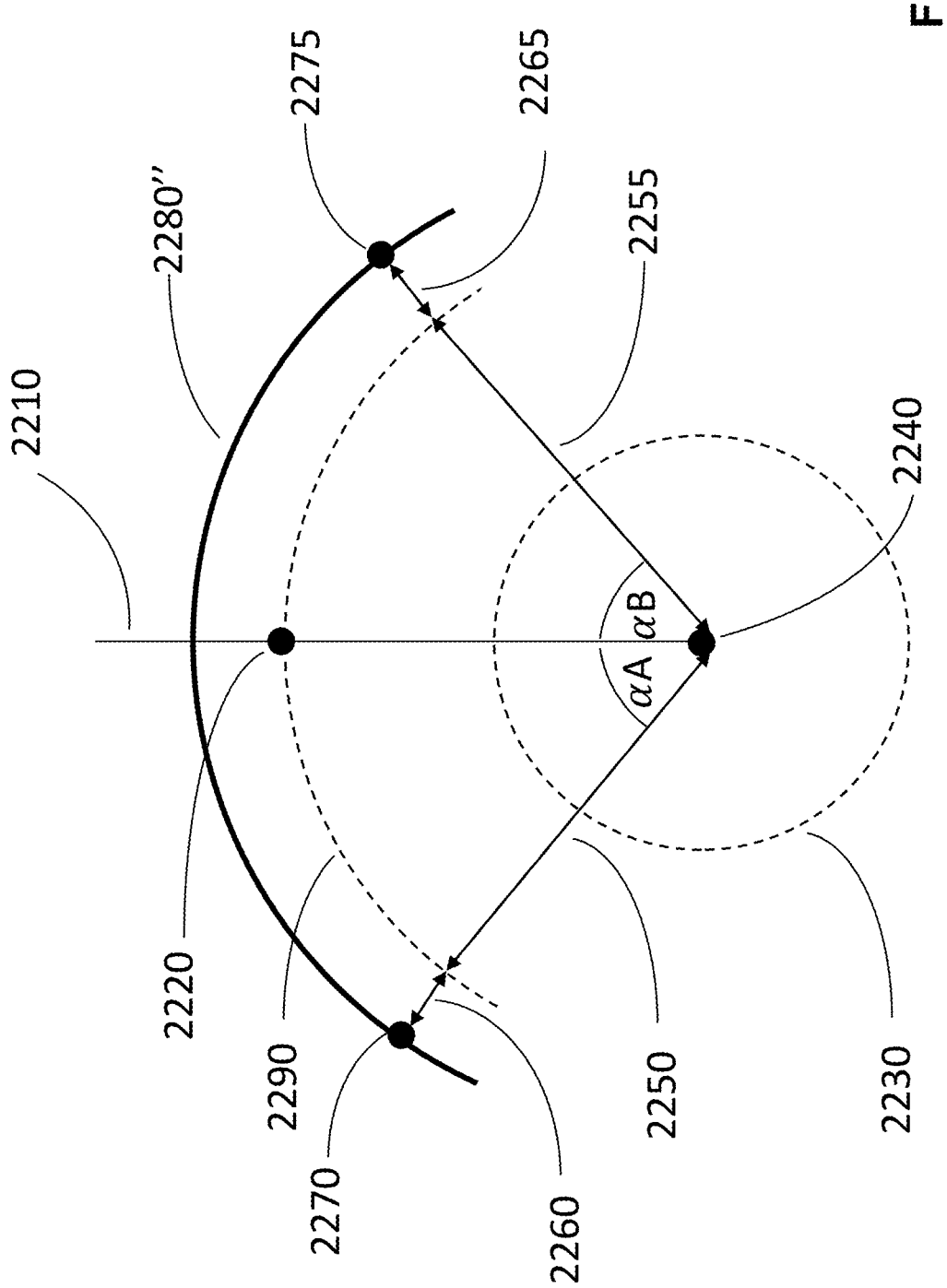

FIGS. 22A-22C illustrate an example of the unfolding transformation illustrated in FIG. 20 for points of the model defined in polar coordinates.

Figure 23:
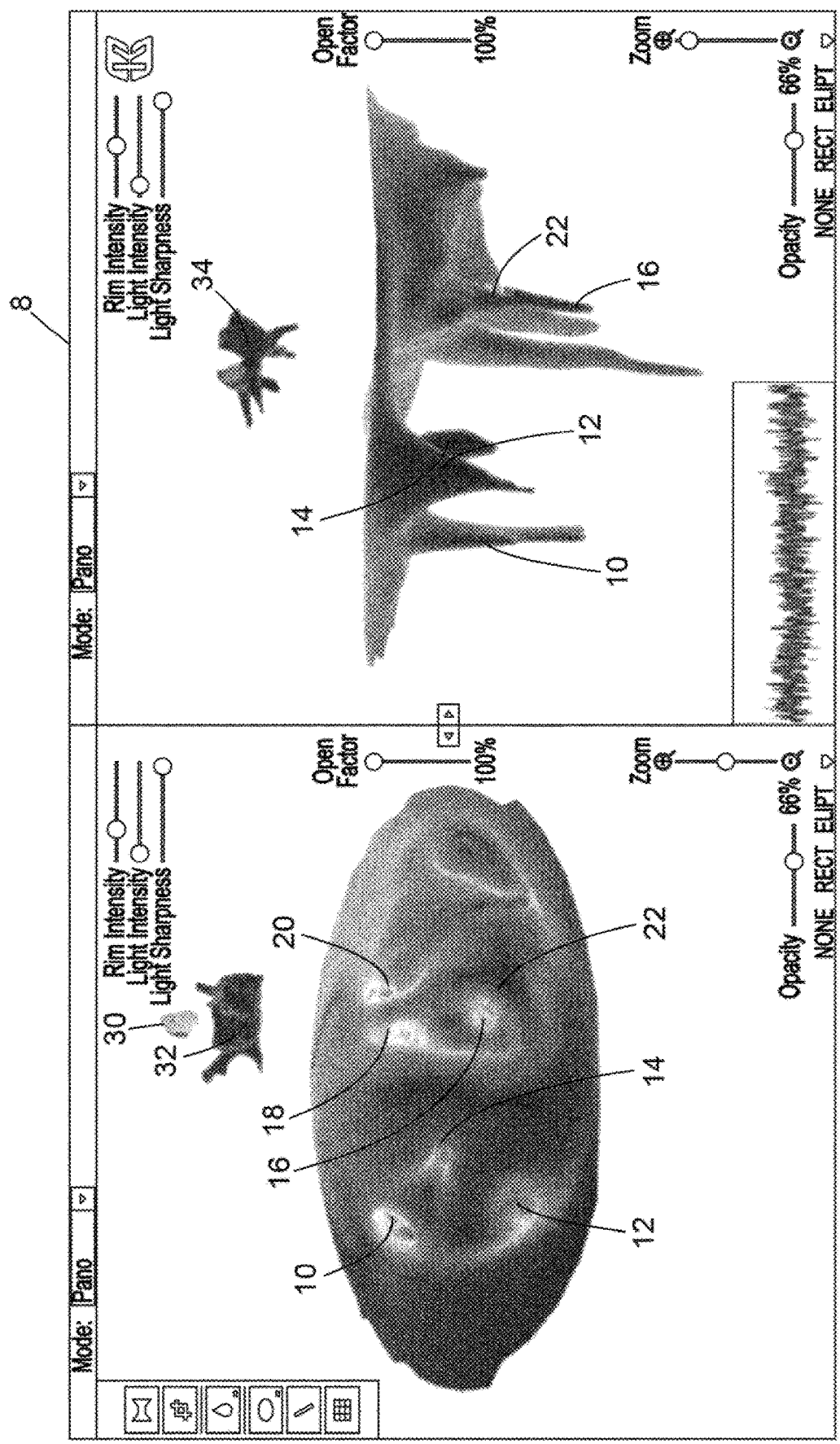

FIG. 23 illustrates an example display of a viewing arrangement of an unfolded model of a heart chamber in accordance with some embodiments of the invention.

FIGS. 24A to 24E show an unfolded model of a heart chamber at five different degrees of unfolding.

DESCRIPTION OF SPECIFIC EMBODIMENTS OF THE INVENTION

Some embodiments of the present disclosure relate to the field of medical procedures using intrabody probes navigable within intrabody spaces, and more particularly, to presentation of data acquired during the course of a catheter procedure.

Overview

An aspect of some embodiments of the present disclosure relates to methods and system for the displaying of flattened representations of tissue surfaces; and in particular embodiments, displays of flattened representations of the interior surfaces of hollow organs (body cavities). Surfaces are optionally presented from one or both of their two sides:

e.g., a represented interior surface of a hollow organ may be presented for viewing from an external side or an internal side of the surface (also referred to herein as "epicardial" and "endocardial" views, respectively). From some viewing angles, a portion of an external view of the internal surface may be viewed along with a portion of an internal view of the internal surface. In some embodiments, exterior tissue surfaces are represented.

In some embodiments, data comprising a 3-D representation (that is, a representation having width, length, and depth) of a curved body tissue surface (e.g., a surface of a body organ or portion thereof) are subject to a geometrical transformation which results in a different representation, which is also 3-D (having width, length and depth), but is potentially better suited to display of the organ surface and optionally a volume defined thereby, substantially within a single view. Herein, the result obtained by such a transformation is referred to as a "flattened reconstruction". A "reconstruction", "3-D representation" or "3-D model" of a shape, as the terms are used interchangeably herein, comprises a data structure stored in computer memory specifying 3-D coordinates of positions defining a surface of the shape.

Moreover, the reconstruction (3-D representation, 3-D model) may be "flattened". This is also referred to herein as "curvature-straightened", "relatively straightened", and "unrolled". Also herein, "reduction" of curvature refers to making a curvature relatively straighter and/or more gradual. In the case of flattened 3-D models, the flattening is in the sense that a surface of the first (or "source") 3-D representation which curves to extend around some reference point and/or path is converted (in the second/modified or "flattened" 3-D representation) to a relatively straightened surface. The transformation is performed so that while a global curvature is relatively straightened (reduced) by the flattening, relief details distributed along the curved surface are retained. Moreover, in some embodiments, the flattening is done so that other positions in the volume of the source 3-D model away from the surface are also transformed, and have corresponding positions within the flattened 3-D representation. In some embodiments, the transformation is 1:1, so that positions in the flattened 3-D model uniquely correspond to positions in the source 3-D model. This may be contrasted, for example, with a 2-D image projected from a source 3-D model, which collapses representation through a range of positions in depth to a single pixel or other 2-D image region. The flattened 3-D model may, however, be converted in turn to an image, such as a 2-D image for viewing. A potential advantage of the intermediate flattened 3-D model, over direct projection of a source 3-D model to an image, is in allowing the surface to be presented in substantially its entirety, while its features retain properties under changes in viewing perspective (e.g., changes of a virtual camera's vantage point) that correspond to how objects normally behave in the visual field of an observer. This may assist a person viewing the changing image to maintain a sense of feature persistence. For example, changes in foreshortening, size, and/or mutual masking behave much as any normal object in the ordinary visual field behaves, so that the relationship among various parts of the flattened 3-D model remains visually clear. In contrast, changing the viewing perspective of a fisheye lens type view (e.g., a view that projects $2\pi$ steradians or more of solid angle view onto a 2-D image) results in patterns of changing distortion (radial compression as features come near the image rim, in particular) which are potentially more disorienting. This may interfere with recognition of features, and/or recognition of features as being the same feature, as the viewing perspective changes. In some embodiments, images generated from the flattened 3-D model are used in real-time applications, e.g., visualization of the navigation of a probe within the modeled space by the placing of an indication at a position within the flattened 3-D model which converts, when an image is made from the flattened 3-D mode, to an indication of the probe position relative to other features in the flattened 3-D model. In better matching the normal behavior of visual objects, the images may potentially help a user to maintain a sense of orientation in the space being navigated.

Optionally, the global curvature targeted for straightening by the flattening is defined by a function such as a sphere, ellipsoid, parametric curve (e.g., Bézier curve), combination of spherical harmonics, and/or long wavelength frequency domain components of a Fourier transform of the surface transformed back into the spatial domain. A surface defined by such a function is also referred to herein as a "surface of global curvature". In some embodiment, the global curvature is at least partially implicit in the choices of coordinate systems used during flattening; for example, in some embodiments, a spherical global curvature is implicit in the choice of a transform that comprises conversion of coordinate values in a spherical coordinate system directly into coordinate values of a Cartesian coordinate system. Herein, the flattening transformation is also referred to as "unwrapping". The term arises in the sense that a surface which curves around some central region in a source 3-D model "wraps around" that central region; and when the flattened 3-D model is created, the same surface is effectively flattened so that the central region is no longer enclosed by it. It should be understood, however, that other regions in the volume of the source 3-D model away from the unwrapped surface are also transformed by the "unwrapping" in some embodiments.

The relief details comprise, e.g., details having distances from the reference point which vary separately from the surface of global curvature. For example, depths of the relief details may add linearly to depths of the global curvature in spherical coordinates or in another coordinate system. The selection of a global curvature for production of the flattened reconstruction (and/or selection of a method of modeling global curvature) is optionally influenced by the structure of reconstruction details (the relief details) which are to be preserved or suppressed: for example, scale and/or shape. Insofar as the global curvature follows the shape of some detail in the source reconstruction, that detail will tend to be suppressed in the flattened reconstruction.

The relief details which are represented by their depth in the flattened reconstruction and/or a view thereof are optionally distorted (at least in some places) by some amount in the dimensions of width, length, and/or depth; for example as a by-product of the transformation used to produce the flattened reconstruction. In some embodiments, width and length in the flattened reconstruction correspond to spherical angle positions in the source reconstruction.

Optionally (e.g., when the source reconstruction substantially surrounds the reference point), the flattening comprises introducing one or more discontinuities, for example "cuts" in the flattened reconstruction compared to the source reconstruction. Optionally, discontinuities are suppressed in the flattened reconstruction and/or a view thereof by duplication, for example, by concatenation of data from another portion of the reconstruction (optionally with reflection or another manipulation) at the edges of discontinuities. Additionally or alternatively, insofar as the flattened reconstruction itself per se is (and/or is part of) a data structure in computer memory, it is not necessarily bound by the limitations of 3-D space. In particular, there is no necessarily inherent contradiction in the flattened reconstruction being represented in memory as both flattened and circumferentially continuous in all directions (e.g., structured as one or more circular linked lists, giving the data structure spherical, toroidal, infinite planar, or another type of logically continuous topology). However, at some stage during preparation of a viewable image, at least one discontinuity will generally be introduced so that the image itself can be flat, or at least contained within a limited viewing angle (in contrast, for example, to an immersive and 360-degree, $4\pi$ steradians surrounding image such as may be obtained using some virtual reality display devices). For convenience of discussion, the examples herein assume that cuts are introduced during the procedure of producing the flattened reconstruction. In some embodiments, the discontinuity is introduced such that it separates (by being introduced between) two portions of the flattened 3-D model which correspond to two different and adjacent portions of the curved body tissue surface before the transformation.

The resulting flattened reconstruction, and/or a view thereof may be considered as "quasi 2-D"; with the understanding that "quasi" indicates that a 3-D representation of relative feature depth (e.g., distance from a reference point) is retained.

In some embodiments, a "view" of a flattened reconstruction comprises a 2-D or 3-D image showing the flattened reconstruction. The view is optionally considered as either of the image as such (e.g., a digital image in computer memory), and a display and/or other representation (e.g., a printout and/or 3-D printed object) of the image.

It is noted that the flattened reconstruction may, in some embodiments, be produced piecewise as a set of intermediate results by applying a function iteratively to portions (e.g., individual data points) of the source reconstruction, e.g., in the course of producing an image or another view showing the flattened reconstruction. In such embodiments, the flattened reconstruction is not necessarily stored in computer memory all at once. For purposes of the descriptions and claims herein, the aggregate of intermediate results in such embodiments also should be considered as comprising a "flattened reconstruction", and also equivalent to a storage in computer memory of a flattened reconstruction (wherein the scope of the term "computer memory" includes on-board processor registers), albeit optionally serially. Any given intermediate result of producing the flattened reconstruction should also be considered as comprising a "flattened reconstruction" and a storage in computer memory of a flattened reconstruction, albeit a partial one.

The relative flattening, in some embodiments, creates a substantially flat surface (that is, of practically zero curvature, or curvature much smaller than the source reconstruction had). In some embodiments, the flattening retains some global curvature. Optionally, a measure of the flattening may be expressed as an increase in the radius of a sphere which best fits (e.g., minimizes average distance to) the flattened reconstruction, compared to the best-fit sphere for the source 3-D representation of the surface. The radius increase is determined for substantially unchanged sizes of surface features (e.g., the same on average). In some embodiments this radius increase is at least a factor of 2, and preferably at least a factor of 5. Optionally, the best-fit sphere for the source 3-D representation is considered to define the global curvature which is relatively flattened.

The curved body tissue surface extends, in some embodiments, at least 135°, 180°, 270°, and preferably 360° around the reference point. The reference point should be understood near the middle of (e.g., within the central 50% of) a volume around which the curved body tissue extends. For example, for purposes of determining angular extent of the curved surface: the curved surface, in some embodiments, is best-fit by a sphere having a radius smaller than about twice the minimum distance between the surface and the reference point. Additionally or alternatively, the reference point around which the curved surface extends is located within the best-fit sphere having a radius r, at a distance less than r/2 from the center of the best-fit sphere.

In some embodiments, a flattened reconstruction is flattened over a large region of a complete source reconstruction (e.g., at least 70%, 80%, 90%, 95%, or another fraction of the surface in the source reconstruction—that is, the shape of the surface—optionally covering at least $2\pi$, $2.5\pi$, $3\pi$, $3.5\pi$ or $4\pi$ steradians of solid angle from a reference location within the source reconstruction). Modeling in the flattened 3-D model may comprise substantially all of the shape of the surface of a body cavity represented in the source 3-D model. The flattened reconstruction view is optionally of the whole flattened reconstruction, and/or of any suitable portion of the flattened reconstruction (e.g., less than 70%, less than 50%, or another fraction). Optionally, the view zooms up to a particular feature such as a pulmonary vein ostium, or even is adjusted to viewpoints from within the relief details (e.g., blood vessels) themselves. In some embodiments, a region within the flattened reconstruction which is particularly targeted for display with low angular and/or distance distortion comprises a plurality of regions (optionally contiguous or separate) spaced from each other (in a corresponding source reconstruction, and with respect to a reference point) by at least 90°, at least 120°, at least 135°, at least 150°, or at least another angle.

In some embodiments, distortion of distances within the targeted region (e.g., in the flattened reconstruction itself, and/or comparing two features of identical size in corresponding views of curved and flattened reconstructions) comprises relative distance distortions of less than about 1%, less than about 3%, less than about 5%, less than about 10%, less than about 8%, or less than another larger, smaller, and/or intermediate number. In some embodiments, distortion of angles within the targeted region (e.g., differences of represented angle for lines running parallel to each other in a corresponding 3-D field of view) comprises angular distortions of less than about 1°, less than about 3°, less than about 5° less than about 8°, less than about 10°, or less than another larger, smaller, and/or intermediate angle. In some embodiments, at least 70%, 80%, 90%, 95%, 98%, or another amount of total angular and/or distance distortion (e.g., relative to a reference size and/or angle chosen from within the target region) is concentrated outside of the target region. In some embodiments, the relative concentration of total angular and/or distance distortion (average distortion per unit area with respect to a reference size and/or angle chosen from within the target region) is in a ratio of at least 4:1, 5:1, 10:1, 20:1, or at least another ratio, with the target area having the smaller relative concentration of distortion compared to regions outside the target area. In some embodiments, the targeted regions themselves subtend (in total area, whether or not contiguous) at least 15%, 25%, 33%, 40%, 50%, or another fraction of the total represented area in the flattened reconstruction view.

In some embodiments, distortion amounts on surfaces in the flattened 3-D model (e.g., amounts of distortion in terms of percent change in size compared to the source 3-D model) are substantially the same (e.g., in terms of percent difference in size) across straight linear regions of the flattened 3-D model, e.g., moving from one side of the model to the other. In some embodiments, a user is given means to manage distortions during flattening; for example, choosing where key positions such as cuts are to be made, and/or A reconstructed curved body tissue surface comprises, for example, an inner surface of a body lumen (e.g., a heart chamber, blood vessel, lymph vessel, bone, membrane, cyst, gastrointestinal tract portion, kidney/urinary tract portion, respiratory tract portion, reproductive tract portion, eye, ear, CNS ventricle, peritoneum, and/or another natural and/or artificial space such as implant surroundings) and the reference point is located near the middle of the reconstructed body lumen. In embodiments disclosed herein, the left atrium is used as an example of a particular hollow organ (body cavity) to which such a visualization method is optionally applied. However, it should be understood that the technique optionally applies, changed as necessary, to the interior of any hollow organ or portion thereof. In some embodiments, a representation of an organ exterior surface (e.g., of a heart, liver, kidney, brain, and/or portion(s) thereof such as a right atrium) is flattened.

In some embodiments, atrial fibrillation is to be treated with ablations in the left atrium (LA), by formation of one or more closed lines of lesions which substantially isolate one or more pulmonary veins (PV) from surrounding cardiac tissue to which they are connected. In a typical procedure, a goal is to isolate all PVs this way. An individual ablation line may encircle one PV, or a plurality of PVs.

Simultaneous viewing of a large portion of a curved surface of a body portion has potential advantages for presenting a unified impression of a region targeted, e.g., for treatment delivery. However, without transformation of a source representation to a flattened representation, gaining such a simultaneous view raises different potential problems.

For example, with respect to ablation treatments of PVs in the LA: when the LA is viewed in 3-D through a typical field-of-view angle (e.g., subtending 60°, 50°, 40°, 30° or less), some variable part of the regions to be isolated may be persistently hidden and/or variably distorted, no matter what view direction is chosen. From vantage points close to the LA wall, target details are potentially out of the field of view. From vantage points far from a target side of the LA wall, but still "within the lumen", some target details may still be out of the field of view, and/or distorted due to curvature of the lumenal wall. With a larger angular field of view, more target details may become apparent, but with increasing distortion near the edges of the field of view—distortion that would potentially change significantly if the center of the field of view was moved. From a vantage point outside the LA (e.g., making a proximal wall transparent so that interior target details of a more distal wall can be seen), some target details may be hidden by the transparency, and/or foreshortened so as to make them difficult to distinguish.

Moreover, simulated lighting used in defining (e.g., rendering to a 2-D image) a view of a reconstruction may include shading (shadow) effects to provide a sense of depth. But shading of a curved surface simulating a fixed light source position may result in some features being relatively over-lit or under-lit, depending on their general position, making comparisons difficult. Changing the light source, on the other hand, can result in dramatic (and potentially disorienting) changes to the appearance of the features.

Practically, in order to ablate around the PVs while maintaining a view of the working area, views from a simulated internal camera vantage point are commonly kept near to a "natural" field of view angle (e.g., 30°-60°, and/or similar to the angular size of the display). The vantage point is rotated to look at new portions of the targeted region as necessary. The number of rotations used under such conditions is typically about 8 times for closing a circle around one PV. In practice, this is commonly carried out by an assistant physician or technologist, who moves the view according to the request of the operating physician. A potential drawback of this method is that it may require extra personnel in the room, with attendant potential extra expense, training requirements, scheduling requirements (e.g., to make sure personnel are available simultaneously), and/or procedure complexity.

An aspect of some embodiments relates to the use of displays of flattened representations of body tissue surfaces. The use optionally comprises updating of the flattened representation during mapping using data collected from an intrabody probe, and/or guidance of navigation of the intrabody probe itself, shown moving within a scene (space) comprising the flattened reconstruction.

In some embodiments, a position of an intrabody probe is transformed from source coordinates into a new set of coordinates which are used to indicate a position of the intrabody probe together with a view of the flattened reconstruction.

In some embodiments, a flattened reconstruction and/or one or more views thereof is created and iteratively updated during an interactive procedure that repeats the transformation and image production/display from data acquired while a measurement-making catheter probe is navigated (moved) in the vicinity of the body surface represented, e.g., within a lumen bounded by the body surface.

In some embodiments, the updating comprises changing the flattened reconstruction to include new surface position data, e.g., position data determined using measurements (e.g., electrical, magnetic, and/or ultrasound measurements) made from the catheter probe itself. This inclusion may be implemented by updating the source reconstruction and transforming it to provide an updated flattened representation, and/or by transforming the new data and adding the new data transformed directly to the existing flattened reconstruction. Optionally, updating is automatic and optionally continuous as new position data is acquired. Optionally, updating is manually instigated and/or can be manually paused, e.g., for stability of display during a critical phase of a procedure.

Optionally, indications of events (such as ablation points) and/or measurements other than surface positions (such as functional data) are shown together with the flattened reconstruction, optionally shown updating as new events occur and/or measurements are collected.

In some embodiments, updating is performed using only a portion of available position data. For example, by omitting earlier data, there may optionally be obtained a flattened reconstruction view which indicates a current state of a surface which may have changed over time—such as different blood vessel diameters, changes in heart chamber size due to an arrhythmia, or another changing feature. Optionally, available data is selected for inclusion in the flattened reconstruction using gating, e.g., to a particular phase of respiration and/or heartbeat.

Additionally or alternatively, in some embodiments, the updating comprises changing a view created from the flattened reconstruction, e.g., by changing a view angle, distance, or other viewing parameter. Optionally, view changes occur automatically, for example, in response to events of a catheter procedures such as approaching and/or contacting represented tissue surfaces. Additionally or alternatively, in some embodiments, view changes are manually controlled by an operator.

In some embodiments, showing the surface to be treated in a single, suitably flattened reconstruction view provides a potential advantage by permitting operability of the system by a single operator engaged in navigation of an intrabody probe (e.g., a catheter probe).

Optionally, a view of the flattened reconstruction is defined initially for a procedure, e.g., a procedure performed within a certain body cavity, and after this the whole body cavity surface can be seen at once as navigation within the body cavity is performed using an intrabody probe, without a need for further viewing parameter adjustments (though optionally the flattened reconstruction and view are interactively updated with new data describing the body cavity surface as it becomes available).

Optionally, flattened reconstruction and source reconstruction views are displayed simultaneously during intrabody probe navigation (optionally, just the flattened reconstruction is shown in a view). In some embodiments, shifting between flattened and source views is easily controlled by a single user (e.g., using a foot-pedal, and/or triggered by a position of a catheter probe). The transition is optionally smooth, e.g., comprising "unrolling" from the source reconstruction to the flattened reconstruction, and optionally "rolling" back again. Additionally or alternatively, this may be described as producing views of a series of reconstructions flattened over a range of increasing average radii of curvature. The smooth transition potentially helps to preserve a sense of object constancy.

In some embodiments, triggering of the transition and/or another aspect of the current view is controlled automatically by an algorithm based on current conditions. In some embodiments, a 3-D view is from the viewpoint of the catheter (e.g., so that no part which is about to be treated is hidden from view). In some embodiments, a 3-D view is from a viewpoint facing a site to be treated, does not follow movements of the catheter. The catheter movement, however, may be symbolically represented on the 3-D view. In some embodiments, the site to be treated is marked by the physician on the flattened reconstruction view, and the flattened reconstruction view is switched automatically to a 3-D view facing the marked site, e.g., when the catheter approaches the marked site or when the physician requests such a switch, e.g., by pressing a pedal. Parameters considered in automatically switching between views optionally include, for example, distance from a tissue wall, heading direction, phase of procedure (e.g., between two different sub-lesion ablations within a single ablation line, and/or switching between two different ablation lines).

In some embodiments, for example, a switching algorithm is configured to present the overview of a flattened reconstruction view when a catheter probe is navigated by the user far from a tissue wall, and a 3-D view when the user is near the tissue wall, and/or actively engaged in treatment such as ablation.

In some embodiments, the use of manual view switching by one or more users is monitored, and used as input to train a machine-learning algorithm what view is preferred under different circumstances. Optionally, machine-learning is performed using input from users of different stages of experience, and/or exhibiting different clusters (e.g., statistical clusters based on differences in selected view as a function of probe position and/or other procedure parameters) of use style, so that an operator may be presented with choices of automatic view switching which best suit their own mode of use.

An aspect of some embodiments of the present disclosure relates to the determination of an orientation of a source reconstruction, optionally in preparation for the production of a flattened reconstruction.

In some embodiments, an anatomical orientation of a reconstruction (e.g., a source reconstruction) is determined, for example as part of the process of producing a flattened reconstruction. This may be useful, for example, when the general anatomical origin of data represented in a source reconstruction is initially known (e.g., the data describe an inner lumen of a left atrium); but there remains unknown, unclear, and/or approximate certain specifics of how the reconstruction is oriented; e.g., with respect to landmark features of the anatomy. Moreover, even when orientation is well-known with respect to some reference coordinate system, variations in individual anatomy can affect what orientation framework is preferable for generating a flattened reconstruction, and/or a display of a reconstruction.

In some embodiments, orientation is determined based on one or more metrics of surface regions, determined from a 3-D representation the surface (optionally either a flattened or un-flattened representation). In some embodiments, the metrics are based on depth and/or distance information. For example, positions more distant from some reference point are given a different (e.g., larger) weight than positions closer to the reference point. The weights are then used in combination with one or more rules in order to determine an orientation. For example, where relatively deep (more distant, and, e.g., receiving more weight) features of interest (and/or clusters thereof) are expected to fall along a common line, a rule may specify that this common line provides an orienting reference. In another example, a rule may specify that a line at a position where weight on two sides is balanced provides another orienting reference. Further rules may apply, for example, to resolving potential ambiguities (e.g., where two or more positions satisfy some criterion). Once the orienting references are determined, they are optionally used for purposes of orienting display of reconstruction views. In some embodiments, positions at which discontinuities (cuts) are to be introduced during the flattening of a source reconstruction are determined based on the orienting references.

The rules defined and used optionally vary according to the characteristic anatomy of different anatomical locations. For example, rules applicable to the left atrium optionally take into account the typical positions and/or clusterings of the pulmonary veins, left atrial appendage, and/or mitral valve. Rules applicable to the right atrium optionally take into account the typical positions and/or clusterings of the superior and inferior vena cava, the coronary sinus, and/or the tricuspid valve.

Before explaining at least one embodiment of the present disclosure in detail, it is to be understood that the present disclosure is not necessarily limited in its application to the details of construction and the arrangement of the components and/or methods set forth in the following description and/or illustrated in the drawings. The present disclosure is capable of other embodiments or of being practiced or carried out in various ways.

Flattening of a Reconstruction of a 3-D Lumenal Shape

Reference is now made to FIG. 1A, which schematically represents anatomical features of a left atrium 2 represented in its usual 3-D shape, according to some embodiments of the present disclosure. In FIG. 1A, Left atrium 2 is represented as a globular shape.

Locations of the roots of pulmonary veins 10 and mitral valve 12 are shown. Also represented is ablation line 14, the two halves of which together encircle the roots of the left-most two pulmonary veins 10. The nearer half and further half of ablation line 14 are represented with differently dotted lines.

Also shown are arrows 11A, 11B and reference points 21, 22 23, further referred to in the descriptions of FIG. 1B.

Further reference is now made to FIG. 1C, which shows a reconstruction of a left atrium 2 represented in its usual (un-flattened) 3-D shape, according to some embodiments of the present disclosure.

Mitral valve 12 and roots of pulmonary veins 10 are also shown in FIG. 1C, along with left atrial appendage (LAA) 15. Also shown are arrows 11C, 11D, 11E, and reference point 21, which are further referred to in the descriptions of FIG. 1D.

FIGS. 1A and 1C indicate lines 13A and 13, respectively, along which the 3-D lumenal shape of left atrium 2 is opened (that is, virtually cut, introducing a discontinuity) to produce the flattened reconstruction views of FIGS. 1B and 1D. It should be noted that Lines 13A and 13 are represented somewhat differently upon flattening, as explained in relation to FIGS. 1B and 1D.

For orientation, reference points 21 of FIG. 1A and FIG. 1C are shown in FIG. 1B and FIG. 1D at the respective center of each flattened reconstruction view.

Reference is now made to FIG. 1B, which schematically represents anatomical features of a left atrium 2 spread out into a flattened shape, according to some embodiments of the present disclosure. FIG. 1B represents a flattened reconstruction view of the atrium 2 of FIG. 1A.

In the flattening transformation used in producing the reconstruction schematically indicated in FIG. 1B, it is approximately as though the left atrium wall was slit partially up the center of the view of FIG. 1A on two sides (e.g., along the lines extending upward from reference points 22 and 23), and unwrapped for viewing. Arrows 11A-11B of FIGS. 1A-1B represent spherical angle coordinates of FIG. 1A mapped to Cartesian axes of FIG. 1B. It should be noted that reference points 22, 23 become the corners of the flattened reconstruction view. The position of the mitral valve 12 is located off the edges of the view, so that the two lateral boundaries of FIG. 1B (extending between points 22 and 23) correspond to the circumference of mitral valve 12. Cut lines 13A are oriented across the top and bottom of the view of FIG. 1B.

In the flattened reconstruction view of FIG. 1B, the entirety of ablation line 14 is now visible at once, and from the same side. This illustrates a potential advantage of the flattened reconstruction view, insofar as more of the interior surface of the left atrium 2 can be seen in a single flattened reconstruction view. Another potential advantage, in some embodiments, is that a catheter probe remains in the image as it moves in the vicinity of any portion of the ablation line, since there is optionally also represented in a view a volume above the flattened reconstruction, into which a representation of the catheter probe may be placed.

Further reference is now made to FIG. 1D, which is a view of a flattened reconstruction flattened from the source reconstruction of FIG. 1C, according to some embodiments of the present disclosure. In FIG. 1D, a slightly different transformation from that of FIG. 1C is used. In this flattened reconstruction, the small regions 16A, 16B of FIG. 1C are stretched along the lower and upper boundaries of the view, while the edges produced by cut 13 extend along the lateral sides of this flattened reconstruction view. Additionally to features such as the mitral valve 12, the pulmonary veins 10, and the left atrial appendage 15, the trans-septal 17 (at the position of the fossa ovalis) is also shown.

It is noted that despite the transformation that "flattens" the reconstruction of FIG. 1C, relative positions in depth of surface positions are retained in the flattened reconstruction. The reconstruction is re-encoding of co-ordinates defining the source 3-D shape, (e.g., the shape displayed in FIG. 1C) to a transformed and flattened 3-D shape (e.g., the shape displayed in FIG. 1D).

Transformation from Source Reconstruction to Flattened Reconstruction

Reference is now made to FIG. 1E, which is a flowchart outlining a method of producing an image of a flattened reconstruction, according to some embodiments of the present disclosure.

At block 102, in some embodiments, a source reconstruction comprising a 3-D representation of a curved body tissue surface is received.

At block 104, in some embodiments, a flattened reconstruction is produced from the source reconstruction. The flattened reconstruction is produced so that a global curvature (that is, a curve defined over the area of the curved surface, but not following all its details) is reduced. The global curvature is the curvature of a curve defined over the area of the curved surface, but not following all its details. For example, it may be the curvature of a sphere or of an ellipsoid, best-fitting the curved surface. Optionally, the global curvature is implicit, e.g., in the choice of coordinate systems used in a flattening transformation.

At block 106, in some embodiments, an image is produced using the flattened reconstruction.

Further reference is now made to FIG. 1F, which is a flowchart outlining a method of producing a flattened reconstruction, according to some embodiments of the present disclosure.

At block 110, in some embodiments, a source reconstruction comprising a 3-D representation of a curved body organ surface is received. The source reconstruction may be conceptualized as including a surface (which may be smooth or not) of a global curvature and relief details distributed along the surface of global curvature (e.g., details represented by 3-D positions on the curved body organ surface which are at some distance from a surface representing the surface of global curvature).

At block 112, in some embodiments, the relief details are isolated from the surface of global curvature.

At block 114, in some embodiments, a flattened reconstruction is produced for storage in computer memory, using the isolated relief details. In some embodiments, the computer memory stores the flattened reconstruction as new copies of coordinates of points composing the relief details directly. The coordinates of the points composing the relief details may compose flattened relief details obtainable, in some embodiments, by the flattening transformation described above, e.g., in the context of block 104 of FIG. 1E. Optionally, the global curvature which was flattened out of the source reconstruction to produce the flattened reconstruction is also stored. In some embodiments, what is stored comprises an indication of the transform used to produce the flattened surface of reduced global curvature from the source reconstruction, associated by processor instructions to the source reconstruction. For example, a rendering program is configured to interpret source reconstruction stored as coordinates of (r,θ,φ) as coordinates of (z,x,y).

In some embodiments, FIGS. 1E and 1F comprise alternative descriptions of the same method of producing a flattened reconstruction of a curved body tissue surface.

Input data for producing the source reconstruction optionally comprise data expressed in Cartesian coordinates obtained from 3-D imaging of the patient, for example, CT imaging. Optionally, the data come from another method, for example, using intrabody mapping of positions of a catheter probe (e.g., an electrode probe, magnetic probe, and/or ultrasound probe). In some embodiments, data representing a lumenal wall of a body cavity are obtained using a remote electrical field imaging method, for example a method described in U.S. Provisional Patent Application No. 62/546,775 entitled FIELD GRADIENT-BASED REMOTE IMAGING, and filed Aug. 17, 2017; the contents of which are incorporated herein in their entirety.

In some embodiments, data representing a lumenal wall of a body cavity are obtained using a reconstruction method described in U.S. Provisional Patent Application No. 62/445,433 entitled SYSTEMS AND METHODS FOR RECONSTRUCTION OF INTRA-BODY ELECTRICAL READINGS TO ANATOMICAL STRUCTURE, and filed Jan. 12, 2017; the contents of which are incorporated herein in their entirety. Use of mapping by intra-body probe, e.g., as disclosed in the above two provisional patent applications, provides a potential advantage by allowing data for a flattened reconstruction of a body surface to be collected on the fly (e.g., in real time) as a catheter probe (optionally a standard ablation catheter probe) enters a body region bounded by the body surface. The above cited provisional applications may even provide the ability to collect on the fly data pertaining to structure of regions which have not necessarily been visited by the probe. Optionally, reconstruction is performed using field gradient-based remote imaging, without the use of auxiliary image data.

Use of this surface imaging method provides a potential advantage by allowing data for a flattened reconstruction of a body surface to be collected on the fly (e.g., in real time) as a catheter probe (optionally a standard electrode catheter probe) enters a body region bounded by the body surface, including collection from regions which have not necessarily been visited by the probe. Optionally, reconstruction is performed using field gradient-based remote imaging, without the use of auxiliary image data.

In a first example embodiment of producing a flattened reconstruction, the 3-D representation of the source reconstruction is first encoded (e.g., from Cartesian coordinates) into spherical coordinates; e.g., (x,y,z) coordinates are transformed using a spherical coordinate transform to coordinates expressed as (r,θ,φ), where r is a radius, and θ and φ are spherical angles. This intermediate result comprises a change in coordinate system, without yet introducing a change in the shape of the source reconstruction. Optionally there is a rigid transform applied as part of the conversion, e.g., to set an origin near the center of a lumen defined by the reconstructed surface, and/or to set an orientation along which a discontinuity (cut) will be introduced as part of the flattening.

In some embodiments, to next create the flattened transformation (in overview): the x (horizontal) dimension of the flattened representation is mapped to one of the two angular coordinates (e.g., θ, representing azimuthal angles, in a range, e.g., from 0° to 360°). The y (vertical) dimension is mapped to the other (e.g., φ, representing inclination angle, in a range, e.g., from 0° to 180°, or −90° to +90°, depending on the 0-angle convention adopted). The z (depth) dimension is optionally directly substituted with r. In some embodiments, this mapping may be understood as analogous to projection of angular coordinates onto a curved surface, for example a cylinder, cone, or other surface—except that local relative distance information is retained so that the resulting projection does not smoothly follow the cylinder, cone, or other surface.

In this flattening method, the sizes of r depend on the chosen origin (e.g., at the stage of conversion to spherical coordinates). The origin is chosen, in some embodiments, so that distances to points on the coronary wall which are about equidistant along the wall to the midpoints of each pair of pulmonary veins are also shown about equidistant to this reference in the flattened image (practically, this tends to locate the origin near the geometrical center of the left atrium). In some embodiments, the origin is dynamically changed, according to a current focus of work (e.g., set by the position of probe 31). For example, the origin optionally shifts to give the least distorted available view of a region which is closest in position to a current position of the catheter probe.

It is noted that if r is directly mapped to z, this is similar to setting $a(\theta,\varphi)=0$ in the framework of the following alternative embodiment of a transform from source reconstruction to flattened reconstruction. There is still a global curvature, however, implicit in the choice of coordinate system. This will be discussed after the following indirect transformation method of converting r to z is explained.

In some embodiments of the flattening (block 104) and/or isolating and producing (blocks 112, 114), the source reconstruction is optionally modeled as $r(\theta,\varphi)$; comprising the sum of two terms, each of which describes distances to the surface from some reference point as a function of spherical angle coordinates, e.g.:

$$r(\theta,\varphi)=a(\theta,\varphi)+b(\theta,\varphi)$$

Here and in the following descriptions, θ may be considered as the azimuth angle, and φ as the polar (inclination) angle.

The first term $a(\theta,\varphi)$ describes the global curvature as any suitable smooth geometrical object (e.g., a sphere, ellipsoid, parametric curve, combination of spherical harmonics, and/or long wavelength frequency domain components of a Fourier transform of the surface transformed back into the spatial domain). The object and/or its degree of smoothness is optionally determined by structure (e.g., the angular size) of details which are to be preserved or suppressed. For example, insofar as the first term follows the curvature of a detail in the source reconstruction, that detail will tend to be suppressed in the flattened reconstruction. The parameters of the smooth geometrical object may be chosen, for example, as those that best fit (e.g., minimize differences in distance, minimizes variance, minimize some weighted combination of the two, or best satisfy according to another criterion) the source reconstruction $r(\theta,\varphi)$.

The first term $a(\theta,\varphi)$ gives the distance of the smooth object's surface from the reference point as a function of spherical angle. The second term $b(\theta,\varphi)$ describes the relief details. The second term may be derived as the mathematical difference (by subtraction) of a representation of the source reconstruction in spherical coordinates and the first term, for example:

$$b(\theta,\varphi)=r(\theta,\varphi)-a(\theta,\varphi)$$

So-defined, the second term $b(\theta,\varphi)$ provides, at each spherical angle defined by the source reconstruction, the extra/reduced distance from the reference point to the surface of the source reconstruction, compared to the distance from the reference point to the surface of the smooth geometrical object provided as a definition of the global curvature.

In some embodiments, producing the flattened reconstruction ("flattening the source reconstruction") comprises a lookup operation that re-plots the second term $b(\theta,\varphi)$ into Cartesian coordinates. For example, $z(x,y)=b(\Theta_x,\Phi_y)$; wherein x and y are used as lookup variables transformed by the functions $\Theta_x$ and $\Phi_y$ to the defined ranges of $\theta$ and $\varphi$. The assignment effectively determines where "cuts" will be made to allow unrolling the source representation into the flattened representation.

This operation produces a flattened reconstruction which preserves (albeit typically with some kind of distortion, e.g., stretching, size change, and/or local angle change), the relief features of $b(\theta,\varphi)$, and is planar with respect to the global curvature (e.g., if $r(\theta,\varphi)=a(\theta,\varphi)$, then $b(\theta,\varphi)=0$, and $z(x,y)=0$).

This particular method introduces some distortion in the flattened reconstruction. For example, the path in the source reconstruction of the equatorial circumference (when $\theta=0$) is much longer than the length of its parallel paths as $$\theta \to \frac{\pi}{2},$$

but the two paths are represented as having equal length in the flattened reconstruction just explained. Some level of distortion and/or discontinuity is generally unavoidable when converting curved 3-D surfaces to flat (in 3-D space) representations, but the nature of the distortions/discontinuities can be controlled, e.g., to preserve relative areas, directions, and/or distances. For example, the relative scale of the x and y axes comprises a parameter that may be set. In some embodiments, the ratio is set so that it most closely approaches 1:1 in the regions of the pulmonary veins.

Optionally, one or more cartographic techniques used to control distortions, e.g., of land masses in flat maps of a globe, are used to control distortions of representation in the (x,y) plane relative to a (optionally spherical) global curvature. With the framework just described, this could be generally implemented by making the lookup functions dependent in any suitable fashion on both x and y (e.g., $\Theta_{xy}$ and $\Phi_{xy}$, or by another method producing equivalent results. In some embodiments, distortion is controlled so that targeted portions of the body tissue surface are presented with relative reduced distortion; e.g., portions targeted for treatment.

Other methods and/or results of flattening are possible. For example a bowl-shaped or other non-planar flattened reconstruction can be obtained by choosing a global curvature term $a(\theta,\varphi)$ which is suitably different from a best-fitting smooth shape, and/or by using an offset term when producing the flattened reconstruction, e.g., as $z(x,y)=b(\Theta_x,\Phi_y)+c(x,y)$. Non-planar flattened reconstructions provide a potential advantage for allowing reduction of flattening-related distortions, while still exposing a larger surface to simultaneous viewing. However, insofar as a view of a flattened reconstruction eventually targets viewing by the human eye—with all its inherent limitations on field-of-view perception—taking full advantage of this potential advantage may require special arrangements for movement of the reconstruction in the view, and/or for immersive display.

In another example of flattening: in some embodiments, a longitudinally extended and convoluted organ (e.g., an intestine or blood vessel) is rendered in straightened form. A smooth geometrical object used to define a global curvature in such embodiments is optionally an extrusion of a planar figure (e.g., a circle or ellipse) along a parametric path (e.g., a Bézier curve) that follows a centerline of the convoluted organ. Optionally, the planar figure is itself variable as a function of distance along the parametric path. The coordinate system used may be other than spherical, for example, a type of cylindrical coordinate system, wherein distance along the parametric path is used as a linear axis, and position around the parametric path is expressed as a polar coordinate combination of angle and distance (radius).

Whether these sorts of transformations are suitable optionally depends on the types of navigation and/or navigation controls available. For example, inside-out inversion of an exterior surface may be suitable for a beam-type treatment system where the beam may be directed from substantially any location, so that the user always feels as though the beam is coming from a central point. Optionally, treatment in an organ where navigation is substantially push-pull (e.g., navigation of an endoscope through an intestine) is aided by rendering of a view as a more straightened version of actual 3-D geometry.

In a special case, if the first term $a(\theta,\varphi)$ is defined as for a sphere centered at the spherical coordinates origin, then $a(\theta,\varphi)=k$, where k is the constant radius of the sphere. However, the final flattened reconstruction is insensitive to the choice of k in this condition. For a spherical global curvature centered on the spherical coordinate's origin, every choice of k produces a substantially equivalent result, except that there is a relative offset of the flattened reconstruction by a distance along the z axis controlled by k.

In the first transform method described in this section (where r is directly mapped to z), it was noted that the result is similar to setting $a(\theta,\varphi)=0$, and so, accordingly, $k=0$. This 0-radius sphere is not an indication of "no global curvature", but rather, is possible because of the particular (spherical) model of global curvature inherent in the choice of coordinate system. The global curvature is defined as spherical, albeit implicitly, and is still being removed (even with $k=0$, since all values of k lead to flattening in this special case, making it unnecessary to specify one in particular).

In converting a flattened reconstruction to a 2-D image (e.g., 2-D in display coordinates), providing a flattened reconstruction view, depth information can be indicated, for example, by orientation-dependent shading of surfaces, and/or by changing the parallax of viewed features depending on the relative positions of the viewpoint and the flattened reconstruction.

For example, distances in FIG. 1C from a reference point 24 internal to left atrium 2 (e.g., a point half-way between reference point 21 and the apex representing valve 12) are transformed in the flattened reconstruction shown in FIG. 1D to a Cartesian axis of image depth. This axis is indicated by arrow 11E.

It should be noted that the flattened reconstruction of FIG. 1D is displayed as though viewed from an offset angle, which potentially serves to highlight certain features (e.g., allow viewing into apertures). Slight changes to the offset angle potentially serve to emphasize differences in depth (e.g., due to parallax changes). Angular positions in FIG. 1C relative to reference point 24 are transformed in the reconstruction of FIG. 1D into the two remaining Cartesian axes, e.g., Cartesian axes extending along arrows 11D and 11C.

It is emphasized that while the flattened reconstruction, in some embodiments (e.g., FIG. 1D) is reminiscent of certain types of cylindrical map projections, the retaining of transformed depth information allows the result to optionally be viewed from any display angle, with resulting shifts in parallax and/or angles affecting feature presentation (e.g., angles interacting with simulated lighting conditions). A traditional 2-D projection of a 3-D surface does not retain such information (this is discussed further, e.g., in relation to FIGS. 7A-7B, herein).

The flattening (curve-straightening, unrolling) type of transformation presented by examples in FIGS. 1A-1D has potential advantages for use in intracardial navigation of a catheter probe (for example, an ablation probe). First, the transformed reconstruction is suitable to lay out in one view an extended surface area which may be a target of measurement and/or treatment procedures. Second, at the same time, the flattened reconstructions optionally preserve a relatively undistorted appearance of surfaces throughout a large target region, for example, in the region of the roots of the pulmonary veins 10. This is particularly of potential benefit for procedures comprising the formation of one or more lines of ablation to electrically isolate the pulmonary veins from surrounding cardiac tissue. In other embodiments, other targets may be selected, for example, other portions of the 3-D object to be represented may be viewed with minimal distortion.

Another potential advantage is that because the flattened representation remains 3-D in character, it defines a volume into which indications related to catheter probe position can be placed, for example, a probe icon or other indication at the probe's current position, including indications that correctly indicate contact with the flattened representation surface.

While a probe position could be placed in a scene together with a source representation before rendering to a typical camera-view type 2-D image, the probe appearance would itself be subject to, e.g., perspective distortions, which could be quite disturbing, e.g., at the edges of a fisheye view. On the other hand, once a 2-D image of the surface is rendered, some 3-D information is lost (e.g., indicated instead by artificial depth cues such as shading and self-masking), so that it is difficult to accurately reintroduce the probe tip position into the scene e.g., so that probe contact with the flattened surface at different depths is correctly shown. Also, 2-D image will tend to suppress detail where there is more than one layer (e.g., blood vessels branching beyond a lumenal surface of a heart chamber).

Setting of the Cut Line

In some embodiments, remaining parameters of the flattening include where to make the "cut" (e.g., represented by the lines 13A extending from reference points 22 and 23 in FIG. 1A, and/or line 13 in FIG. 1C).

Reference is now made to FIG. 1G, which is a flowchart outlining a method of determining an orientation of a reconstruction of a curved body tissue surface, according to some embodiments of the present disclosure.

At block 120, in some embodiments, relief details are received. These relief details may be the isolated relief details of block 112. Optionally, relief details are provided together with the global curvature, in which case the operations of block 122 are optionally adjusted to discount effects of global curvature on the weighting of relief details.

At block 122, in some embodiments, weightings are assigned to the relief details. Optionally, the weightings are assigned according to distance and/or depth ("amplitude") of relief details, relative to a reference point, reference offset, and/or reference curvature (e.g., a suitable global curvature definition). Weightings can be directly proportional to relief detail amplitude, linearly related, related as a power function, or provided as some other function of relief detail amplitude.

At block 123, in some embodiments, orientation of the relief details is determined, using criteria applied to the weightings assigned at block 122.

With continued reference to the method of FIG. 1G: it has been noted already that the "cut" applied in the production of FIG. 1D (represented by line 13) is oriented to pass through the center of mitral valve 12. The rotational orientation of the line also affects the flattened reconstruction and/or view thereof; for example, if line 13 was rotated (about a vertical axis) by 90°, then the layout of features in FIG. 1D would also be rotated by 90°, with corresponding shifts in discontinuities and other distortions.

With respect to flattened reconstructions of the left atrium inner surface, the inventors have found that the cut orientation shown results in a flattening which presents surface features in a way that is convenient for navigation of an intracardial catheter probe (at least, for common anatomical variants). The zones of greatest distortion and/or discontinuity near the mitral valve 12 are also zones where catheter navigation is potentially complicated by strong and variable currents of blood flow. Moreover, since the valve is anyway moving all the time, the reconstruction in that region anyway is potentially less accurate and/or interesting for purposes of targeting by the catheter. Moreover, the zones 16A, 16B which have the greatest stretch-distortion are also positioned away from regions where features of particular interest for some treatments, such as the pulmonary veins 10 and the LAA 15, form distinct clusters.

In some embodiments, the orientation of cut 13 can be determined and/or adjusted manually, and/or automatically based on explicit identifications of features and/or selection from a range of options. Optionally, manual controls allow adjustment of the cut position and/or of an origin used as a basis for the flattening operation (e.g., a center of the global curvature), for example to account for individual anatomical differences.

Optionally, operation of the controls is defined over a Cartesian coordinate space defined over the source reconstruction. These controls optionally separately control movement of the origin in the x, y, and z directions (e.g., by 5 mm at a time, or another distance). Optionally, controls for elevation, roll, and azimuth control rotation (e.g., in 5° increments, or in another increment) around the x, y, and z axis, respectively. In some embodiments, changing of a control setting results in an immediate update of one or both of a view of the source reconstruction and the flattened reconstruction. Additionally or alternatively, another control set is defined, for example, controls defined over the Cartesian space of the flattened reconstruction itself. For example, an x axis control has the effect of panning a view of the flattened reconstruction left or right, a y axis control which has the effect of scrolling the view up or down, and/or a z axis control has the effect of translating the view toward or away from a perspective point of the view. A rotational control optionally sets the cardinal directions of the x and y axes with respect to the flattened reconstruction. Controls are additionally or alternatively provided for and/or interpreted as adjustments to suitable parameters in a spherical or other non-Cartesian coordinate system.

In some embodiments, automatic selection of a flattening parameter set comprises a process of scoring a plurality of available flattening parameter sets for properties (with respect to a particular anatomy and/or procedure plan) of angle preservation, distance preservation, and/or contiguity of representation, and choosing and/or making available for choice options which score best. In some embodiments, a flattening parameter set may include indications of how and/or where to introduce discontinuities (e.g., cuts along the edges of the flattened reconstruction and/or view thereof), and/or what angular position should be set at the center of the flattened reconstruction and/or view thereof.

In some embodiments, the orientation is determined automatically and on the fly, based on global characteristics of the reconstruction, and general information about anatomical layout. For example, the cut 13 is positioned, in some embodiments, to where the resulting flattened reconstruction best balances feature depth (treated as a "weight") as a function of distance from the reconstruction's (x,y) center 21. For example, along the left-right direction (arrow 11C of FIG. 1D), there are two clusters of relatively deeper features; so those features are set at roughly equal horizontal distances from the center. In the up-down direction (arrow 11D of FIG. 1D), the weight of each of these clusters falls along a common center, so the features having larger distances are weighted such that they "sink" to the middle. Optionally, the orientation of the axes themselves is set so that one axis passes along this common center. Remaining ambiguity in setting the center point (e.g., whether to cut through the mitral valve, or cut through the atrial wall opposite) is optionally resolved by choosing the alternative with the greatest or least contiguously represented distance between cluster positions.

Optionally, for body surfaces of different organs having different general anatomical arrangements of features of interest and/or for use in different procedures, different rules are set, and the weightings of block 122 used to satisfy those rules. It is noted that the rules described for FIG. 1D have the effect of naturally bringing the image into a left/right and top/bottom balanced distribution of features (which also happens to create a flattened reconstruction view which is effective for displaying left atrium features related to atrial ablation procedures). However there is optionally any suitable offset applied to bring features into suitable relative positions for a particular application (e.g., a valve procedure would optionally center the mitral valve in the view), and/or anatomy (e.g., a reconstruction for use in the right atrium optionally uses the superior and inferior vena cava as landmarks for orientation of a flattened reconstruction view of the right atrium).

Considering the broader case of an arbitrary distribution of anatomical features of interest viewed on a flattened surface, the selection of an optimal flattening may be made differently in different conditions and/or for different purposes; e.g., different chambers and/or organs, and/or different therapy plans. For example:

Ablation inside the left ventricle (LV), e.g., for ventricular tachycardia ablation, is optionally performed against the background of a flattened reconstruction of an LV which has been flattened using chamber-specific parameters.

For a left atrial appendage closure procedure, the LAA ostium is optionally centered in a flattened reconstruction view of the left atrium.

For a transseptal procedure, the fossa ovalis is optionally centered in a flattened reconstruction view of the right atrium.

For an atrial septal defect and/or patent foramen ovale closure, the patent foramen ovale and/or atrial septal defect is optionally centered in a flattened reconstruction view of the right atrium.

For coronary sinus cannulation and/or placement of a pacing electrode, the coronary sinus is optionally centered in a flattened reconstruction view of the right atrium.

For purposes of using a flattened reconstruction for purposes of guiding navigation within a body cavity, it is optionally preferable for target regions to be continuously linked (e.g., navigable between without having to pass over a "cut"), while geometrical distortions of angle and/or size are pushed to regions away from target regions. Optionally, parameters governing flattening of a surface (for example, any of the parameters just described, or other parameters governing a different flattening method) are modified during the procedure, for example, to shift distortions away from current main targets.

Optionally, there is more than one cut. A cut may be considered as a discontinuity-type distortion which, once introduced to a projection, potentially allows greater freedom in reducing distortion somewhere else. This provides a potential advantage where there are areas of little interest that can be more heavily distorted in exchange for improved accuracy of representation elsewhere.

Flattened Reconstruction Views in Comparison to Other View Types

Features of the view of FIG. 1D in particular may be contrasted with other types of views.

For example, reference is now made to FIG. 9A, which shows a planar sectioning of a 3-D representation of a body part reconstruction 900, according to some embodiments of the present disclosure; and to FIGS. 9B-9C, which show views looking into two sectioned portions of body part reconstruction 900, according to some embodiments of the present disclosure.

FIG. 9C shows a view looking along axis 902 (normal to sectioning plane 901), and towards two of the pulmonary veins 10 and LAA 15 of a left atrium 2. Due to the curvature of the left atrium 2, details along some lumen wall portions (e.g., those oriented substantially along axis 902) are obscured and/or considerably foreshortened. The curvature of the left atrium 2 also makes it difficult to simultaneously get comparable impressions of all the pulmonary veins 10 (even from one side) and LAA 15 in one view: apertures of each present themselves at widely varying angles. This potentially affects the appearance of surface shapes, and/or the lighting conditions affecting how well each feature can be distinguished. As another example of a sectioned view: FIG. 9A shows a view after cutting by a different plane) into another section of body part reconstruction 900 showing different pulmonary veins 10, subject to the same issues of curvature and/or lighting. Moreover, there is apparently no single planar sectioning which produces a sectioned portion that includes all the indicated features of FIGS. 9B and 9C in a single clear view.

Also for example, reference is now made to FIGS. 10A-10D, which show a range of standard camera-type views of the interior of a reconstructed left atrium, according to some embodiments of the present disclosure.

Figure 10A:
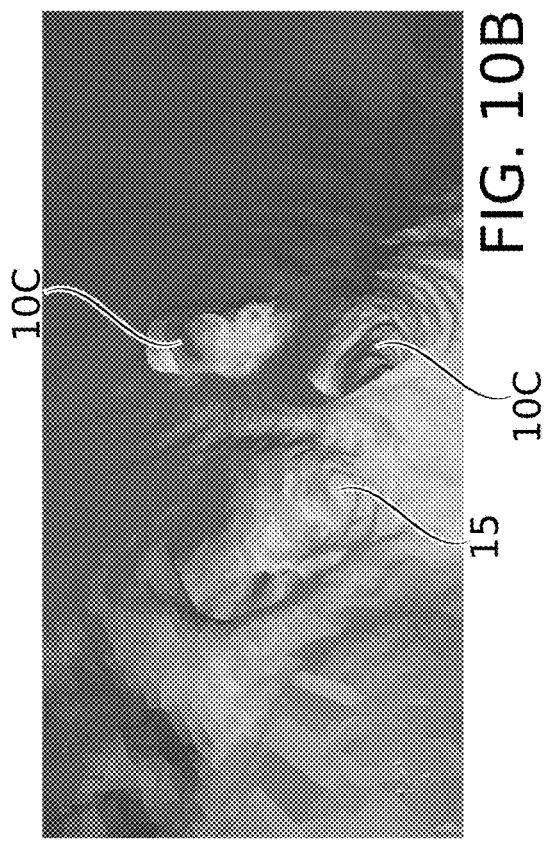
Figure 10B:
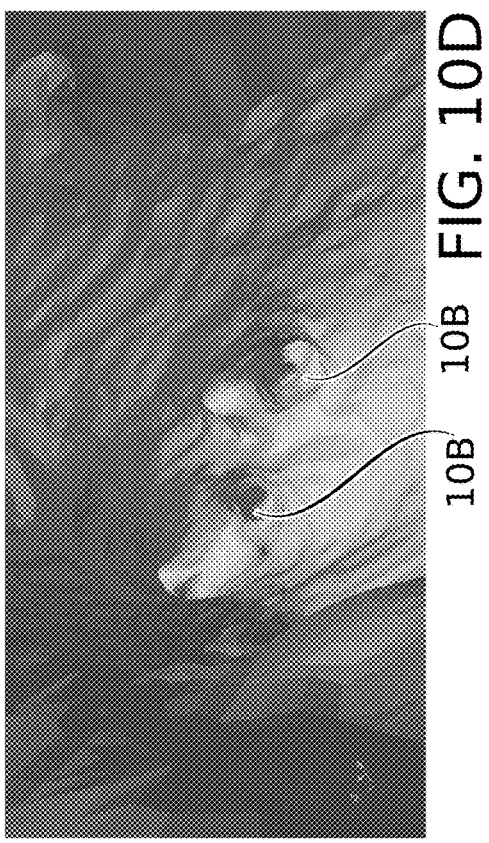

In FIG. 10A, LAA 15 and two left pulmonary veins 10C are shown in a 30° field of view (30° is the angular width of the field-of-view subtended left-to-right) from a perspective internal to the left atrium, and relatively near to the atrial surface. FIG. 10B shows the same features, from the same position, using a 60° field of view. In both cases, angular cropping complicates identifying at a glance exactly what features are shown, and in what the global orientation. This problem is somewhat reduced in the 60° view, however there is an added complication that regions near the edge of the image are compressed in the radial direction, while being relatively spread out in the circumferential direction.

Figure 10C:
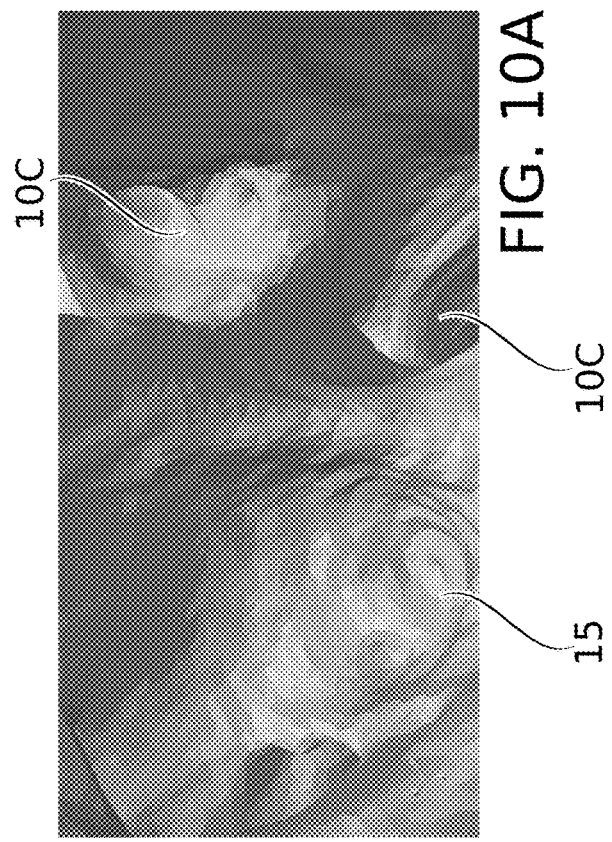
Figure 10D:
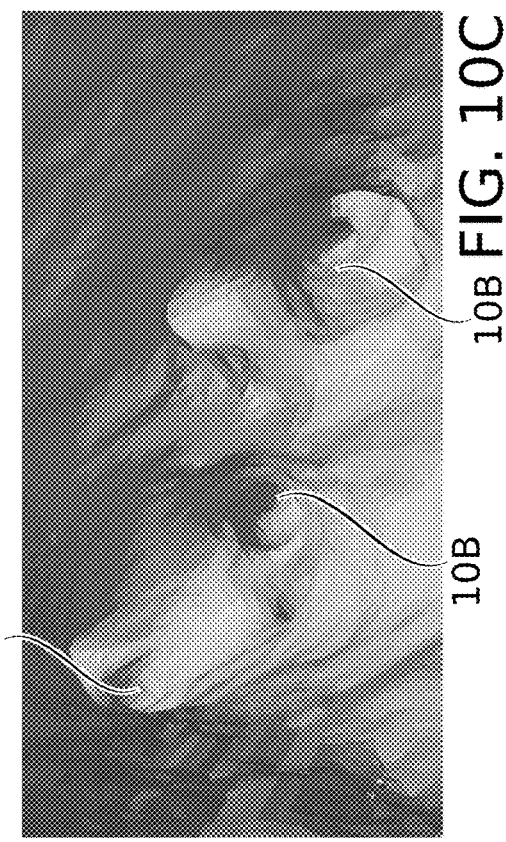

FIG. 10C shows the right pulmonary veins 10B (also in a 30° field of view). The features shown are clearly different from that of FIGS. 10A-10B, but on their own, they are difficult to unambiguously identify. In FIG. 1D, the field of view angle has been broadened to 60°, compared to the 30° field of view of FIG. 1C, but this apparently does not substantially improve the identifiability of the features in the central part of the field of view, while again introducing significant distortions of features near the image edges.

Apart from preservation of depth information in an intermediate flattened reconstruction, it should also be noted that the views of FIG. 1B and/or FIG. 1D are potentially different in character than would potentially be achieved, for example, by using a "fisheye lens" transformation of the source reconstruction, similar to views provided by ultra-wide-angle lenses and/or their simulations. Using computerized image transformation, it is possible to represent on one 2-D screen a 180° view or greater-angled camera view of a surrounding visual field, optionally up to a 360° view. However, this introduces distortions which increase for the edges of the visual field as the field of view angle increases (distortion potentially far beyond what is shown for the 60° views of FIGS. 10B and 10D). Potential disadvantages compared to the flattening just described in relation to FIG. 1B include:

They potentially become highly distorting of shapes and/or angles approaching their edges;
Distortion is potentially not inherently controlled for features of particular interest; and/or
Attachment of the view to a viewpoint could cause the distortions change to shape constantly as the central direction of view shifts.

Flattened Representations with Overlays

Reference is now made to FIG. 2A, which shows a flattened reconstruction view of left atrium 2 anatomy, according to some embodiments of the present disclosure. Further reference is made to FIG. 2B, which shows the view of FIG. 2A, with additional markers indicating ablation points 14, 14A and catheter probe 31, according to some embodiments of the present disclosure.

In FIGS. 2A-2B, the same anatomical features indicated in FIG. 1D and schematically in FIG. 1B are shown again based on a 3-D left atrium model, illustrating the "relief"-type display of features which the flattened reconstruction supports.

Also shown in FIG. 2B is a representation of a catheter probe 31. Ablation line 14 is represented by balls 14A embedded in the tissue around the pulmonary veins 10; each ball 14A optionally represents a sub-lesion of the ablation line. The similarity in size of each ball 14A is an indication of the relatively low relative distortion in the regions where they appear (each ball is rendered to be the same size in 3-D).

It should be noted again that although the images of FIGS. 2A-2B are flattened compared to the actual geometry of a left atrium, some features (particularly PVs) appear in 3-D relief. Optionally, the simulated illumination is dynamic in the flattened reconstruction view, e.g., by continuous linkage to the flattened reconstruction, which serves as a model of the 3-D scene illustrated in the view. In some embodiments, illumination effects are tied to motion of a catheter probe shown within the view, which can help provide a user with a sense of position of the probe in depth relative to displayed surface features. Optionally, the flattened reconstruction view itself can be re-oriented (tilted), for example as shown in FIGS. 7A-7B.

Reference is now made to FIG. 3, which schematically represents a flattened image 40 of left atrium 2 anatomy including a superimposed activation map, according to some embodiments of the present disclosure.

In some embodiments, a flattened reconstruction view of a tissue surface allows a user a simultaneous overview of features extending over a broad angular area. In FIG. 3, there is shown mapped to the LA anatomy an activation map, wherein color indicates relative time after an impulse begins that it reaches each particular region of the heart wall. The map clearly identifies at a glance (e.g., with reference to time scale 41 in milliseconds) that activity around pulmonary vein 10A is early enough to be a potential triggering source for impulses (and, accordingly, is potentially a preferred target for isolation by ablation). Moreover, since all PVs are shown simultaneously, it is relatively easy for an operator to assess differences between and/or track changes in map characteristics (e.g., as effects of ablation begin to appear in the map) at a range of widely separate target regions.

In some embodiments, use of superimposed (overlay) indications is used to indicate another parameter, for example, directions of blood flow, which potentially indicates differences between blood vessels, valves, and other apertures in a heart chamber. For example in a left atrium, inward flow is from the pulmonary veins, outward flow from the mitral valve, and flow is variable, low, and/or non-existent for the left atrial appendage. Use of an overlay to indicate wall thickness is also described, for example, in relation to FIG. 11D. In some embodiments, a plurality of different overlay indications are available, (e.g., any of those described herein), and they can be turned on or off in any suitable combination.

Reference is now made to FIGS. 8A-8B, which illustrate a source (un-flattened) reconstruction and a flattened reconstruction of a left atrium 2 having a contour overlay, according to some embodiments of the present disclosure. Some features previously discussed are also indicated here, for example, pulmonary veins 10, probe 31, proximity markers 33, 34, mitral valve 12, and left atrial appendage 15.

The two different pairs of PVs 10 are each marked with surrounding inner contours 801, 803, and a series of outer contours 802, 804. The contours are optionally spaced from each other at a constant distance along the surface (for example, as shown). This potentially helps in emphasizing 3-D structure, e.g., since contour lines will appear to be closer together where the surface angles away from perpendicular to the viewing angle. Distortions of contours 804 near the top of the image (splaying to horizontally wider intervals) also help to indicate the "stretching" effect of distortions introduced during the flattening transformation.

Flattened Representations with Probe Position Indications

Reference is now made to FIG. 4, which schematically represents a navigational situation of a catheter probe 31 represented as moving with respect to a flattened reconstruction view of a left atrium 2, according to some embodiments of the present disclosure. Reference is also made to FIGS. 5A-5B, which schematically represent indications of navigational target, distance from a surface and/or direction of a catheter probe moving with respect to a flattened reconstruction view, according to some embodiments of the present disclosure.

A full-surface view of a flattened reconstruction in particular, whether variable or static, provides a potential advantage for reducing the mental load on an operator working to move, monitor and/or otherwise operate (e.g., for treatment administration) a probe within an environment modeled by the flattened reconstruction.

In some embodiments, cues are provided which potentially help a user better understand the full 3-D position of a probe as it is shown moving with reference to a flattened reconstruction view of a target tissue. In some embodiments, the cues comprise a mark 33 which is projected onto a flattened reconstruction view of a surface of left atrium 2, depending on the current position of probe 31. Optionally, mark 33 highlights a position of a longitudinal axis extending through probe 31, at the region where it intersects the atrial wall. As the probe gets closer to the atrial wall (e.g., as in the movement between FIGS. 5A and 5B), the flattened reconstruction view shows mark 33 and probe 31 approaching each other more closely. This method potentially gives visual distinctiveness to different positions in depth when the catheter probe 31 is angled significantly away from an axis extending orthogonal to the wall. Optionally, in some embodiments, the mark is also shade- or color-coded to indicate distance (e.g., becoming more intense as the probe approaches the wall).

Optionally, the indicative change is a change in shape.

Another type of mark, in some embodiments, is illustrated by mark 35, which is optionally oriented to indicate a direction of movement and/or a direction of orientation of probe 31. Mark 35 is shown moving to different sides of mark 33 between FIGS. 5A and 5B; it should be noted that it does not necessarily track the orientation of the probe itself.

Moreover, mark 35 is shown shorter in FIG. 5B than in FIG. 5A. The difference in length optionally tracks distance from the surface of the atrium 2, as an example of a shape change used to indicate probe position in depth.

In some embodiments, lighting effects are used to help convey an impression of depth position to a user. For example, one or more simulated lights are positioned to cast shadows from probe 31 onto the surface of atrium 2. Optionally, this lighting is simulated in the flattened space defined by the transformed 3-D surface, as if it was a new space defined in Cartesian coordinates. Optionally or alternatively, the shading is rendered using the spatial configuration of the original 3-D space, and shadows are rendered and transformed like other features of the atrium surface 2.

In some embodiments, there is only one light source, optionally simulated as though emitting from the vantage point. Optionally, the shading of different portions of the surface is determined by the angle between the respective portion, and a line connecting the vantage point to the center of the respective portion, for example as in Gouraud shading.

As a probe 31 is withdrawn further and further from the surface (toward an origin defined in the transformation, for example), it optionally is shown distorted as though being transformed directly from the original 3-D space (i.e., using the same transform as is used to create the flattened reconstruction from the source reconstruction). Probe 31 may appear to enlarge greatly, and/or begin to move more quickly across the image for the same size movement, as if being held close to a "camera". In some embodiments, one or more of these transformation effects is suppressed in some fashion. For example, a probe is optionally always shown at the same size, about the same size, or at least not enlarged proportionally with its occupation of angular space with respect to a camera-like point of view. Potentially, this reduces a sense of disorientation that a dramatically magnifying probe might otherwise cause. For example, the probe is optionally plotted always at the same size, hovering over the flattened reconstruction view surface position which is nearest to it, and optionally with an angle appropriate to indicate its angle in the coordinates of the source reconstruction, in view of the selected rendering position in the flattened reconstruction. In some embodiments, rendering of the probe is simply suppressed for some circumstances (e.g., at positions very near to the coordinate origin), and allowed to re-enter the view at a well-defined position. In some embodiments, it is the view itself that changes; e.g., the coordinate origin is moved to keep it well away from the position of the probe, or the view changes to a view of the source reconstruction from a flattened reconstruction view.

In some embodiments, the position of the probe tip is transformed from the source reconstruction to the flattened reconstruction by the same transformation used for transforming the entire volume of the body portion, but the probe emerging from this position is always displayed straight, and optionally of a fixed shape and/or size. The orientation of the straight probe display may be determined, in some embodiments, by the coordinates in the flattened view of two points, e.g., one at the tip of the probe, and another near the tip of the probe.

A transformation origin and/or other projection parameters may also be adjusted, in some embodiments, even when the probe is moving near the tissue surface. For example, the origin is optionally moved closer to tissue regions near the probe, potentially magnifying their appearance (e.g., allowing more detailed tracking) as they begin to subtend a larger angular size. Alternatively, the origin is optionally moved to a position where it shows the current working region in the least distorted fashion available, which may be a more distant point of view. Either adjustment may produce a kind of lens effect (e.g., like a moving magnifying glass), allowing the whole flattened reconstruction to remain being seen at once (e.g., to maintain a sense of orientation and/or context), while also providing the ability to selectively enhance the view in particular areas. Optionally, any parameter of flattening and/or display is adjusted for a similar purpose, or another purpose assisting procedure operations. For example, a flattened reconstruction view is optionally tilted under manual user control and/or automatically in response to probe navigation events such as approaching apertures and/or contact with tissue.

In some embodiments, there is not just one point of view (as defined, e.g., by a coordinate frame of reference and/or global curvature) defined even for a particular flattened reconstruction view; but rather the point of view is defined differently for the transformation of different positions in space. The selected point of view is optionally varied, for example, as a function of just θ and φ, as a function of r, as a function of all three variables, or in any other suitable fashion. The point of view definition is optionally varied continuously, which can help to alleviate jarring transitions, with the selection made for transforming each region targeted to considerations particular to the region; for example, one or more of the considerations described herein. For example, as a function of r from some origin point, the point of view is optionally retreated in depth. This optionally reduces the problem of probe "looming", for example.

Reference is now made to FIGS. 6A-6B, which show the views of FIGS. 1C-1D, respectively, together with indications of the position of a catheter probe 31. In both figures, probe 31 is indicated at a fixed size. The position of probe 31 is determined, e.g., from a probe tracking method such as electrical field and/or magnetic field based tracking.

Also shown in each of FIGS. 6A-6B are surface proximity markers 33 and 34. Proximity marker 33 is positioned to be centered on a point where a central longitudinal axis of probe 31 intersects the source or flattened reconstruction surfaces. This mark is potentially useful in indicating where a catheter probe will make contact if advanced from its current position without additional steering control. Proximity marker 34 is positioned to be centered on a point of the source or flattened reconstruction surfaces closest to a distal tip of probe 31. If the flattened reconstruction view is oriented perpendicular to a line connecting it to the view's vantage point, this will generally put proximity marker 34 directly "under" the distal tip of probe 31, while at offset view angles, the distance between probe tip and proximity marker 34 becomes an indication of probe-surface distance. Proximity marker 34 is potentially useful, for example, for indicating a potential for oblique surface contact and/or interference with movements of probe 31. When the probe moves towards the wall, the two markers 33 and 34 tend to approach each other, and when the probe is close to touching the wall, the markers may overlap each other.

Flattened Representations at Different Orientations

Reference is now made to FIGS. 7A-7B, which show the same flattened reconstruction shown in FIGS. 1D and 6B, viewed at different tilt angles, according to some embodiments of the present disclosure. Probe 31 and proximity markers 33, 34 are also shown in their visible positions.

In the angles shown, features of the flattened reconstruction can be viewed from the side and back. For example, more blood vessel branches from pulmonary veins 10 are visible than from a substantially front-side (that is, interior-side) view. The surfaces of these vessels ramify as branches exterior to (behind) more interior regions of the flattened representation. This illustrates in particular that in distinction, for example, to a wide-angle projection image, there can be, for any particular (x,y) coordinate pair, a plurality of surface z positions. It should be noted in particular that positions of surfaces defining blood vessels and their branches are mapped, in some embodiments, using position measurements obtained by movement of a catheter probe within a body lumen. This potentially reduces or removes a need for the use of contrast media in depicting blood vessel morphology.

It is also noted that the reconstruction is shown as everywhere closed; for example, blood vessels are shown "sealed off" at the limit of their representation in the flattened reconstruction. This is a feature inherited from the source reconstruction. There is no particular requirement to avoid holes in producing the flattened reconstruction; e.g., holes in the source reconstruction may be considered to represent surfaces "at infinity", or simply treated as missing data during the transformation.

Flattened Representations of the Right Atrium

Reference is now made to FIGS. 11A-11D, which show different flattened reconstruction views of a right atrium 3, according to some embodiments of the present disclosure.

Figure 11A:
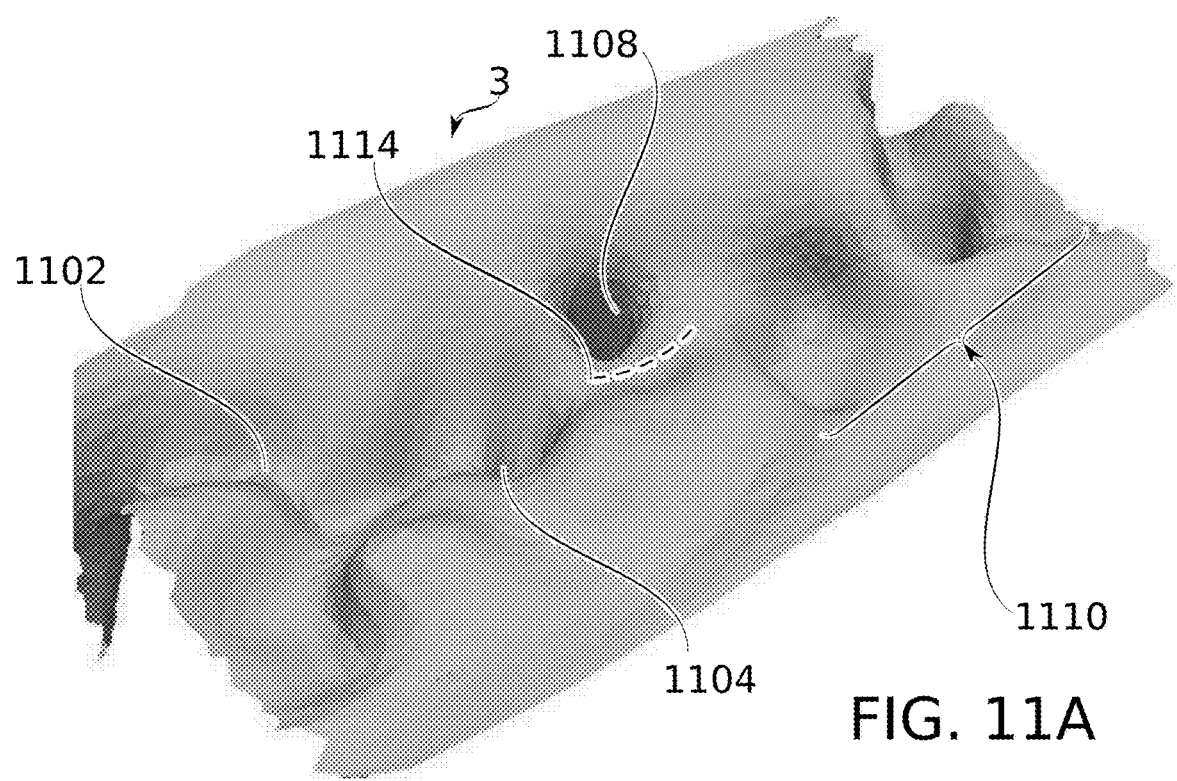
Figure 11B:
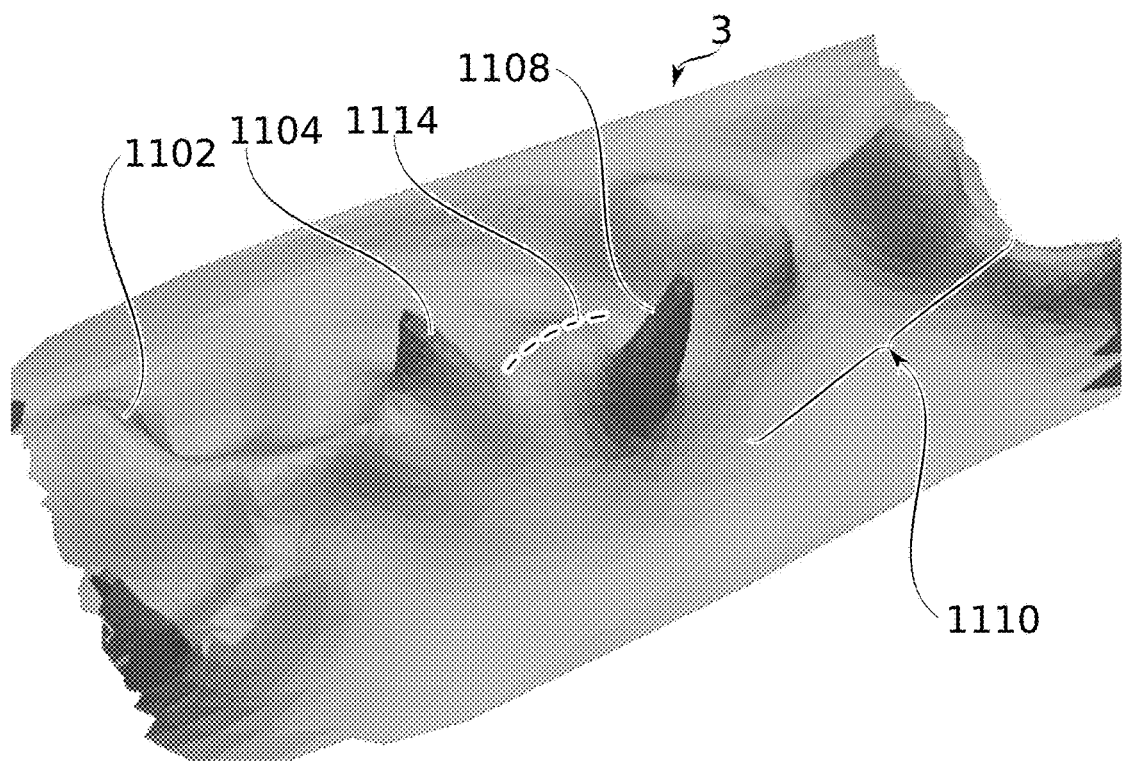
Figure 11C:
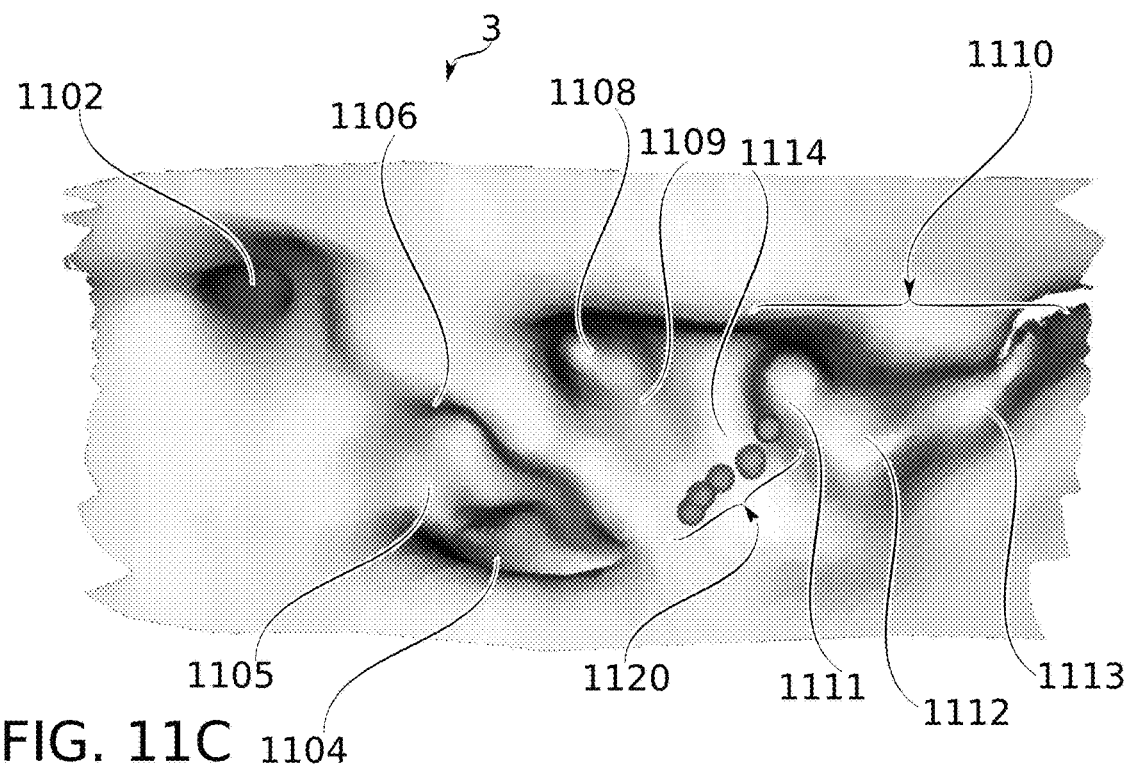

Particular features of a right atrium 3 shown in one or more of FIGS. 11A-11D include apertures leading to superior vena cava 1102, inferior vena cava 1104, and coronary sinus 1108 (CS). Also shown in one or more of FIGS. 11A-11D is tricuspid valve 1110. In FIG. 11C, more details of tricuspid valve 1110 are particularly indicated, including septal, posterior, and anterior leaflets 1111, 1112, and 1113, respectively. FIG. 1C also indicates positions of the fossa ovalis 1106, Eustachian valve 1105, and Thebesian valve 1109.

With particular reference to FIGS. 11A-11B, there are shown front (interior-side, endocardial view FIG. 11A) and back (exterior-side, epicardial view FIG. 11B) views of a flattened reconstruction of a lumenal surface of right atrium 3. It should be understood that there is no particular limitation to these exact orientation. For example, a plurality of images from the flattened 3-D model may be produced from any suitable viewing angle, wherein a first image is a view of the flattened 3-D model from a first direction, a second image is a view of the flattened 3-D model from a second direction, and the first and second images show different sides of a same surface portion.

Particularly noted is the position of the cavotricuspid isthmus 1114 (CTI; located along the indicated dotted line). The CTI 1114 is of interest as a target for certain ablation procedures in the right atrium, for example for the treatment of atrial flutter. In some patients having a condition of atrial flutter, the condition is contributed to by slow conduction along some directions through the CTI 1114. By showing the CTI 1114 laid out in clear relation to nearby features, there is a potential advantage of a flattened reconstruction view for assisting a physician in locating and characterizing this feature for purposes of planning ablation, ablating, and/or verifying ablation along the CTI 1114.

FIG. 11C shows an example of ablations 120 applied over the CTI 1114. It is noted that the particular flattened reconstruction layout of the inner lumenal surface of right atrium 3 places the tricuspid valve 1110 at one border (the right), the superior vena cava 1102 at an opposite border (the left), and generally vertically centering the aggregate of right atrium 3 apertures which extend in between. This arrangement potentially serves to place discontinuities in the display at positions where they make little difference to decisions and operations involved in navigating and/or treating the right atrium.

With respect to coronary sinus 1108: interventional cardiologists and electrophysiology specialists are often challenged by a high degree of variability in the coronary venous anatomy during coronary sinus cannulation, left ventricular epicardial lead placement for cardiac resynchronization therapy (CRT), and/or intra-CS device deployment for mitral valve repair. A precise and fully-automatic segmentation solution for detecting the coronary sinus would provide a potential advantage for such procedures.

Using field gradient-based remote imaging using an intracardial electrode probe system the CS is among the features which may be rapidly distinguished within a right atrium 3. The CS "bud" on the 3-D reconstruction (source reconstruction) and its corresponding 'dimple' on the (interior view) flattened reconstruction view may both be displayed within merely a few seconds after introducing a standard electrophysiology catheter into the right atrium—even before physically touching the endocardial surface. Field gradient-based remote imaging also potentially enables easily identifying and displaying of Thebesian valve 1109, guarding the opening of the CS 1108, that often obstructs cannulation of the CS 1108. The Thebesian valve 1109 anatomy is variable and rarely depicted in full by CT.

Once identified, the full course and anatomy of the CS 1108 can be determined by once or more inserting and pulling back the electrophysiology catheter. This is a straightforward maneuver, requires no contrast media or fluoroscopy, can potentially produce a highly accurate result.

Figure 11D:
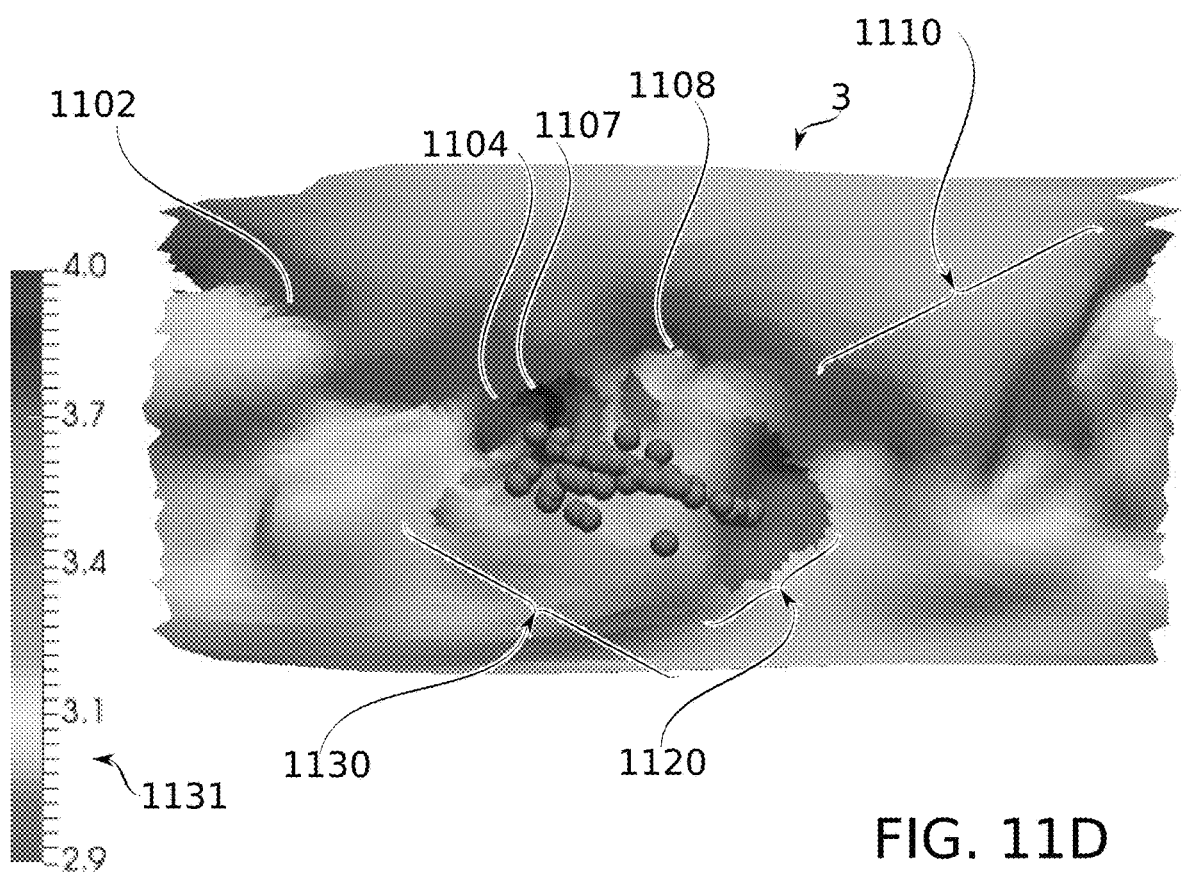

FIG. 11D shows an (optionally color) overlay 1130 which indicates tissue thickness over a portion of the surface of right atrium 3. In particular, a region of maximal thickness 1107 is shown near the inferior vena cava 1104 (bar 1131 indicates how thicknesses map to shading of overlay 1130). In carrying out treatment ablations (the optional positions of which are indicated by spheres 1120), it is a potential advantage to know where tissue is thicker and thinner, for example to allow adjustment of ablation parameters to ensure transmural ablation, and/or to avoid regions which are potentially too thick to effectively ablate or too thin to safely ablate.

Flattened Representations from Field Gradient-Based Remote Imaging of the Left Atrium Reference is now made to FIG. 12, which presents a detailed flattened reconstruction view of a left atrium based on data acquired using field gradient-based remote imaging, according to some embodiments of the present disclosure.

In some embodiments, data representing positions of a lumenal surface of a body cavity are obtained using a remote electrical field imaging method, for example a method described in U.S. Provisional Patent Application No. 62/546,775 entitled FIELD GRADIENT-BASED REMOTE IMAGING, and filed Aug. 17, 2017; the contents of which are incorporated herein in their entirety.

FIG. 12 indicates potential levels of left atrium surface detail which can be obtained using this method, displayed using the flattened reconstruction method.

Features shown already noted with respect to other figures herein include the pulmonary veins, here indicated specifically as the right superior pulmonary vein 10D, right inferior pulmonary vein 10E, left superior pulmonary vein 10F, and left inferior pulmonary vein 10G. Also shown are the left atrial appendage 15, trans-septal 17, and mitral valve 12.

The clarity of the orifice of the left atrial appendage 15 is potentially greater than typically seen in echocardiography, providing a potential advantage for the planning, guidance and/or verification of left atrial appendage occlusion procedures. Optionally, the flattened reconstruction view is used to characterize the LAA orifice shape and/or dimensions.

Certain additional details can also be seen, including the left atrial appendage ridge 19. The clarity of the left atrial appendage ridge 19 is potentially greater than typically seen in CT scans, providing a potential advantage for the planning, guidance and/or verification of ablations for arterial fibrillation, while saving exposure of the patient and doctor to X-ray radiation. The morphology of ridge 19 is variable among different patients (e.g., it can be more or less prominent), and this can have a substantial impact on how ablation should be performed—e.g., by its thickness (potentially requiring stronger ablation parameters, for example) and/or by its effect on ablation line morphology (e.g., there may be a need to ablate on the sides of the ridge in order to get a continuous ablation line capable of blocking electrical impulse transmission). Potentially, clearer visualization of the ridge or other surface irregularities helps a physician to understand the results of a treatment (e.g., understand why blockage is not initially achieved by an ablation treatment), and/or to plan new actions that will adjust the results.

Also shown are certain details of the mitral valve, including the three divisions 1301, 1302, 1303 of the posterior mitral valve leaflet, and the three divisions 1304, 1305, 1306 of the anterior mitral valve leaflet. This level of detail is seldom seen in CT scans, and illustrates a potential advantage of the method of field gradient-based remote imaging, optionally in conjunction with a flattened reconstruction view, for procedures such as mitral valve repair.

Systems for Flattened Representations of Curved Body Tissue Surfaces

Reference is now made to FIG. 13, which schematically represents a system for production of a flattened reconstruction 1228 and/or flattened reconstruction view 1232, according to some embodiments of the present disclosure.

Block 1224 represents a source reconstruction, which is optionally provided and/or created based on data from a surface position sensing source 1220 and/or 3-D image source 1222. The surface position sensing source 1220 comprises, for example a catheter probe-based sensing system, using sensing of crossed electrical fields, self-generated electrical fields, local impedance characteristics, and/or another modality to generate data indicating positions of body tissue surfaces; for example by contact and/or proximity sensing together with probe position sensing, by remote field imaging, and/or by another method. The 3-D image source 1222 comprises, for example, an MRI image, CT image, radiography image, or another image type.

Transformation module 1226, in some embodiments, comprises a computer processor, processor instructions, and functionally associated computer memory, which are configured to transform source reconstruction 1224 into flattened reconstruction 1228, for example as described in relation to FIGS. 1A-1G herein.

Rendering module 1226, in some embodiments, comprises a computer processor, processor instructions, and functionally associated computer memory, which are configured to produce a flattened reconstruction view 1232 from flattened reconstruction 1228. For example, rendering module 1226 is configured to render (e.g., using 3-D graphics processing hardware) a 2-D image from 3-D position data described by flattened reconstruction 1228.

Examples of Global Curvatures and Flattening Results

Reference is now made to FIGS. 14A-14E, which schematically illustrate different 2-D examples of pre-flattening and post-flattening global curvatures and relief details, according to some embodiments of the present disclosure. The examples are provided in 2-D (that is, using curvatures of paths in two dimensions) to illustrate concepts described herein in particular relation to curvatures of surfaces in three dimensions.

In FIG. 14A, curve 1401 represents a cross-section of a surface which is to be flattened. Circle 1402 represents a choice of the global curvature (e.g., a cross section of a sphere) which is to be flattened. In the particular example shown, circle 1402 is chosen as a type of "best fit" circle. About as much area (analogous to volume, in the 3-D case) is enclosed by circle 1402 and not curve 1401 as is enclosed by curve 1401 and not circle 1402. FIG. 14B represents a flattened version of FIG. 14A. Line 1402A corresponds to circle 1402, with all the curvature of the circle removed. Cure 1401A represents relief details which remain in curve 1401 after removal of the global curvature. It is noted that any circle concentric with circle 1402 (for example circle 1403) will also be flattened in this transformation (for example, as shown by circle 1403A).

FIG. 14C represents a different flattened version of FIG. 14A, with some of the global curvature represented by circle 1402 remaining in flattened circle 1402B and flattened curve 1401B. Equivalently, a different choice of global curvature such as curve 1404 could be used as the basis of flattening (and then flattened completely, for example line 1404B) to result in a shape like that of 1401B.

The choice of global curvature is not limited to circles (or spheres in 3-D), and a different choice can lead to a different residual result of preserved relief features. For example, ellipse 1404 of FIG. 14D illustrates a different function which could be used to model a global curvature of path 1401. The resulting flattened curve (not shown) would suppress relief features such as the pattern of long peaks 1410 and valleys 1412 which superimposes on the shorter peaks 1412 and valleys 1413 of FIG. 14B.

FIG. 14E shows another example in which a global curvature of an open-sided curve 1405 is modeled by a parabola 1406 (in 3-D, the global curvature model could be a paraboloid, for example).

Considering circle 1402 (for example) as a reference shape, it may be said that curve 1401 represents a shape isomorphic with relief details (like 1401A, 1402A, 1410, 1411, and 1412 of FIG. 14B, for example) superimposed upon the reference shape 1402 curving around a point interior to curve 1401 (which may be the center point or any other interior point). The relief details superimpose relative differences in radial offset from the interior point. The same language applies, changed as necessary for surfaces (rather than 2-D curves) represented in three dimensions by source 3-D models (which are the 3-D equivalent of a 2-D curve like curve 1401).

The word "isomorphic" in the foregoing paragraph should be understood to mean that the curve 1401 has the same shape as the reference curve added together with the relief details (e.g., by offsetting). The terminology defines a way of referring to the relief details represented in a flattened 3-D model, and of explaining their relationship to relief details in a source 3-D model, without necessarily requiring that an explicit decomposition into relief details and reference shape is actually performed.

Examples of Features Distinguishable on Flattening Results

Reference is now made to FIGS. 15A-15D, which schematically illustrate features visible on a flattened representation view of a right atrium (FIGS. 15A-15B) and left atrium (FIGS. 15C-15D), according to some embodiments of the present disclosure.

Figure 15A:
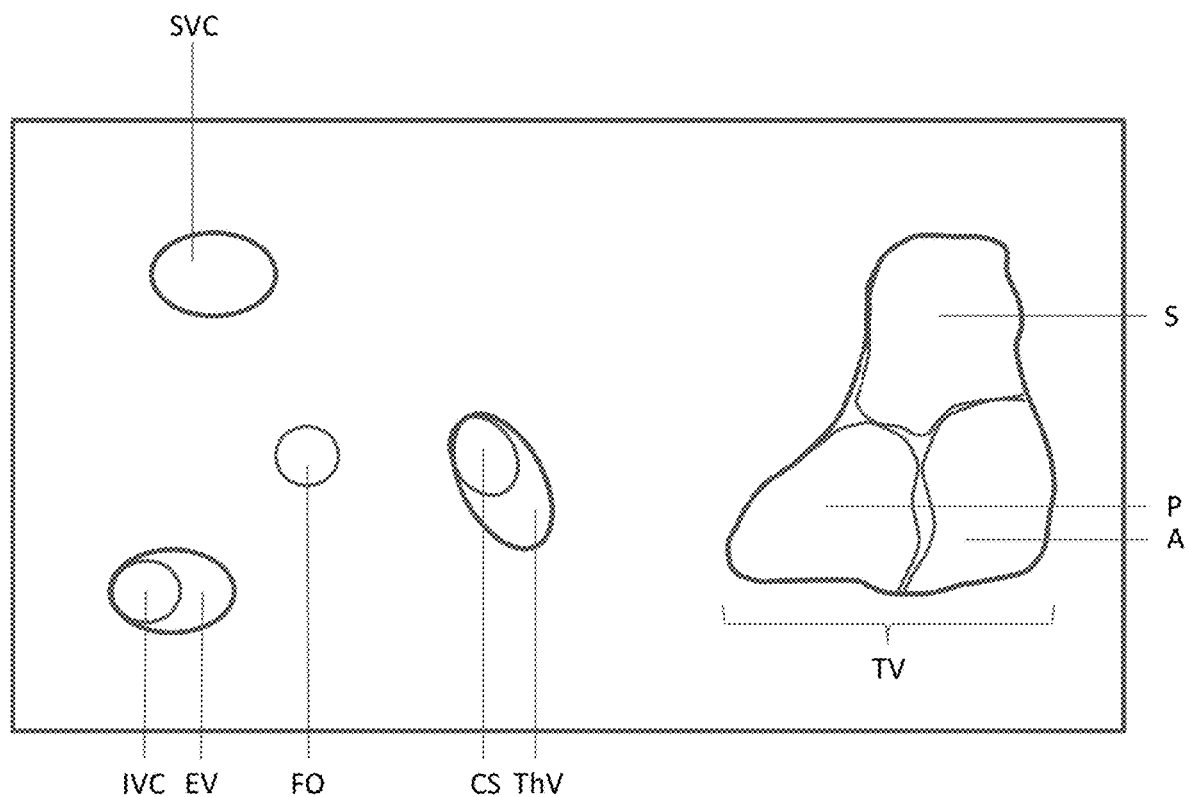
Figure 15B:
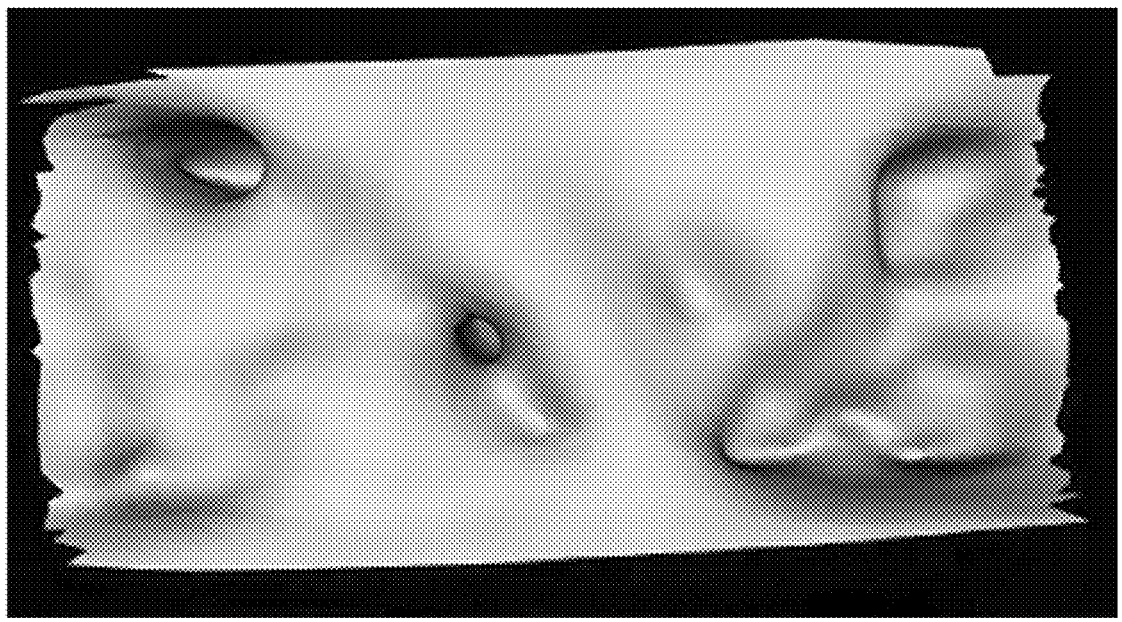
Figure 15C:
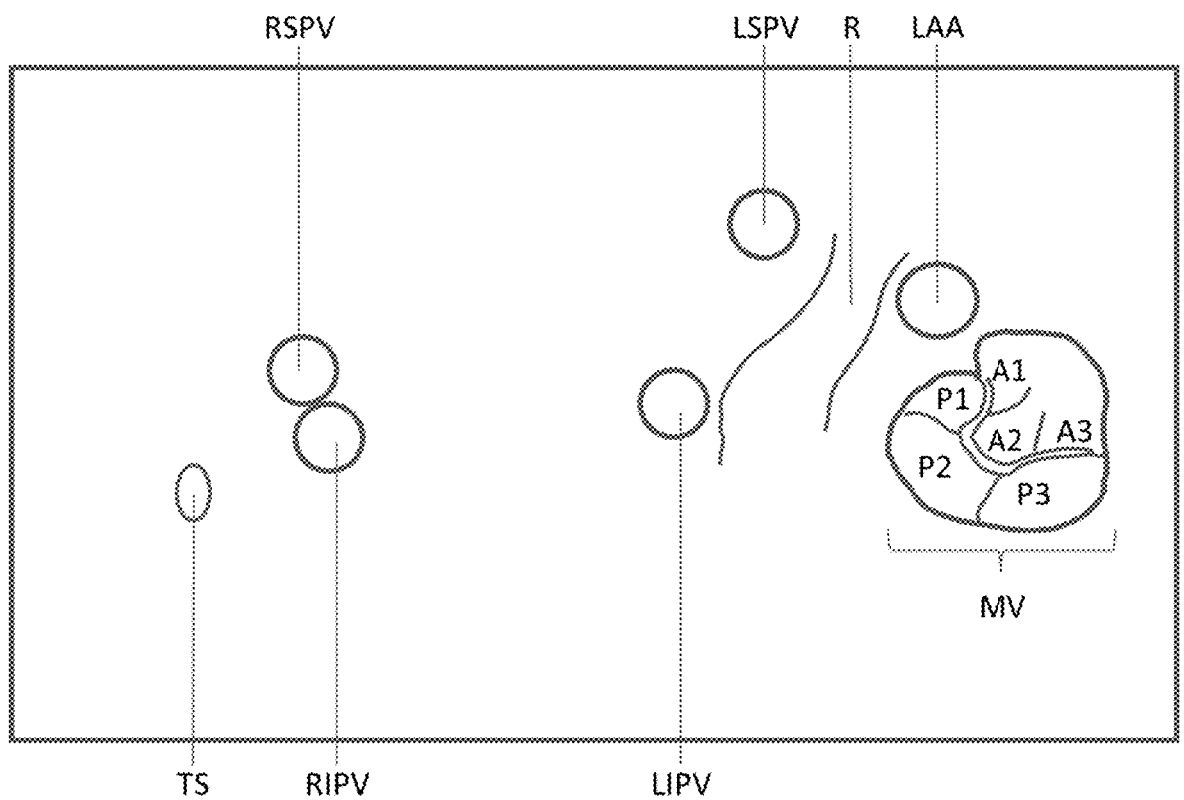
Figure 15D:
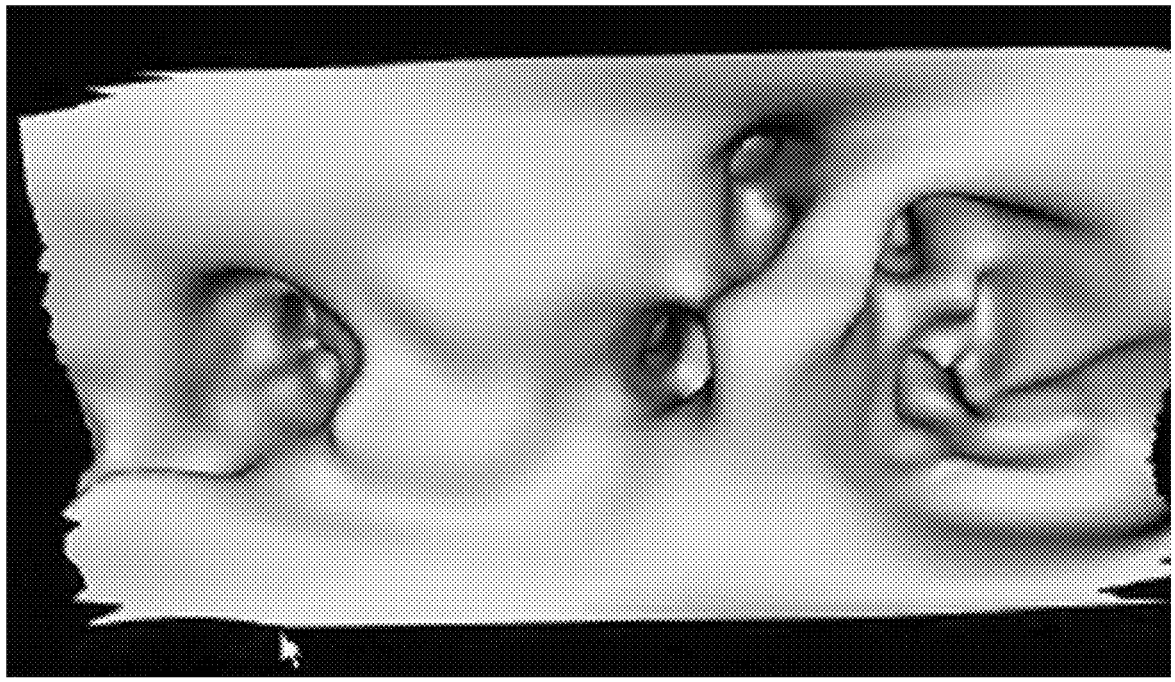

FIGS. 15A and 15C identify in outline features visible in corresponding positions in the flattened representation views of FIGS. 15B and 15D, respectively.

Features identified in FIG. 15A include:

| | |
|---|---|
| SVC | superior vena cava |
| IVC | inferior vena cava |
| EV | Eustachian valve |
| FO | Foramen ovalis |
| CS | Coronary sinus |
| ThV | Thebesian valve |
| TV | Tricuspid valve |
| S, P, A | Septal, posterior, and anterior leaflets of the tricuspid valve |

Features identified in FIG. 15C include:

| | |
|---|---|
| TS | Trans-septal puncture |
| RSPV | Right superior pulmonary vein |
| RIPV | Right inferior pulmonary vein |
| LSPV | Left superior pulmonary vein |
| LIPV | Left inferior pulmonary vein |
| R | Ridge of the left atrial appendage |
| LAA | Left atrial appendage |
| MV | Mitral valve |
| P1, P2, P3 | First, second, and third posterior leaflet regions |
| A1, A2, A3 | First, second, and third anterior leaflet regions |

Reference is now made to FIG. 16A, which illustrates a triangular meshing of the shape of a left atrium, according to some embodiments of the present disclosure. Reference is also made to FIGS. 16B-16E, which illustrated different flattenings of the triangular meshing of FIG. 16A, according to some embodiments of the present disclosure.

The meshing of FIG. 16A comprises substantially equilateral and equal-sized triangles.

FIGS. 16B and 16D show internal (endocardial) and external (epicardial) views of the same flattened 3-D representation of the mesh of FIG. 16A. The flattening has been performed according to a rectangular transformation, as described, for example, in relation to FIGS. 1C-1D. Triangles of the mesh are more nearly equilateral and uniform in size near the equatorial (central left-to-right) regions of the mesh. Nearer to the poles, (top and bottom), the triangles are stretched out, which is indicative of the increasingly smaller circumference (and so, smaller number of triangles) represented at each near-polar level. It may be noted in particular that horizontal lines extending from one edge of the flattened 3-D model to another edge of the flattened 3-D model distort distances relative to the source 3-D model by substantially the same amount through the linear region they extend across. The distribution of distortions may be changed in this as in other projection types by changing the parameters of how the flattening is performed, e.g., where discontinuities are introduced, and what region is to be centered in the resulting flattened 3-D model.

FIGS. 16C and 16E also show internal (endocardial) and external (epicardial) views of the same flattened 3-D representation of the mesh of FIG. 16A. The flattening has been performed according to an elliptical (Mollweide) transformation. The Mollweide projection corresponds to an equal-area, pseudocylindrical map projection which trades accuracy of angle and shape for accuracy of proportions in area. The triangles in these two images remain more nearly equal in area and shape over the extent of the image, though the angular distortion results in the "up" and "down" directions (for example) tilting toward the sides near the left and right edges of the reconstructions.

In either type of projection, there is also some change in triangle size due to the way that differences in depth cause differences in stretching during the "unwrapping".

It should be understood that the types of flattening are not limited to those shown, and may include, for example, the depth-preserving equivalent of any globe map projection method.

Examples of Continuous Updating of Images Using Flattening Results

Figure 17A:
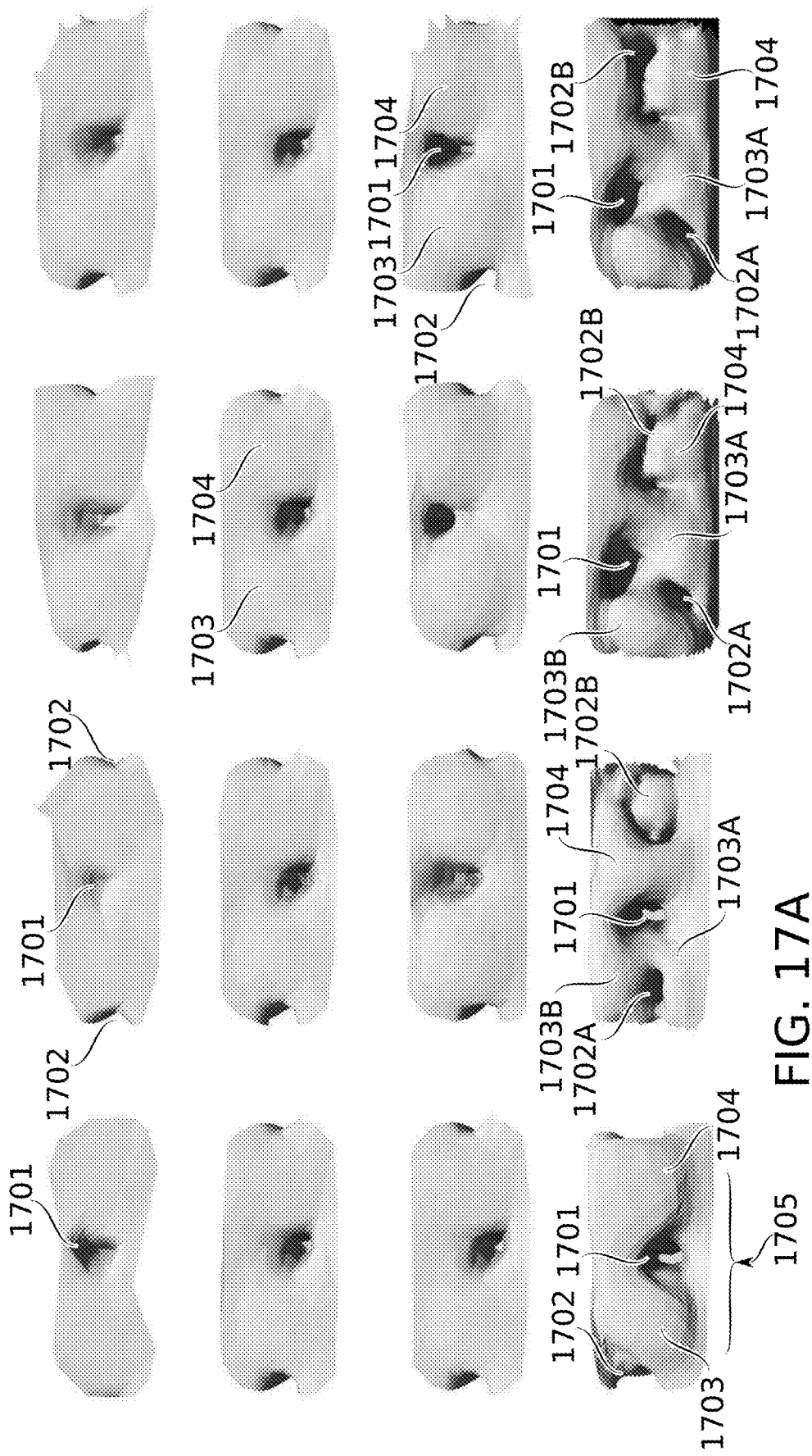
Figure 17B:
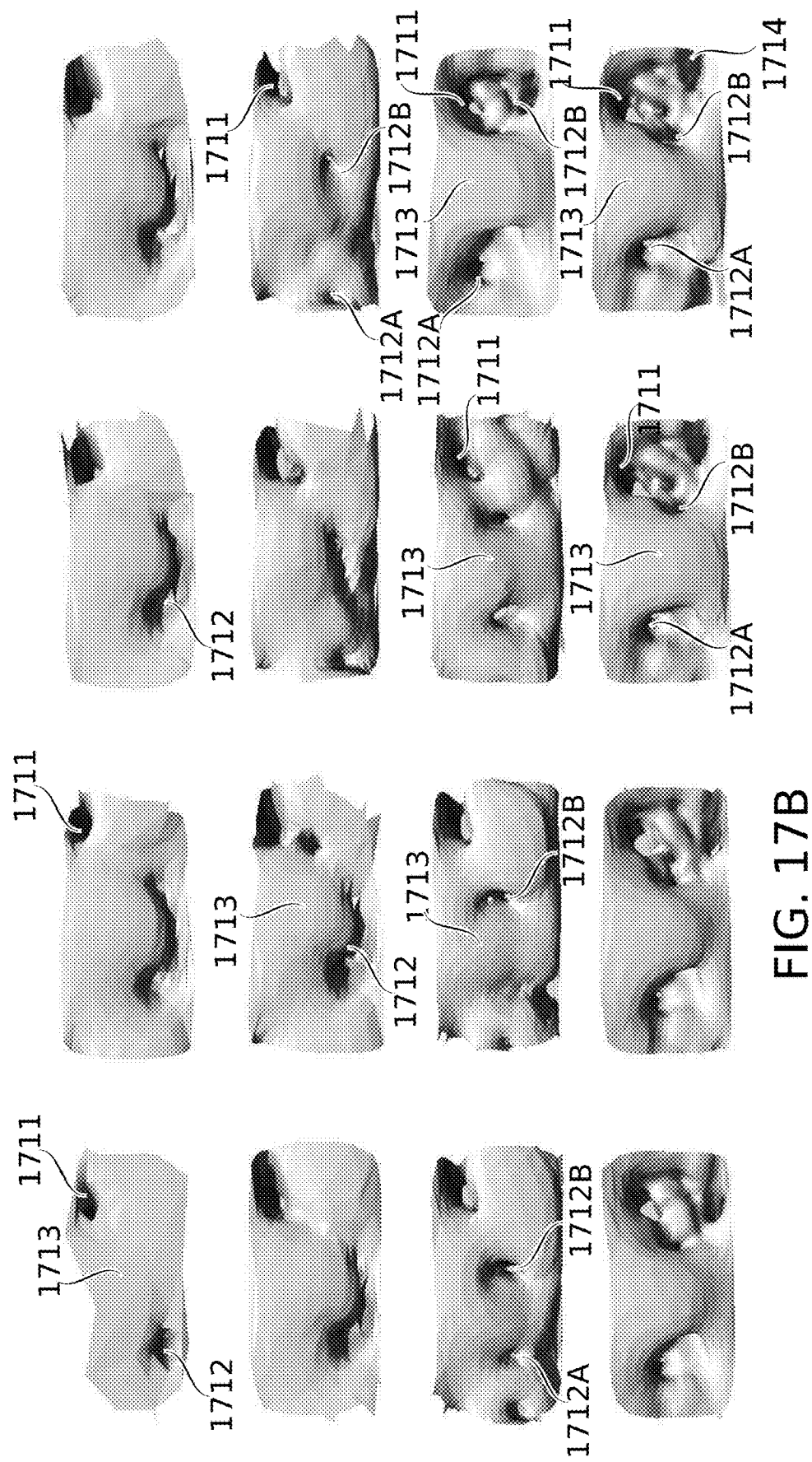

Reference is now made to FIGS. 17A-17B, which each show a sequence of images produced from maps of various measurement phases (earlier to later). The maps of later measurement phases are more refined, and show more body lumen wall structure; based on a cumulative set of intraluminal voltage measurements. In the images shown, measurements were made using a method of electrical field measurement from measurement probe positions within the body lumen and remote from the body lumen wall, for example as described in U.S. Provisional Patent Application No. 62/546,775 entitled FIELD GRADIENT-BASED REMOTE IMAGING and filed: Aug. 17, 2017; the contents of which are included herein by reference in their entirety. However, the general principle of updating the flattened images in response to new probe-measured data during a procedure as it becomes available applies also to other forms of probe mapping methods and/or measurements, for example methods described in U.S. Provisional Patent Application No. 62/445,433 entitled SYSTEMS AND METHODS FOR RECONSTRUCTION OF INTRA-BODY ELECTRICAL READINGS TO ANATOMICAL STRUCTURE and filed Jan. 12, 2017, and also an International Patent Application filed on the same date as this application PCT/IB2018/050192, the contents of which are included herein by reference in their entirety.

Measurements used in FIGS. 17A-17B are from a patient. Each of the two image sequences will be described with reference to certain selected features shown, and their evolution throughout the sequence. The sequences each proceed in time from left to right and from top to bottom (i.e., the upper-left image is the first image in the sequence, the image below it is the fifth image in the sequence, and the image in the lower right is the sixteenth and last image in the sequence). Images are displayed as endocardial (that is, internal views of the internal surface of the body lumen) panorama views, for example as described in relation to FIGS. 1C-1D, herein. The imaged regions shown comprise interior surfaces and connecting lumens, apertures, and/or cavities of a left atrium.

In FIG. 17A, the initial image produced (e.g., using data obtained by an electrode probe just after passage of the fossa ovalis from the right atrium into the left atrium) is very low in overall detail resolution, and shows essentially just one putative lumen 1701. Lumen 1701 has been automatically assigned to the central position in the unwrapped panoramic image, based on a weighting algorithm that seeks to put the "center of mass" of features distributed over the surface of the map at the center of a panoramic image produced from the map.

As the number of available measurements increases, an apparent second aperture 1702 appears in the images, offset from the first by about 180° (feature 1702 appears split, because it straddles the division made to splay the atrium surface into a panoramic view). Later in the crossing (in the second row of four images), two relatively raised regions 1703, 1704 also make an appearance. The raised regions, however, are potentially better characterized as (initially) "feature free" regions, relative to the relative receded regions corresponding to directions which have been better measured so as to reveal features of the surface. All of these features move around slightly as the addition of new measurements results in a change in the center of mass (and thus a change in automatic flattening parameters used) of the features represented by the images of FIG. 17A. By the end of the third row, the recessed features identified are represented with relatively high resolution (sharper edges generally, for example, and resolution of two holes within region 1701). However the detail available remains limited by the restricted initial sampling region and probe orientations used.

Beginning in the fourth row, aperture feature 1702 now splits into two sub-features 1702A, 1702B. Region 1703 splits into two subregions 1703A, 1703B. After revealing some new detail in area 1702B, the probe orients toward the region of features 1701 and 1702A, making measurements that finally appear to resolve them as the left PVs and the right PVs, respectively. These veins are optionally treatment targets, e.g., targets of a line ablation procedure intended to electrically isolate the pulmonary veins so that they can no longer transmit impulses to the atrium which can result in uncoordinated contractions and/or atrial fibrillation. In the final image of the sequence, the measurement probe has returned to a position where it can measure the region of feature 1702B, which now resolves as the apparent aperture leading to the mitral valve (at far right of the darkened region indicated as feature 1702B), and another region (the left lobe of the darkened region 1702B) which apparently indicates the LAA. Optionally, a user is presented with an interface allowing manual tagging of features as their identities become apparent. Optionally, features are identified automatically based on their characteristics; individually and/or in comparison with other resolved features.

Turning to FIG. 17B, two aperture-like features 1711, 1712, and one raised area 1713 (really a "featureless" region) are initially visible. Further measurements result in refinement of this picture up to about the second image of the second row. The region of feature 1712 (near the lower middle of the image) is selected as a first target for refinement by collection of additional data. This allows feature 1712 to become resolved into two distinct apertures 1712A, 1712B, with raised area 1713 acquiring some feature texture and protruding in-between. By the last image of the third row, the measurement probe has also explored feature 1711, which is revealed as partially merging with feature 1712B. The final image (at lower right) reveals the right pulmonary veins within region 1712A (the two lobes of the darkening there apparently corresponding to the ostia of the superior and inferior right pulmonary veins). The ostia of the left pulmonary veins are joined adjacent to one another (comprising feature 1712B) in a depression in common with the left atrial appendage (corresponding to feature 1711), with a recessed ridge in between. Raised region 1713 remains featureless extent extending between the left and right pulmonary vein ostia. Another depression 1714 has also become apparent, apparently associated with features of the mitral valve.

Further Flattening Transformations

Several methods for unfolding or flattening a model surface of an inner (or other) surface of a body have been described above. Described below are further methods for unfolding a model surface of an inner surface of a body that can be used in place of (or in addition to) any of the methods described above in conjunction with the described applications. In general, the surface of the body may be the outer surface of that body or the inner surface. For example, if the body is a heart chamber, the model surface may be a model of the outer surface of the heart chamber or of the inner surface of the heart chamber. An inner surface is referred to below by way of example.

In general terms, an unfolding transformation is a transformation that transforms a closed 3-D model to an unfolded open 3-D model. The unfolded model is also referred to as a flattened 3-D model. If an unfolding transformation is applied to an open 3-D model, the open 3-D model becomes more open. For example, if the 3-D model being transformed may be defined as an open smooth surface with relief details, the unfolded model may be defined as an open surface of lesser global curvature with corresponding relief details. Thus, an unfolding transformation is a transformation that transforms a model surface into a (more) open surface, for example a surface having a smaller global curvature than the model surface. The model surface is a 3-D model of the inner surface of a body (also referred to as the source 3-D model), and the open surface is the unfolded model. If the model surface comprises relief details, the relief details may also be transformed into relief details on the open surface. That is to say, the relief details are maintained through the transformation and are not lost during transformation, although they may be distorted. The unfolded model or open surface therefore comprises the same or corresponding relief details as 3-D model or the closed surface. The unfolding transformation may transform a 3-D model into an unfolded model, wherein the unfolded model is an open surface. The unfolding transformation thus transform a model of a 3-D inner surface of a body into an unfolded 3-D model of the inner surface. The method is particularly useful where the inner-surface of the body is a non-developable surface.

The 3-D model of an inner 3-D surface of a body may be defined by points on a model surface, which models the inner surface. The unfolding transformation may thus transform points of the model to corresponding points of an unfolded model defining the unfolded model surface, and thus an unfolded model of the inner surface.

With reference to FIG. 18, a method of visualising a 3-D model of an inner 3-D surface of a body comprises a step of 1810 of obtaining 3-D cartesian coordinates of points of the model. The model is defined by the points and the points define a model surface that represents the inner surface of the body. The model surface may be a non-developable surface, and the model surface may be a closed surface. In other words, the model surface may have two-dimensional curvature such that the surface cannot be flattened without distorting respective distances between points on the surface. The model may be obtained from signals from a catheter 1920 as described below or may be provided on a computer-readable storage medium or over a data connection for visualisation. Coordinates of points used in the method described above may points that have been derived from the catheter signals to define the model, or any other points defining the model or extracted from the model.

The action of obtaining the 3-D model may comprise, in some embodiments, reading coordinates from a file, or receiving data from a digital memory in any other way. In some embodiments, data indicative of the coordinates of a model of the inner surface is obtained, and these data are processed using methods discussed below to produce the unfolded model.

At step 1820, an unfolding transformation is applied to the points defining the model surface of the model. The unfolding transformation may be applied to each point of the model and transforms the coordinates of each point of the model to transformed 3-D coordinates or points. The transformed points define an unfolded model surface, that is an open surface that represents an unfolded model of the inner surface of the body. The unfolding transformation is carried out by a processor of a computing device, for example a processor 1950 as described below.

At step 1830, a view of the unfolded model surface is displayed on a display or the unfolded model and/or view may be stored for later display. The view of the unfolded model may be displayed by a display 1960 as described below with reference to FIG. 19, such as a video display unit such us a liquid crystal display (LCD) or a cathode ray tube (CRT). The view of the unfolded model may be a view of the points on the unfolded model surface, wherein each point is displayed at its respective transformed coordinates, for example in the form a wire mesh, solid lit surface, polygons or splines defined by the points or using any other suitable visualization technique.

To generate any view of the unfolded model at step 1830, in some embodiments, the coordinate system of the unfolded model relative to the viewing frame of reference may be determined. This defines a viewing direction from which the unfolded model is viewed or in other words defines an orientation of the unfolded model relative to the viewing frame of reference.

A reference cartesian coordinate system may be displayed together with the view of the unfolded model. It is usually preferable to choose two cartesian planes that are perpendicular to each other, like the XZ and XY planes. The perpendicularity is not necessarily perfect, for example, the two planes may have between them angles other than 90°, for example, angles between 80° and 100°, or even between 60° and 120°. Additionally to determining image planes, one may also determine the kind of shading, direction of the shading light, position of the shading light source, etc.

The method illustrated by FIG. 18 optionally comprises steps 1840, 1850 and 1860 relating to displaying a view of a catheter position together with view of the unfolded model surface. Steps 1840 to 1860 may be carried out at the same time as steps 1810 to 1830, or may be carried out before or after steps 1810 to 1830.

At step 1840, coordinates for catheter points surrounded by the model surface are obtained. The catheter points define the position of a catheter, or more specifically, a distal end of a catheter, inside the body. The catheter points may be a single point representing the position of the catheter or a plurality of points representing the position and orientation of the catheter inside the body. The coordinates of the catheter points may be obtained from a catheter 1920 as described below or may be stored on a computer-readable storage medium, as described above for the model points.

At step 1850, the unfolding transformation is applied to the coordinates of the catheter points to obtain transformed coordinates for transformed catheter points. The transformed catheter points define the position of the catheter with respect to the unfolded model surface. The transformed catheter points may be indicative of the position of the catheter with respect to the unfolded model. The position of the catheter with respect to the unfolded model may be indicative of the position of the catheter with respect to the inner surface.

At step 1860, a view of the catheter at the transformed coordinates is displayed together with the view of the unfolded surface. The view of the catheter may comprise a marker indicative of the position of the catheter at the transformed coordinates, wherein the marker is displayed together with the view of the unfolded surface to show the position of the catheter with reference to the unfolded surface. As an example, FIG. 6B illustrates a view of the unfolded surface of a heart chamber 2 together with a marker 31 indicating the position of a catheter inside the heart chamber. The marker may be indicative of the orientation of the catheter inside the heart chamber. For example, the marker may indicative the direction in which the distal end of the catheter is pointing. More specifically, other ways of displaying a catheter marker relative to an unfolded surface are described above and are equally applicable here.

Steps 1840 to 1860 may be omitted or replaced by other steps. For example, the view of the unfolded model may or may not comprise an indication of the position of the catheter within the body at the transformed coordinates.

Optionally the method further comprises a step of computing an updated view of the unfolded model based on additional points of the model. In more detail, the method comprises obtaining additional points of the model, wherein the additional points are additional points on a model surface modelling the model. The additional points of the model may be obtained from measurements taken inside the body, and the measurements may be taken by the catheter 1920 inside the body. The method comprises computing an updated unfolded model by applying the unfolding transformation to the additional points of the model to transform each of the additional points of the model to a corresponding additional point of the unfolded model. The unfolded model may comprise the original points of the unfolded model and the additional points of the unfolded model. The unfolded model may be a completely updated unfolded model, wherein the updated unfolded model only comprises the additional points of the unfolded model and not the original points of the unfolded model.

Optionally the method further comprises a step of obtaining coordinates for new catheter points defining a new position of the distal end of the catheter inside the body. The unfolding transformation is applied to the new catheter points and a view of the catheter at the new transformed coordinates (the new transformed catheter points) is displayed together with a view of the unfolded surface. The view of the catheter at the new transformed coordinates may comprise the marker, wherein the marker is moved from the transformed catheter points to the new transformed catheter points. For example, moving the marker may involve making the marker disappear from the old position (the original transformed catheter points) and making the marking appear at the new position (the new transformed catheter points).

Optionally, the view of the unfolded model comprises a combination of a central model modelling a portion of the surface of the heart chamber in a first rendering method, and a peripheral model modelling the rest of the heart chamber in a second rendering method, wherein the peripheral model is spread at the periphery of the central model. The method described above may further comprise the step of causing the display of the view of the unfolded model as a combination of the central model and a peripheral model.

In some embodiments, the method further comprises defining the first portion of the surface of the heart chamber as a portion of the surface lying at one side of a cutting surface and the rest of the surface of the heart chamber as that portion of the surface lying at the other side of the cutting surface, wherein the cutting surface is defined as a surface going through a desired vantage point and perpendicularly to a desired viewing direction.

FIG. 19 illustrates a block diagram of one implementation of an apparatus 1910 configured to perform any one or more of the methodologies discussed herein. For example, the apparatus may be configured to carry out the method illustrated in FIG. 18. The apparatus 1910 comprises an input module 1930 configured to receive information indicative of the points of the model. The information may be any kind of data the represents the coordinates of the points of the model or may be signals indicative of measurements taken inside a heart chamber. The information may be stored at a separate storage medium coupled to the input module. The information may be coordinates of the points of the model or may be information indicative of the points of the model.

Optionally, the apparatus 1910 comprises or can be coupled to a catheter 1920. The catheter may be configured to take measurements inside a heart chamber and may be coupled to the input module 1930 which receives signals from the catheter, wherein the signals are indicative of the measurements taken by the catheter inside the heart chamber. The measurements may be indicative of the structure of the inner surface of the heart chamber and may be indicative of the position of the catheter inside the heart chamber. Catheter 1920 may be designed for intra-body navigation; for example: an electrophysiology (EP) ablation catheter, and/or another ablation catheter (e.g., a chemical ablation or injection catheter). Catheter 1920 may comprise a plurality of physical electrodes and/or sensors (optionally, the electrodes serve as the sensors) located on a distal end portion of the catheter. The plurality of electrodes and/or sensors may be configured to take measurements such as electrical or magnetic measurements. The electrodes and/or sensors may be configured to sense the position of the catheter within a heart chamber, and may be able to sense the position of points on the inner surface of the heart chamber. The electrodes may be configured to communicate with the processor. In some embodiments, a processor 1950 may receive input (e.g., from a user), indicative of the number of the electrodes and/or of the distances between them. In some embodiments, the distances are used for generating a 3-D model from electrical readings made by electrodes of the catheter using the above-mentioned local scaling. For example, the user may provide a commercial name of the catheter probe (or the catheter) being used, and the at least one processor may be configured to associate each such commercial name with a number of electrodes and distances between them, e.g., by reading the data from a pre-programmed lookup table.

In examples of implementations of the apparatus 1910, the input module 1930 may be a processor configured to receive signals from the catheter 1920 via electrical wires, or via a wireless means of transmitting the signals. The input module may therefore comprise input terminals such as sockets configured to receive electrical wires or may comprise a wireless receiver for receiving the signals. Alternatively, the input module 1930 may not have a processor and may instead comprise an input terminal such as a socket for receiving wires or a wireless receiver that is coupled to the converting module 1940 and/or processor 1950.

Embodiments of the present disclosure describe a way to transform a cloud of electrical readings to a cloud of locations, and reconstructing the location cloud into a 3-D model. The electrical readings are received by catheter 1920 electrodes when the catheter is inside the heart chamber. The catheter carries at least two electrodes (referred to as "sister electrodes"), the distance between them is known. The measurements made simultaneously be sister electrodes may be referred to as sister measurements, and the locations, to which sister measurements are transformed, may be referred to as sister locations. To find a transform that transforms the measurements to locations in a satisfactory manner, a cost function is defined, and a transform that minimizes this cost function is searched for. The cost function has at least a local scaling term. The local scaling term is minimized by minimizing the difference (or ratio) between the distance between sister electrodes and the distance between sister locations. The models obtained from such a method may be even improved if the metrics that define the distances are intrinsic to the structure of the heart chamber.

In some embodiments, the cost function may include two terms: the local scaling term and a coherence term. The coherence term is minimized when measured values that are close to each other (under some metric) are transformed to locations that are close to each other (under the same or other metric); and measured values that are far from each other are transformed to locations that are far from each other.

The catheter may be configured to send signals based on the measurements of the sensed position of the catheter or the sensed position of points of the surface of the heart chamber. Information based on the sensed position of points on the surface of the heart chamber may be used to determine coordinates of points on the model surface of the model of the surface of the heart chamber.

Catheter 1920 may be coupled to the input module 1930, or alternatively or additionally may be coupled to converting module 1940 and processor 1950. The electrodes of the catheter may be configured to communicate with at least one of the input module 1930, converting module 1940, and processor 1950. For example, the electrodes may send signals via electrical wires or via a wireless means for transmitting signals to the respective module or processor.

Catheter 1920 may be omitted from the apparatus of FIG. 19 and the input module may be configured for receive information indicative of the points of the model from any other means that can send such information.

Apparatus 1910 further comprises a converting module 1940 configured to convert the signals into coordinates of points defining a model surface modelling the model the inner surface of the heart chamber. The converting module may also be configured to convert signals into coordinates for the position of the catheter inside the heart chamber. Converting module 1940 may be omitted from the apparatus 1910 if the information received by the input module comprises coordinates of points of the model and coordinates for the position of the catheter. Converting module 1940 may be coupled to input module 1930 such that converting module 1940 is configured to receive the signals from the input module. Optionally, input module 1930 may be omitted and the converting module may receive the signals indicative of measurements taken by the catheter.

In examples of implementations of the apparatus 1910, the converting module 1940 may be a processor configured to receive signals from the input module 1930 and convert the signals into coordinates. The converting module may comprise input terminals such as sockets configured to receive electrical wires connecting the input module 1930 and the converting module 1940, or may comprise a wireless receiver for receiving the signals from the input module. Alternatively, the input module 1930 may be omitted from the apparatus 1910 and the converting module 1940 comprises a processor configured to convert signals into coordinates, and input terminals configured to receive the signals from the catheter 1920.

Apparatus 1910 further comprises a processor 1950 configured to perform any one or more of the methodologies discussed herein. The processor 1950 may be configured to perform any one or more of the unfolding transformation methodologies discussed herein. The processor may be configured to receive coordinates of points from the converting module 1940, or alternatively from the input module 1930, or alternatively from the catheter 1920. The processor 1950 may be configured to compute the unfolded model by applying the unfolding transformation to the coordinates of the points of the model of the surface to obtain coordinates of points of the unfolded model. The processor may carry out the unfolding transformation in accordance with any of the unfolding transformations discussed herein for each point of the model, transforming the coordinates of each point of the model to transformed coordinates. The transformed coordinates of each point of the model define points on an unfolded model surface. The processor may also carry out the unfolding transformation in accordance with any of the unfolding transformations discussed herein for the coordinates for the position of the catheter inside the heart chamber. The processor may be configured to cause a display of a view of the unfolded model by processing a view of the points of the unfolded model surface, as well as the transformed catheter points. The processor may be configured to cause a display of the view of the unfolded model by sending the transformed coordinates of the points of the unfolded model and the transformed coordinates of the catheter points to a display unit.

In examples of implementations of the apparatus 1910, the processor 1950 may be any type of computer processor configured to carry out the unfolding transformation on the coordinates of the points of the model and the catheter. The processor 1950 may comprise input terminals such as sockets configured to receive electrical wires connecting the input module 1930 and/or the converting module 1940 to the processor, or may comprise a wireless receiver for receiving the signals from the input module and/or converting module. Alternatively, the input module 1930 and converting module may be omitted from the apparatus 1910 and the processor 1950 comprises: a computer processor configured to convert signals into coordinates and carry out the unfolding transformation on the coordinates; and input terminals configured to receive the signals from the catheter 1920.

The apparatus 1910 may further comprise a display 1960 for displaying a view of the unfolded model. Alternatively, the apparatus 1910 may comprise an output for outputting a display signal to cause an external display to display a view of the model. Display 1960 may be configured to receive information indicative of the view of the unfolded model from processor 1950. The information may be the coordinates of the points of the unfolded model and coordinates of the transformed catheter points. Alternatively, display 1960 may receive information from the processor 1960 indicative of a rendered image of the unfolded model. In examples of implementations of the apparatus 1910, display 1960 may be a video display unit such us a liquid crystal display (LCD) or a cathode ray tube (CRT) and may comprise a screen such as a touch screen. Display 1960 may comprise input terminals such as sockets configured to receive electrical wires connecting the display to processor 1950.

The view of the unfolded model displayed by display 1960 may be a view of the points on the unfolded model surface, and may also comprise a marking at transformed catheter points, wherein the transformed catheter points are points of the unfolded model and the transformed coordinates for the position of the catheter inside the heart chamber. The marking at the transformed catheter points may be indicative of the position and/or orientation of the distal end of the catheter.

Optionally, the apparatus further comprises a user interface configured to receive display instructions from a user. A view of the unfolded model may be displayed by the apparatus in accordance with the display instructions.

As an example, the display instructions may comprise instructions to display an icon indicative of the viewing direction, i.e. the direction at which the unfolded model is viewed. The apparatus may then display a view of the unfolded model together with this icon. As a further example, the display instructions may comprise instructions to display a view of the unfolded model at a user-defined orientation. The apparatus may then display a view of the unfolded model at this orientation. In general terms, the user interface may receive an indication of an orientation of the unfolded model, and the display may display the view of the unfolded model at the orientation indicated via the user interface.

The user interface may allow a user to change the origin and/or the viewing direction by dragging a mouse or manipulating another user input device, such as a stylus, slider, knob or button, which may be implemented as physical features or on-screen. For example, clicking the mouse on the origin and dragging may move the origin, while clicking the mouse away from the origin and dragging it may change the viewing angle.

As yet a further example, the display instructions may comprise instructions to display a view of the model with a user-defined degree of unfolding. The display instructions may comprise the value of an unfolding factor α which may be selected by the user. In other words, the user can indicate to the processor 1950 a desired degree of unfolding. The indication may be, for example, by entering a value for the unfolding parameter, or by adjusting an adjustable input element with an adjustable position or orientation. For example, an off-screen input element may be a knob that can be switched between two or more positions, each corresponding to a particular value of the unfolding parameter. In another example, an on-screen input element may be a slider that can be slid between two or more values of the unfolding parameter, a button or a knob, or any other adjustable indication means. In some embodiments, the partly unfolded view changes to reflect the momentary value of the unfolding parameter, as the user changes the indication, for example, by sliding the slide. In some embodiments, the model unfolds in front of the eyes of the user, providing further help in understanding the relationship between the folded and unfolded view. In other words, the apparatus may be configured to display a view of the unfolded model with an intermediate degree of unfolding as the user changes the unfolding factor from an initial value to a final desired value. In some embodiments, the user may control the pace at which the unfolding is demonstrated, stop (and then opt to continue) the unfolding at any point he wishes, The apparatus may then display the view of the unfolded model in accordance with the unfolding factor, $\alpha$. The unfolding factor may be specified by the user by entering a numerical value. The unfolding factor $\alpha$ is explained below.

As yet a further example, the display instructions may comprise instructions to display a second view of the unfolded model at the same time as displaying a first view of the unfolded model. The display instructions may further comprise instructions to display the second view of the unfolded model at a user-defined orientation. In general terms, the user interface may receive an indication of an orientation of the unfolded model, and the display may display the second view of the unfolded model at the orientation indicated via the user interface.

The orientation of the second view of the unfolded model may be different to the orientation of the first view. For example, the directions from which the first and second model are viewed may be set to be transverse to each other, for example defining an acute angle of between 60 and 90 degrees, more specifically between 70 and 90 or 80 and 90 degrees. In some embodiments, the two viewing directions may be orthogonal to each other. By providing views that differ significantly in orientation, it will be easier to judge distances and orientations of an object such as a catheter or catheter tip displayed together with the model relative to the model surface, since a distance that will result in a shallow projection or obscured view in one of the views may be clearly visible in the other one of the views.

In one example, a plurality of views of the unfolded model may be displayed at a plurality of different orientations, wherein each view of the plurality of views is displayed sequentially. In other words, is view of the plurality of views is displayed one-after the other so as to provide the effect of continuous movement of the view of the unfolded model.

In another example a plurality of views of the unfolded model may be displayed simultaneously, wherein each view is indicative of a different degree of unfolding.

With reference to FIG. 20, an embodiment of an unfolding transformation method in accordance with step 1820 and 1850 of FIG. 18 and, for example, as carried out by processor 1950 of FIG. 19 comprises a step of 2010 of obtaining polar coordinates of the points on the model surface modelling the inner surface. In some embodiments, the points on the model surface are provided in cartesian form and step 2010 may comprise converting cartesian coordinates of the points of the model to polar coordinates. For example, step 2010 may include using conventional transformations from cartesian to polar coordinates. Each point of the model is then defined by polar coordinates, comprising an azimuthal, inclination, and radial coordinate. The polar coordinates are defined with respect to an origin, such as a reference point within a volume surrounded by the model surface. The azimuthal and inclination coordinates of each point of the model may be defined with respect to a first axis and a second axis extending from the reference point perpendicular to one another that together define a reference plane that is perpendicular to the second axes and within which the first axis lies. Specifically, the azimuth coordinate is defined as the angle between the first axes and the projection onto the reference plane of the model point line that extends from the reference point and through that point of the model. The inclination coordinate is defined as the angle between the model point line and the projection of the model point line onto the reference plane. The radial coordinate of each point may be defined as the distance between the origin and that point.

At step 2020, the azimuthal and inclination coordinates of each point of the model are reduced by multiplying each coordinate by an unfolding factor $\alpha$ that is positive and less than unity. The multiplied azimuthal and inclination coordinates of each point are the transformed azimuthal and inclination coordinates which represent the azimuthal and inclination coordinates of a corresponding point of the unfolded model. In other words, the azimuthal and inclination coordinate of each point of the unfolded model equates to the azimuthal and inclination coordinate of the corresponding point of the 3-D model multiplied by the unfolding factor $\alpha$. The effect of the multiplication with $\alpha$, in general terms, can be understood to move the points on the model surfaces angularly towards a line along the first axis and extending from reference point. This line can be characterized as the line about which the model is unfolded.

The unfolding factor $\alpha$ may be considered to indicate a degree of unfolding. In other words, a minimum value of $\alpha$ may signify a maximum degree of unfolding. When $\alpha$ is smaller, each point of the model undergoes a greater angular displacement and thus moves a greater angular distance towards the first axis.

Alternatively, the azimuth and/or inclination coordinates may be reduced in a different manner, for example, by subtracting a value, or by any other means that results in a reduction of the azimuth and/or inclination angle of each coordinate and in particular in angular movement of the model points as described above.

In more general terms the effect of reducing the angles as described moves the points on the model surface closer together. Since the angular coordinates of each point of the model are reduced, this means that the azimuth and inclination angles between each point of the model are also reduced, thus reducing the arc length along the model surface between each point and thus moving the points closer together.

At step 2030, the radial coordinate of each point of the model is increased so as to increase the global curvature of the unfolded model surface, in comparison to that of the model surface. In some embodiments, the increase in the radial coordinate of each point depends on the unfolding factor $\alpha$. For example, a value depending on $\alpha$ may be added to the radial coordinate of each point. Generally, the added value may depend inversely on $\alpha$. In some embodiments, the overall area of the model (or some other characteristic parameter of the model) stays unchanged in that the addition to the radial coordinates compensates for the decrease in the angular coordinates so the surface area or other characteristic parameter of the model does not change considerably, or does not change at all. For example, the radial coordinate may be increased by adding to the radial coordinate an amount inversely proportional to the unfolding factor $\alpha$. In some embodiments, the amount added to the radial coordinate of each point of the model may equates to the product of a value $\beta$ and the difference between the inverse of the unfolding factor $\alpha$ and unity. The value $\beta$ is indicative of the size of a notional closed surface centred on the reference point and surrounded by the points on the model surface. Optionally, the notional closed surface is spherical and $\beta$ is the radius of the notional closed surface or notional sphere.

The increased radial coordinate of each point is the transformed radial coordinate which represents the radial coordinate of a corresponding point of the unfolded model. In other words, the radial coordinate of each point of the unfolded model equates to the radial coordinate of the corresponding point of the 3-D model increased by an amount $\beta(1/\alpha-1)$.

In more general terms, the effect of increasing the radial coordinate as described is to move the points on the model surface radially outward, thus reducing a curvature of the resulting surface and spreading the points apart by increasing the arc length between each point of the surface. It will therefore be appreciated that any manipulation of the radial coordinate that achieves this effect may be used instead. The increase in radial coordinate thus results in an increase in arc length along the model surface between each point and may compensate for the reduction in arc length between each point caused at step 2020 by reducing the angular and radial coordinates. Thus, the increase in radial coordinate can preserve distances between points of the model when they undergo the unfolding transformation to become points of the unfolded model. It must, however, be noted that the arc length referred to above are along "longitudes" between "poles" where the first axis intersects the notional sphere. FIGS. 22A-22C discussed below show one such "longitude" circle and the effect of the transformation on points on such a circle. It will be understood that arcs along any such circle that is obtained by rotation about the first axis from the illustrated circle behave in this way under the transformations, but that arcs across such "longitudes" or circles, for example along "latitudes" may be distorted by the transformation. Step 2030 may be performed before, after or at the same time as step 2020, since each of steps 2020 and 2030 transform independent coordinates and so the transformation of the radial coordinate does not affect the transformation of the azimuth or inclination coordinates, and vice versa.

The steps of reducing the angular coordinates and increasing the radial coordinates of each point has the effect of transforming a notional closed surface centred on the reference point and surrounded by the model surface into a notional open surface. Points on the notional closed surface are transformed into points on the notional open surface by the transformations of 2020 and 2030. The radial increase 2030 of each point on the notional closed surface $\delta=\beta(1/\alpha-1)$ causes the arc length between points on the notional closed surface to be persevered in face of the angular displacement 2020 of those points. Thus these transformation steps have the effect of causing the arc length between transformed points on the notional open surface to be the same as the arc length between corresponding points on the notional closed surface. In some embodiments, the transformation therefore is length preserving along "latitudes" for points on the notional sphere of radius $\beta$ and similarly close to length preserving along "latitudes" for points close to that notional sphere.

The first and second axis defining the azimuth and inclination coordinates of each point of the model extend from the reference point and pass through the notional closed surface at respective first and second surface reference points.

The steps of reducing the angular coordinates and increasing the radial coordinates of each point of the model to transform the points of the model to points of the unfolded model, in some embodiments, has the effect of transforming a model surface into an unfolded model surface, such that a normal distance between each point on the model surface and the notional closed surface is substantially equal to a normal distance between a corresponding point on the unfolded model surface and the notional open surface.

As would be appreciated by a person skilled in the art, the notional closed surface and the notional open surface do not need to be defined in terms of actual coordinates, but are instead used here notionally to illustrate the effect of the unfolding transformation on the points of the model. Similarly, the first and second surface reference points do not need to be defined in terms of coordinates but can be defined as the points at which the first and second axes pass through the notional closed surface respectively, and can be defined as a first and second notional surface reference points.

At step 2040, the transformed azimuthal, inclination and radial coordinates which represent the coordinates of the unfolded model are converted to cartesian coordinates using conventional transformations from polar to cartesian coordinates. This may be useful when using rendering engines that work in cartesian coordinates but may be omitted if points are rendered directly in polar coordinates, for example. In general terms, therefore, step 2040 is optional.

The increase in the radial coordinate of each point of the model may have the effect of causing the resulting transformed points of the unfolded model to have a third (Z) coordinate far away from the origin (the reference point). The resulting view of the unfolded model may therefore appear far away from the origin and thus smaller when displayed. In order to negate this, optionally, at step 2050, the Z coordinate of each point of the unfolded model is transformed by subtracting from the Z coordinate an amount equivalent to the increase in the radial coordinate defined in step 2030. For example, in embodiments where the radial coordinate is increase by addition of $\beta(1/\alpha-1)$, the Z coordinate of each point of the unfolded model may be reduced by an amount $\beta(1/\alpha-1)$.

The unfolding transformation method of FIG. 20 can equally be applied using analogous transformations to points of the model defined in cartesian coordinates. In this case, step 2010 may be omitted or obtain cartesian coordinates of points of the model if the points of the model are not already defined in cartesian coordinates. Steps 2020 and 2030 may be replaced with corresponding analogous transformation steps for performing equivalent transformation movements of the model points in cartesian coordinates. In this case, step 2040 is omitted since the transformed coordinates of the points of the unfolded model remain defined in cartesian coordinates.

With reference to FIG. 21, another unfolding transformation method in accordance with step 1820 and 1850 of FIG. 18 and, for example, as carried out by processor 1950 of FIG. 19 comprises a step of 2110 of obtaining polar coordinates of the points on the model surface modelling the surface. Obtaining a representation of the points of the model in polar coordinates may comprise transforming the coordinates of the points of the model into polar coordinates using conventional transformations to polar coordinates.

Step 2110 may comprise converting cartesian coordinates of the points of the model to polar coordinates using conventional transformations from cartesian to polar coordinates. Each point of the model may then be defined by polar coordinates, comprising an azimuthal, inclination, and radial coordinate. The polar coordinates are defined with respect to an origin, such as a reference point within a volume surrounded by the model surface. The azimuthal and inclination coordinates of each point of the model may be defined with respect to a first axis and a second axis extending from the reference point. Specifically, the azimuthal and inclination coordinates of each point may be defined in the same way as described with reference to FIG. 20.

At step 2120, the azimuthal and inclination coordinates of each point of the model are transformed by applying a cartographic projection transformation to transform the azimuth and inclination coordinates of each point of the model to obtain transformed x and y cartesian coordinates. The cartographic projection may be a Mollweide projection, as described by Wolfram MathWorld™ at http://mathworld(dot)wolfram(dot)com/MollweideProjectiom(dot)html, or a Plate Carrée projection, or any other kind of projection that transforms azimuthal and inclination coordinates to two-dimensional cartesian coordinates. As would be understood by a person skilled in the art, a cartographic projection transforms 2D coordinates into transformed 2D coordinates. Therefore, the cartographic projection does not affect the radial coordinate of the points of the model.

At step 2130, the transformed x and y cartesian coordinates of each point of the model are reduced by multiplying each coordinate by the unfolding factor α that is positive and less than unity. This step causes analogous movement of the points as step 2020 described above and the same considerations as to more generalized point movement apply.

At step 2140, the transformed and reduced x and y coordinates of each point of the model are transformed back to azimuthal and inclination coordinates by applying the inverse function of the cartographic projection. The inverse cartographic projection transforms the transformed, reduced x and y coordinates of each point of the model to reduced azimuthal and inclination coordinates which represent the azimuthal and inclination coordinates of a corresponding point of the unfolded model. In other words, the azimuthal and inclination coordinate of each point of the unfolded model equates to the azimuthal and inclination coordinate of the corresponding point of the 3-D model when transformed to cartesian coordinates using a cartographic projection, reduced by multiplication by α, and transformed back to polar coordinates using the inverse of the cartographic projection. The inverse cartographic projection does not affect the radial coordinate of the points of the model.

At step 2150, in some embodiments. the radial coordinate of each point of the model is increased by adding to the radial coordinate an amount inversely proportional to the unfolding factor α. The amount added to the radial coordinate of each point of the model equates to the product of a value β and the difference between the inverse of the unfolding factor α and unity. The value β is indicative of the size of a notional closed surface centred on the reference point and surrounded by the points on the model surface. Optionally, the notional closed surface is spherical and β is the radius of the notional closed surface or notional sphere as described above. As described above, this radial movement causes the points to move radially outwards and apart from each other in more general terms, and the same considerations as for step 2030 apply.

The increased radial coordinate of each point is the transformed radial coordinate which represents the radial coordinate of a corresponding point of the unfolded model. In other words, the radial coordinate of each point of the unfolded model equates to the radial coordinate of the corresponding point of the 3-D model increased by an amount $\beta(1/\alpha-1)$. Since the transformations in steps 2120 and 2140 do not affect the radial coordinate of the points of the model, the transformation to the radial coordinate of each point of the model at step 2150 can occur at before, after, or at the same time as any of steps 2120 to 2140.

Similar to the method discussed above with reference to FIG. 20, the steps of reducing the angular coordinates and increasing the radial coordinates of each point has the effect of transforming the notional closed surface centred on the reference point and surrounded by the model surface into a notional open surface. The radial increase 2150 of each point on the notional closed surface $$\beta\left(\frac{1}{\alpha} - 1\right)$$

causes the arc length between points on the notional closed surface to be persevered in face of the angular displacement (caused by steps 2120 to 2140) of those points. Thus these transformation steps have the effect of causing the arc length between transformed points on the notional open surface to be the same as the arc length between corresponding points on the notional closed surface.

Also similar to the method discussed above with reference to FIG. 20, the steps of reducing the angular coordinates and increasing the radial coordinates of each point of the model to transform the points of the model to points of the unfolded model has the effect of transforming a model surface into an unfolded model surface, such that a normal distance between each point on the model surface and the notional closed surface is substantially equal to a normal distance between a corresponding point on the unfolded model surface and the notional open surface.

At step 2160, the transformed azimuthal, inclination and radial coordinates which represent the coordinates of the unfolded model are converted to cartesian coordinates using conventional transformations from polar to cartesian coordinates. As for step 2040, this is optional.

The increase in the radial coordinate of each point of the model may have the effect of causing the resulting transformed points of the unfolded model to have a third (Z) coordinate far away from the origin (the reference point). The resulting view of the unfolded model may therefore appear far away from the origin and thus smaller when displayed. In order to negate this, optionally, at step 2170, the Z coordinate of each point of the unfolded model is transformed by subtracting from the Z coordinate an amount equivalent to the increase in the radial coordinate defined in step 2150. In other words, the Z coordinate of each point of the unfolded model may be reduced by an amount $\beta(1/\alpha-1)$.

Generally, it can be seen that step 2120, 2130 and 2140 correspond with step 2120 described above and that step 2150 corresponds with step 2030 and step 2160 corresponds with step 2040, so that the discussion above in relation to FIG. 20 applies, mutatis mutandis, to the discussion of FIG. 21.

The unfolding transformation of FIGS. 20 and 21 can equally be applied to catheter points instead of or in addition to points of the model, wherein the catheter points are coordinates of the position of the catheter.

FIGS. 22A-22C illustrate a schematic example of the unfolding transformation illustrated in FIG. 20 for points of the model defined in polar coordinates. The unfolding transformation illustrated in these figures represents a "partial" unfolding of closed model surface 2280 in FIG. 22A to partially unfolded model surface 2280' in FIG. 22B and partially unfolded model surface 2280" in FIG. 22C. In this case, a partially unfolded model surface corresponds to an intermediate value of the unfolding factor, $\alpha$. In other words, for a partially unfolded model, the unfolding factor $\alpha$ is a value in between the minimum and maximum value, and thus the degree of unfolding is between a minimum and a maximum. More generally, a partially unfolded model is a model that may be described as an open curved surface, or an open surface with a finite curvature, while a folded model may be described as a closed curved surface, and fully unfolded model may be described as an open, flat surface. That is, a fully unfolded model may be a surface with zero-curvature.

In the 2-D representation illustrated in FIGS. 22A-C, the circle 2280 representing the model surface represents a longitude circle as discussed above. Arc lengths between points along this longitude circle 2280 are preserved as the unfolding transformation increases the radial coordinate and reduces the azimuth coordinates of the points of the model onto points of longitude circle 2280' or 2280". As an example, these figures illustrate the unfolding transformation for the azimuthal and radial coordinates of each point of the model. The skilled person would appreciate that this unfolding can be extended to a 3-D model, wherein the inclination coordinate can be transformed in a similar manner. As would be appreciated by the skilled person, this unfolding transformation can equally be applied using analogous transformations to points of the model defined in cartesian coordinates, or any other representation.

With reference to FIG. 22A, a notional closed surface 2230 (dashed) is centred on a reference point 2240. Notional closed surface 2230 does not need to be defined in terms of coordinates of points on the notional closed surface. Instead, notional closed surface is only used to aid in understanding the effect of the unfolding transformation. In other words, notional closed surface 2230 is "notional" since it does not necessarily actually exist as part of an unfolding transformation, but is only used herein to explain the effect of the unfolding transformation.

In the example illustrated, notional closed surface 2230 is a spherical shape (circular in 2-D), however notional closed surface 2230 may be another other type of closed surface shape, such as an ellipsoid or any arbitrary closed surface. The centre 2240 of the notional closed surface (the position of the reference point surrounded by the notional closed surface) is defined as the average of the coordinates of all points that lie on the surface of the notional closed surface. In reference to FIGS. 22A-22C, notional closed surface 2230 is hereinafter referred to as notional sphere 2230.

A first surface reference point 2220 lies on the surface of the notional sphere and a first axis 2210 extends from the reference point 2240 and through first surface reference point 2220. For consideration of the 3-D representation, the second axis would extend from the reference point 2240 in a direction perpendicular to the first axis. Points 2270 and 2275 represent points of the model that lie in the plane of the Figure and on a model surface 2280 modelling the inner surface of a body and surrounding the notional sphere 2230. For simplicity, model surface 2280 in FIG. 22A has been illustrated as a regular, circular shape. However, model surface 2280 may be any arbitrary 3-D surface surrounding reference point 2240, and points 2270 and 2275 may be at any point on the model surface. Normal distances 2260 and 2265 between the notional open surface 2290 and points 2270 and 2275 respectively may have different values. Also, while first surface reference point 2220 is on the angle bisector bisecting the angle between points 2270, 2240, and 2275, so that the angles A and B are equal, this is not necessarily so, and first axis 2210 may extending from the reference point in any direction in the plane of the Figure such that first surface reference point 2220 may be at any place along notional sphere 2230 where the first axis passes through the notional sphere.

The points 2270 and 2275 lie outside of the notional sphere and have respective normal distances 2260 and 2265 between the points and the notional sphere. Normal distances 2260 and 2265 are the distances between the notional sphere 2230 and points 2270 and 2275, when measured along a line extending between the reference point 2240 and each respective point 2270 and 2275. Distances 2250 and 2255 are the radial distances between the reference point 2240 and the surface of the notional sphere. Since notional sphere 2230 is not part of the unfolded transformation and is only used to illustrate the effect of the unfolding transformation, normal distances 2260 and 2265, and distances 2250 and 2255 are also only used to illustrate the effect of the unfolding transformation and are not necessarily defined as part of the unfolding transformation itself but rather characterize unfolding transformations of some disclosed embodiments. Distances 2250 and 2255 are measured along the line extending between the reference point and points of the model 2270 and 2275 respectively. The radial coordinate of points 2270 and 2275 are defined as the sum of 2250 and 2260, and 2255 and 2265 respectively. Angles A and B are the angles made between the first axis 2210 and lines 2250 and 2260 respectively. The azimuthal or inclination coordinate of points 2270 and 2275 may be defined as angles A and B respectively. FIG. 22A illustrates a model prior to an unfolding transformation being applied to the points 2270 and 2275.

FIG. 22B illustrates the points 2270 and 2275 following an unfolding transformation. Points 2270 and 2275 have been transformed by the unfolding transformation and are now points of the unfolded model on an unfolded surface 2280'. The unfolding transformation has the effect of transforming notional sphere 2230 into notional open surface 2290. Notional sphere 2230 is a notional closed surface, which has been transformed to notional open surface 2290 using the unfolding transformation. Notional open surface 2290 has a larger radius than notional sphere 2230, since the radius of the notional sphere is increased by the unfolding transformation by adding an amount $$\delta \propto \left(\frac{1}{\alpha} - 1\right)$$

such that arc lengths between points on the notional sphere are preserved during the transformation. Thus, the length of the arc of notional open surface 2290 between lines 2250 and 2255 (through point 2220) is the same as the length of the arc of notional sphere 2230 between same lines. Optionally, the increase is addition of an amount $$\delta = \beta\left(\frac{1}{\alpha} - 1\right),$$

wherein β is indicative of the radius of the notional sphere 2230. The notional sphere 2230 is shown in FIG. 22B to illustrate the increase in radius as the notional sphere undergoes the unfolding transformation and is transformed to the notional open surface 2290.

The unfolding transformation illustrated in FIG. 22B has been carried out using unfolding factor α, where α is positive and less than unity. Points 2270 and 2275 have been angularly displaced in a direction towards first axis 2210 by multiplying angles A and B respectively by α, thus reducing the angles and causing an angular displacement of points 2270 and 2275 towards first axis 2210. In other words, the azimuthal or inclination coordinate of the points 2270 and 2275 have been reduced.

The radial coordinate of points 2270 and 2275 have been increased by adding δ to distances 2250 and 2255. This way, radius 2250, 2255 of the notional open surface 2290 has been increased, whilst the normal distances 2260 and 2265 between points 2270 and 2275 respectively and the notional open surface 2290 remains unchanged, i.e., the same as in FIG. 22A. In other words, the unfolding transformation has the effect of transforming notional sphere 2230 into notional open surface 2290 such that normal distances 2260 and 2265 between points 2270 and 2275 and corresponding points on the notional open surface are substantially equal. Here, substantially equal is intended to mean that the respective normal distances are equal to within tolerances, such as rounding errors or other systematic errors that may arise within the implementation of the unfolding transformation.

As an example, the 3-D model may be a model of an inner surface of a heart chamber, and the model may include relief details showing, for example, a "deep hole" that models a blood vessel connected to the heart chamber, and may also include relief details showing a "ridge" in the surface of the heart chamber. It will be appreciated that a point on the model surface representing the deep hole may have a large normal distance to a notional sphere defined within the surface of the heart chamber, and equally, a point on the model surface representing the ridge may have a small normal distance to the notional sphere. Therefore, when the unfolding transformation is applied, the corresponding point for the deep hole on the unfolded model will have a normal distance to a notional open surface 2290 which is substantially the same as the normal distance between the point on the model surface representing the deep hole and the notional sphere defined within the surface of the heart chamber. Equally, the corresponding point for the ridge on the unfolded model will have substantially the same respective normal distance to a notional open surface. This illustrates that the unfolded model contains the same relief details as the 3-D model of the surface.

FIG. 22C also illustrates points 2270 and 2275 following an unfolding transformation in the same manner as FIG. 22B, but with a different value of the unfolding factor α. More specifically, the unfolding factor α is smaller for FIG. 22C compared to FIG. 22B, indicating a larger degree of unfolding. The reduction in angles A and B is larger in FIG. 22C compared to FIG. 22B since A and B are multiplied by smaller unfolding factor α. In other words, the reduction of the azimuthal or inclination coordinates of points 2270 and 2275 is larger. Therefore, the angular displacement of points 2270 and 2275 towards first axis 2210 is larger. Equally, the increase in the radial coordinate (due to the increase in the radius 2250 or 2255 of the notional open surface 2290) is larger in FIG. 22C compared to 22B, since the increase is inversely proportional to α.

Following the angular displacement and increase in radial coordinates, points 2270 and 2275 illustrated in FIG. 22C are points of the unfolded model on the unfolded model surface 2280″. Unfolded model surface 2280′ of FIG. 22C has a larger radius, i.e. less curvature, than unfolded surface 2280′ of FIG. 22B. Unfolded surface 2280″ of FIG. 22C therefore has a larger degree of unfolding since the unfolded surface 2280″ of FIG. 22C is closer to a fully unfolded (flat, zero curvature) surface.

As would be understood by the skilled person, the angular and radial movement of points 2270 and 2275, shown in FIGS. 22B and 22C with reference to the original positions shown in FIG. 22A, may equally be implemented using corresponding transformations for other cartesian coordinates systems (e.g., a Cartesian coordinate system) if points 2270 and 2275 are defined in cartesian coordinates this other coordinate system.

FIGS. 22A-22C are merely illustrative examples of an unfolding process in two dimensions.

With reference to FIGS. 22B and 22C, the unfolding factor α indicates a degree of unfolding. The unfolding factor may be continuous and may take any value between 0 and 1.

With reference to FIG. 22B, a high value of α (close to one) results in the azimuth and inclination angles being reduced by a small amount (when those angles are multiplied by α), and the radial coordinate being increased by a small amount (when the radial coordinate is increased by an amount proportional to $$\frac{1}{\alpha} - 1).$$

Thus the transformed coordinates in this instance are not dissimilar from the coordinates of the points of the model. The points of the unfolded model (at the transformed coordinates) are therefore on an unfolded surface that is similar in form to the closed inner surface of the 3-D model. It may be considered that such an unfolded model has a small degree of unfolding, since the choice of α causes a small transformation of the coordinates of the points of the model to points of the unfolded model. The resulting unfolded model has a high curvature.

In contrast, with reference to FIG. 22C, a small value of α (close to zero) results in a large reduction of the azimuthal and inclination angles (when the angles are multiplied by α) and a large increase in the radial coordinate (when the radial coordinate is increased by an amount proportional to $$\frac{1}{\alpha} - 1).$$

Thus, the transformed coordinates in this instance are distinctly removed from the coordinates of the points of the model. The points of the unfolded model (at the transformed coordinates) are therefore on an unfolded surface that is not similar in form to the closed inner surface of the 3-D model. It may be considered that such an unfolded model has a large degree of unfolding, since the choice of α causes a large transformation of the coordinates of the points of the model to points of the unfolded model. The resulting unfolded model has a low curvature.

As would be understood by the skilled person, different values of the unfolding factor α result in different "degrees of unfolding", wherein the degree of unfolding signifies the curvature of the unfolded model.

At a minimum value of alpha (a maximum degree of unfolding), the unfolded model may have zero curvature. That is to say, the unfolded model may be a flat model that includes the relief details of the 3-D model of the inner surface. Alternatively, a maximum degree of unfolding may signify an unfolded surface that has a non-zero curvature. That is to say, as the unfolding factor α tends to zero, the unfolding transformation causes a plate Carrée or other cartographic projection of the azimuth and inclination coordinates of the model onto a flat surface, such that the unfolded model becomes a flat model that includes the relief details of the 3-D model of the surface.

At an intermediate value of α in between the minimum and maximum value, the unfolded model has more curvature than at a maximum degree of unfolding, but less curvature than a minimum degree of unfolding. It is considered that an intermediate value of α, as well as an intermediate degree of unfolding, correspond to a partially unfolded model.

In some embodiments, the unfolding transformation has the effect of transforming a notional closed surface centred on the reference point to an open notional surface having zero curvature. In other words, the open notional surface lies in a plane. In these embodiments, the azimuth and inclination coordinates of each point of the original model are transformed to respective first and second (x and y) cartesian coordinates of a corresponding point of the unfolded model in the plane. The transformation may be implemented as a plate carrée transformation (the limiting case of the FIG. 20 transformation as alpha tends to zero), a Mollweide transformation or any other transformation having desirable properties for an application at hand. The first and second cartesian coordinates are thus defined in the plane of the notional open surface. A third cartesian (z) coordinate is defined as perpendicular to the plane of the notional open surface. The open notional surface may therefore be a plane, wherein all points of the plane have the same third cartesian coordinate.

The radial coordinate of each point of the model is transformed to a third cartesian coordinate of the corresponding point of the unfolded model, wherein the third cartesian coordinate may be defined as the sum of the third cartesian coordinate of the open notional surface, and the normal distance between the notional closed surface and that point of the model.

Alternatively, the cartesian coordinate system may be defined such that the notional open surface lies on the first and second cartesian coordinate axes. In other words, the third cartesian coordinate of each point of the notional open surface is zero. Therefore, the third cartesian coordinate of each point of the unfolded model may be defined as the normal distance between the notional closed surface and the correspond point of the 3-D model.

In some embodiments, the view of the unfolded model comprises information pertaining to the current state of a time varying information that refers to modeled body part. For example, a view of a heart chamber may include information pertaining to the current state of a time varying information that refers to that heart chamber. As an example, the time varying information may be an activation map superimposed on a view of a heart chamber, as described above with reference to FIG. 3. An activation map mapped onto a view of an unfolded model of a heart chamber as shown in FIG. 3, shows a color scale indicating relative time after an impulse begins that it reaches each particular region of the inner surface of the heart chamber.

In one example, the first and/or second view of the unfolded model is a predefined view, wherein the predefined view is displayed in accordance with at least one of a plurality of predefined viewing parameters, the plurality of predefined viewing parameters comprising: the unfolding factor or a value indicative of the degree of unfolding; the value indicative of the size of notional closed surface; the first and/or second surface reference point on the notional closed surface; and the orientation of the first and/or second views of the unfolded surface.

In some embodiments, the first and/or second surface reference points may be determined by a user to define the first and second axes extending from the reference point. Alternatively, the first and axes may be determined by a user. The user may therefore determine the direction by which the angular displacement of the points of the model takes place, thus determining the direction at which the unfolding transformation takes place. In some embodiments, the user may determine the view of the unfolded model by determining the direction of the angular displacement of the azimuthal and inclination coordinates of each point of the model.

A related embodiment of an unfolding transformation takes the model in spherical coordinates as described above (for example transformed from a set of cartesian coordinates) and shrinks the angle coordinates, for example by multiplication with a positive factor less than unity, such as α described above. The shrunk angle coordinates are then transformed to 2D Cartesian coordinates using a cartographic projection that depends on radial size (corresponding to the radius of the globe in the cartographic use case), for example one of the following known projections: Mollweide, Mercator, Gall stereographic projection, Gall-Peters projection, Eckert IV projection, Ortelius oval, and the like. The model being transformed will have a characteristic radial size, for example β described above, such as 30 mm in the case of a model of the left atrium. To compensate at least in part for the shrinking of the angle coordinates, however, instead of using this characteristic radial size for the cartographic projection, an increased radial size R is used. For example, in some embodiments, $$R = \beta + \delta = \frac{\beta}{\alpha},$$

α, β and δ being as described above. The larger R ensures that the unfolded model is not too small in area. As in the cartographic limiting case described above, the third Cartesian coordinate is taken to be the radial coordinate of each corresponding point of the original spherical coordinates.

The transformations described above can be seen to re-distribute relief details on the curved surface so that the surface is divided to an occupied portion occupied with relief details and a free portion free from relief details, as well as increasing the curvature of the curved surface. The occupied portion of the increased-curvature curved surface is then displayed. The disclosure extends to any display or visualization method with these steps, whether implemented as described above or otherwise. In some embodiments of this method, respective notional lines connecting a position of a relief detail before the re-distribution to a position of the same relief detail after the re-distribution, do not intersect. As described above, the surface may be non-developable. The surface area of the occupied portion after the curvature increase may be between half and twice the surface area of the entire surface before the curvature increase, so that surface areas or other features of the relief distribution are preserved to some extent. As in the specific examples described above, the curved surface may be a model of a surface of a body portion, for example an internal surface of a body. The body may be an organ of a human or non-human animal, for example a heart or a portion of a heart as described above. Such displaying or visualization methods may be used in a method of assisting a physician in carrying out a catheterization process, for example as described above. Such an assisting method may comprise receiving data from a catheter and generating, based on the data received from the catheter, a 3-D model of a curved surface of a body part. The generated 3-D model comprises relief details distributed across the curved surface and the method comprises visualizing or displaying an occupied portion of an increased-curvatures curved surface generated as described above and displaying a view of that surface to the physician carrying out the catheterization process.

There is further provided a method of presenting a three-dimensional model of an surface of heart chamber wall, the method comprising: determining a viewing point and a viewing direction; unfolding the model so that portions of the surface that are behind a cutting surface going through the vantage point perpendicularly to the viewing direction are presented peripherally to portions of the surface that are in front the cutting surface; and displaying the unfolded model together with an icon representing the viewing direction.

There is further provided an apparatus for displaying a model using a method in accordance with some methods, the apparatus comprising a user interface configured to allow a user to indicate a desired vantage point and a desired viewing direction.

In some embodiments, the apparatus further comprises a display showing the orientation of the viewing direction near the resulting unfolded three-dimensional model.

In some embodiments, the user interface allows the user to indicate different vantage points and/or viewing angle continuously, and the display shows the unfolded model changing simultaneously with the vantage point and/or viewing angle.

With reference to FIG. 23, a display 8 displays a first view of an unfolded model of a heart chamber on the left hand side, and a second view of the unfolded model on the right hand side, with a different orientation to the first view. In the first view, the following anatomical features are clearly shown: superior right pulmonary vein (PV) 10; inferior right PV 12, anomalous extra right PV 14, inferior left PV 16, superior left PV 18, and left atrium appendage 20. Some of the same features are also shown clearly in the second view, for example, superior right PV (SRPV) 10, inferior right PV (IRPV) 12, anomalous extra right PV 14, and inferior left PV (ILPV) 16. The first and second views described with reference to FIG. 23 also show respective images 32 and 34, which are views of the unfolded model when only partially unfolded. These partially unfolded views can be used as additional orientation aids, as they aid the user in understanding the orientation of the fully unfolded view (a view of the unfolded model at a maximum degree of unfolding). The orientation may also be facilitated by a continuous move between the close and open (original model and unfolded) views, so that features in one view are shown to become the corresponding features on the other view. A view of the original model of the surface of the heart chamber and/or a partly unfolded view may be displayed together with a view of the fully unfolded model.

The orientation of the second view is at a 90° angle to the orientation of the first model. However, the orientation may be at a 180° angle to the orientation of the first model. Optionally, the orientation of the second view may be at any angle with respect to the first view.

In advantageous embodiments, the orientation of the second view of the model is at an angle greater than 0° and less than 180° to the orientation of the first view. Optionally, this angle is between 60° and 120°, and preferably 90°. That is to say, in advantageous embodiments, the first and second views of the unfolded model may be perpendicular to one another.

With reference to FIG. 23, the first and second view of the unfolded model may each further comprise an indication for the position of a catheter 22 inside the body. The position of the catheter may change inside the body (if the body is a heart chamber, the catheter may move inside the heart chamber) and it may be difficult to visualise the movement of the catheter in one view of the unfolded model. This may be the case particularly if the catheter is moving in a direction that appears to be perpendicular to the plane of a screen displaying the view (i.e. the catheter appears to be moving towards or away from the plane of the screen). Therefore, a user viewing the unfolded model may not be able to identify the exact position of the catheter when viewing only one view of the unfolded model displayed at one orientation.

A second view of the unfolded model at a perpendicular orientation to the first view will be able to display the catheter movement as a movement along the plane of the screen, thus clearly displaying to a user the position of the catheter within the body. It is therefore advantageous to provide two perpendicular views of the unfolded model at the same time, such that a user can always determine the position of the catheter and the direction in which it is moving inside the body.

Again with reference to FIG. 23, first view of the unfolded model is accompanied by an icon 30 that shows the viewing direction. The second view may optionally include the icon as well as or instead of the first view. For example, the icon may have the shape of a hat-wearing head. When the viewing direction changes, the icon keeps looking at the viewing direction, and thus the orientation of the icon changes. The icon may thus be indicative of the direction from which the unfolded model is viewed. If the body is an internal organ (or a portion thereof) of an animal or human, the icon may be indicative of the direction at which the model is viewed with respect to the animal or human. The icon may have any other form that may easily convey its orientation, e.g., a whole person statuette.

In some embodiments of the invention, the model is provided in arbitrary coordinates, which may be, for example, Cartesian. As a first step, the arbitrary coordinates are transferred to default Cartesian coordinates where the origin is at a default position, and the various axes face default directions. For example, the origin may be by default at the center of the largest sphere contained in the model, with one axis facing the back of the patient (who's heart chamber is modelled), and another axis facing the head of the patient. The default Cartesian coordinates determine a default unfolding, e.g., the default coordinates are conventionally transformed to spherical coordinates, and these are used in the unfolding, e.g., using a cartographic projection for the angular coordinates. This default determines a default surface (going through the origin and perpendicularly to the default viewing direction, i.e., in parallel to the patient's back) that cuts the heart chamber. The unfolding brings parts of the heart chamber wall that are behind the cutting surface to the front of the cutting surface, but at larger viewing angles, that is, at the periphery of the unfolded model. In other words, wall portions in front of the cutting surface are at the center of the unfolded model, while wall portions behind the cutting surface are at the periphery of the unfolded model.

Figure 24A:
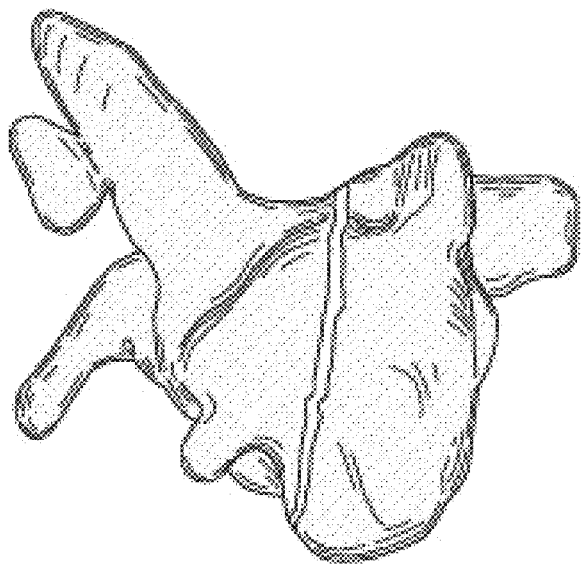
Figure 24B:
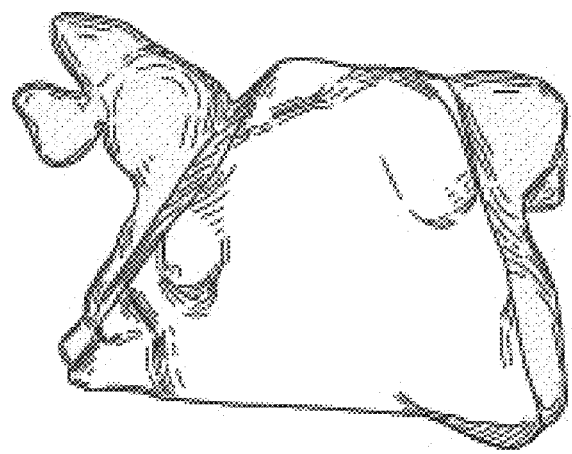
Figure 24C:
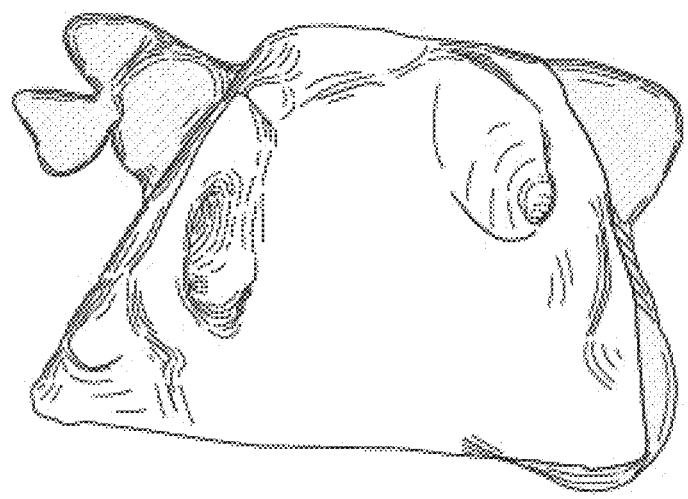
Figure 24D:
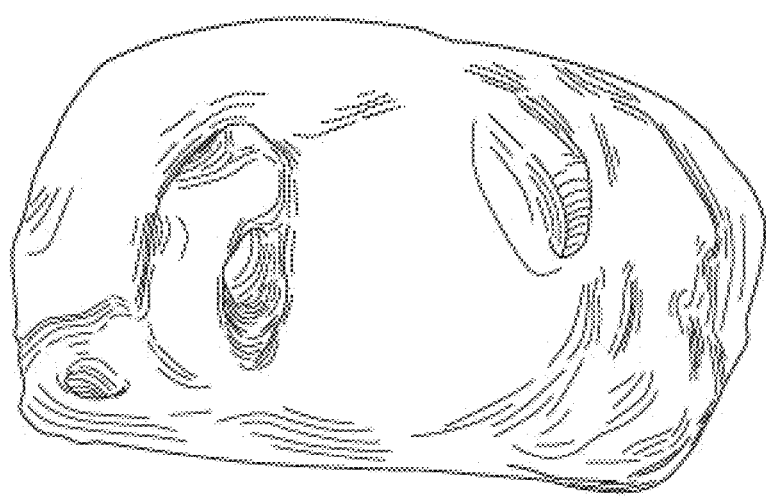
Figure 24E:
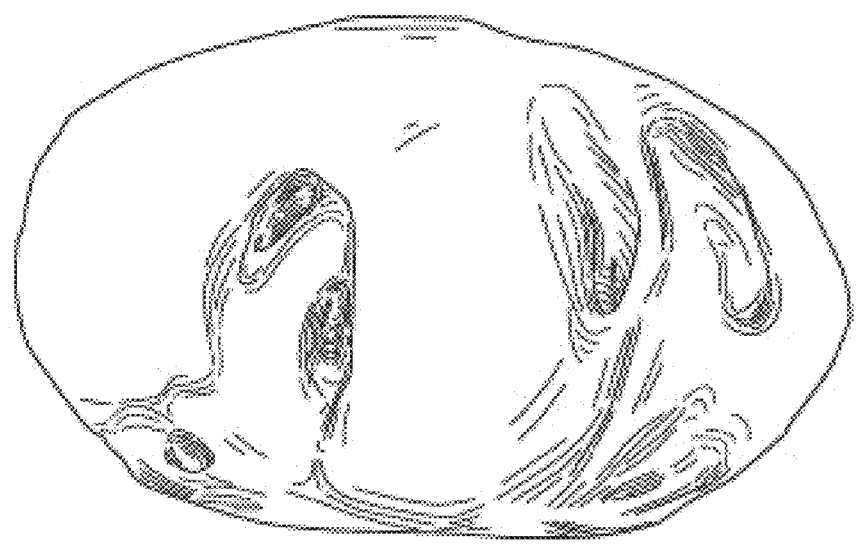

In some embodiments, the physician may change the position of the Cartesian coordinate system, that is, move the origin. Moving the origin may be useful, for example, for bringing an area of interest to the middle of the wall portion in front of the cutting surface, without changing the viewing direction. Furthermore, the physician may change the viewing direction (perpendicularly to which the cutting surface lies). This way, the cutting surface is perpendicular to the viewing direction but not parallel to the patient's back. The physician my control both azimuthal and inclination angles of the viewing direction, optionally, separately. FIGS. 24A to 24E illustrate a view of an unfolded model of a heart chamber at five different degrees of unfolding, represented by an unfolding parameter from 2% to 100%, as indicated in the figures. In other words, the figures show a progressive unfolding of a model of a heart chamber to an unfolded model. The unfolding parameter shown in these figures is indicative of the unfolding factor α described above. For example, an unfolding parameter of 100% illustrated in FIG. 24E represents a maximum degree of unfolding and hence unfolding factor α=0 equivalent to a flat cartographic projection. Similarly, an unfolding parameter of 2% as shown in FIG. 24A represents a small degree of unfolding and a value of α close to 1.

The 3-D model of the surface of the body may be of any other 3-D body that models the surface of the body or any digital representation of such a 3-D body. The 3-D model of the surface of the heart chamber may be any 3-D body that models the surface of the heart chamber or any digital representation of such a 3-D body. It is noted that a heart chamber typically includes a blood pool defined by a wall. The wall typically has openings for connecting to blood vessels. Further, the wall is not necessarily smooth and/or of constant depth, rather, it may include relief details and regions of various thicknesses. The wall defines the blood pool volume. In some embodiments, the 3-D model of the heart chamber models the blood pool and the wall surface that defines the blood pool. In some embodiments, the 3-D model is defined by points on a model surface modelling the surface. That is to say, in some embodiments, the model surface is a model of the wall surface that defines the blood pool of the heart chamber. In some embodiments, the 3-D model also models the blood vessels entering the heart chamber, or at least portions thereof. The thickness of the model wall at any point is not necessarily indicative of the wall thickness of the heart chamber at the same point. In some embodiments, the 3-D model models the surface of the heart chamber wall as viewed from within the heart chamber. In some embodiments, the volume surrounded by the model surface within which the reference point is defined is the blood pool of the heart chamber.

General

As used herein with reference to quantity or value, the term "about" means "within ±10% of".

The terms "comprises", "comprising", "includes", "including", "having" and their conjugates mean: "including but not limited to".

The term "consisting of" means: "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

The words "example" and "exemplary" are used herein to mean "serving as an example, instance or illustration". Any embodiment described as an "example" or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features except insofar as such features conflict.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

Throughout this application, embodiments may be presented with reference to a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Although the present disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable subcombination or as suitable in any other described embodiment of the present disclosure. Certain features described in the context of various embodiments are not to be considered essential features of those embodiments, unless the embodiment is inoperative without those elements.

The invention claimed is:

1. An apparatus comprising:
   an input module configured to receive signals from a catheter, wherein the signals are indicative of measurements taken by the catheter inside a heart chamber;
   a converting module configured to convert the signals into coordinates of points defining a model surface modelling a three-dimensional surface of the heart chamber, and into coordinates for the position of the catheter within the heart chamber;
   a processor configured to apply a transformation to the points of the model to transform each of the points to a corresponding point of an unfolded model; and
   a display for displaying a view of the unfolded model;
   wherein the converting module operates an unfolding transformation comprising:
      reducing azimuth and inclination angles of each point of the model about a reference point, and
      increasing the radial distance between each point of the model and the reference point.

2. The apparatus of claim 1, further comprising a user interface configured to receive display instructions from a user, wherein the apparatus is configured to display a view of the unfolded model in accordance with the display instructions.

3. The apparatus of claim 2, wherein the display instructions comprise the orientation of the view of the unfolded model.

4. The apparatus of claim 1, wherein the measurements taken inside the heart chamber include electrical measurements.

5. The apparatus of claim 1, wherein the measurements taken inside the heart chamber include magnetic measurements.

6. The apparatus of claim 1, wherein the view of the unfolded model shows at least 80% of the points of the unfolded model.

7. The apparatus of claim 1, wherein the view of the unfolded model shows all of the points of the unfolded model.

8. The apparatus of claim 1, wherein the apparatus is configured to display an icon indicative the direction at which the unfolded model is viewed with respect to a human body.

9. The apparatus of claim 1, wherein the apparatus is configured to display a second view of the unfolded model.

10. The apparatus of claim 9, wherein the second view has a viewing direction that is opposite of the viewing direction of the first view.

11. The apparatus of claim 9, wherein the second view has a viewing direction that is perpendicular to the viewing direction of the first view.

12. The apparatus of claim 9, wherein the second view is displayed for an overlapping time period together with the first view.

13. The apparatus of claim 9, wherein the first and second views are displayed during non-overlapping respective time periods.

14. The apparatus of claim 2, wherein the apparatus is configured to display a second view of the unfolded model and wherein the display instructions comprise the orientation of the second view of the unfolded model.

15. The apparatus of claim 1, wherein the apparatus is configured to display information pertaining to time varying information that refers to the heart chamber.

16. The apparatus of claim 15, wherein the time varying information is an electrical activation map.

17. The apparatus of claim 15, wherein the time varying information is an edema map.

18. The apparatus of claim 1, wherein the apparatus is configured to simultaneously display a plurality of views of the unfolded model at a plurality of different orientations.

19. The apparatus of claim 1, wherein the apparatus is configured to sequentially display a plurality of views of the unfolded model at respective different orientations.

20. The apparatus of claim 1, wherein the apparatus is configured to simultaneously display a plurality of views of the unfolded model, wherein each view is indicative of a different degree of unfolding.

21. The apparatus of claim 1, wherein the unfolding transformation reduces the azimuth and inclination angles and increases the radial distance such that a length between two points of the model is preserved following the unfolding transformation.

22. The apparatus of claim 1, comprising a user interface, configured to allow a user to control a degree of the unfolding.

23. The apparatus of claim 1, comprising an interface configured to allow a user to determine the reference point.

24. A method of presenting a three-dimensional model of a surface of heart chamber wall, the method comprising:
   determining a viewing point and a viewing direction;
   unfolding the model so that portions of the surface that are behind a cutting surface going through the viewing point perpendicularly to the viewing direction are presented peripherally to portions of the surface that are in front the cutting surface; and
   displaying the unfolded model together with an icon representing the viewing direction;

wherein the unfolding comprises:
reducing azimuth and inclination angles of each point of the model about a reference point, and
increasing the radial distance between each point of the model and the reference point.

25. An apparatus for displaying a model using the method of claim 24, the apparatus comprising a user interface configured to allow a user to indicate a desired vantage point and a desired viewing direction.

26. The apparatus of claim 25, further comprising a display showing the orientation of the viewing direction near the resulting unfolded three-dimensional model.

27. The apparatus of claim 26, wherein the user interface allows the user to indicate different vantage points and/or viewing angle continuously, and the display shows the unfolded model changing simultaneously with the vantage point and/or viewing angle.

28. The apparatus of claim 25, further comprising a processor configured to carry out said method using the vantage point indicated via the user interface as the viewing point and the indicated desired viewing direction as a viewing direction.

29. The method of claim 24, wherein determining the viewing point and the viewing direction comprises determining according to input from a user interface.

30. The method of claim 24, wherein the model includes a model of a catheter at a position inside the heart chamber, and the displaying comprises displaying the unfolded model together with an icon representing the catheter at the said position in the unfolded model.

* * * * *